United States Patent
Kim et al.

(10) Patent No.: US 11,558,167 B2
(45) Date of Patent: Jan. 17, 2023

(54) METHOD AND APPARATUS FOR EFFICIENTLY OPERATING DORMANT BANDWIDTH PART IN A NEXT GENERATION MOBILE COMMUNICATION SYSTEM

(71) Applicant: Samsung Electronics Co., Ltd., Suwon-si (KR)

(72) Inventors: Donggun Kim, Suwon-si (KR); Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 16/947,039

(22) Filed: Jul. 15, 2020

(65) Prior Publication Data

US 2021/0021397 A1  Jan. 21, 2021

(30) Foreign Application Priority Data

Jul. 15, 2019 (KR) ........................ 10-2019-0085099

(51) Int. Cl.
*H04L 5/00* (2006.01)
*H04B 7/06* (2006.01)
(Continued)

(52) U.S. Cl.
CPC ......... *H04L 5/0092* (2013.01); *H04B 7/0626* (2013.01); *H04L 1/1614* (2013.01);
(Continued)

(58) Field of Classification Search
CPC ... H04L 5/0092; H04L 1/1614; H04L 1/1819; H04L 5/0098; H04L 1/1812;
(Continued)

(56) References Cited

U.S. PATENT DOCUMENTS

2010/0195629 A1  8/2010  Chen et al.
2019/0103954 A1*  4/2019  Lee ..................... H04W 72/042
(Continued)

FOREIGN PATENT DOCUMENTS

WO       2019/084184 A1   5/2019
WO   WO-2019182287 A1 *  9/2019  ........ H04W 52/0206

OTHER PUBLICATIONS

Qualcomm Incorporated, Fast SCG and SCell Activation, 3GPP TSG-RAN WG1 #97, Reno, USA, May 13-17, 2019, R1-1907306. (Year: 2019).*

(Continued)

*Primary Examiner* — Shailendra Kumar

(57) ABSTRACT

The disclosure relates to a communication technique for combining a 5G communication system with an IoT technology to support a higher data transmission rate than a 4G system, and a system thereof. The disclosure may be applied to intelligent services (for example, services related to smart homes, smart buildings, smart cities, smart cars or connected cars, health care, digital education, retail business, security and safety, etc.) based on a 5G communication technology and an IoT-related technology.
In an embodiment of the disclosure, a method performed by a terminal in a wireless communication system is provided. The method comprises: receiving, from a base station, a radio resource control (RRC) message including information on an identifier to indicate a secondary cell (Scell), information on at least one bandwidth part (BWP) of the Scell, and information including first information on a first BWP to be used as dormant BWP among the at least one BWP and second information on a second BWP to be activated as non-dormant BWP from dormant BWP; receiving, from the base station, downlink control information (DCI) including a bitmap associated with a BWP activation
(Continued)

of the Scell; and activating a BWP identified based on the identifier, the bitmap, and at least one of the first information or the second information.

According to the disclosure, via a method by which a new dormant (or hibernation) mode may be operated in units of bandwidth parts (bandwidth part-level), a carrier aggregation technology can be rapidly activated, and a battery of a terminal can be saved.

16 Claims, 16 Drawing Sheets

(51) Int. Cl.
*H04L 1/16* (2006.01)
*H04L 1/18* (2006.01)
*H04W 72/04* (2009.01)
*H04W 76/11* (2018.01)
*H04W 76/27* (2018.01)

(52) U.S. Cl.
CPC .......... *H04L 1/1819* (2013.01); *H04L 5/0098* (2013.01); *H04W 72/042* (2013.01); *H04W 76/11* (2018.02); *H04W 76/27* (2018.02)

(58) Field of Classification Search
CPC ... H04L 1/1685; H04L 1/1854; H04L 1/1896; H04L 5/0053; H04B 7/0626; H04W 72/042; H04W 76/11; H04W 76/27; H04W 72/0453; H04W 72/0413; Y02D 30/70
See application file for complete search history.

(56) References Cited

U.S. PATENT DOCUMENTS

2019/0141695 A1    5/2019  Babaei et al.
2019/0254110 A1*   8/2019  He ..................... H04L 41/0896

OTHER PUBLICATIONS

Ericsson, Reduced latency Scell management for NR-NR CA, 3GPP TSG-RAN WG1 #97, Reno, USA, May 13-17, 2019; R1-1907333 (Year: 2019).*
Qualcomm Incorporated, "Fast SCG and SCell Activation", 3GPP TSG-RAN WG1 #97, May 13-17, 2019, R1-1907306, 11 pages.
Ericsson, "Reduced latency Scell management for NR-NR CA", 3GPP TSG-RAN WG1 #97, May 13-17, 2019, R1-1907333, 5 pages.
ZTE Corporation, "Discussion on low latency SCell activation", 3GPP TSG RAN WG1 Meeting #96bis, Apr. 8-12, 2019, R1-1904156, 6 pages.
Vivo, "Efficient SCell activation", 3GPP TSG RAN WG1 #97, May 13-17, 2019, R1-1906184, 4 pages.
International Search Report dated Oct. 27, 2020 in connection with International Patent Application No. PCT/KR2020/009347, 3 pages.
Supplementary European Search Report dated Jun. 20, 2022 in connection with European Patent Application No. 20 84 0302, 12 pages.

* cited by examiner

FIG. 1L

| | $C_7$ | $C_6$ | $C_5$ | $C_4$ | $C_3$ | $C_2$ | $C_1$ | R | Oct 1 |

1I-05

| | $C_7$ | $C_6$ | $C_5$ | $C_4$ | $C_3$ | $C_2$ | $C_1$ | R | Oct 1 |
|---|---|---|---|---|---|---|---|---|---|
| | $C_{15}$ | $C_{14}$ | $C_{13}$ | $C_{12}$ | $C_{11}$ | $C_{10}$ | $C_9$ | $C_8$ | Oct 2 |
| | $C_{23}$ | $C_{22}$ | $C_{21}$ | $C_{20}$ | $C_{19}$ | $C_{18}$ | $C_{17}$ | $C_{16}$ | Oct 3 |
| | $C_{31}$ | $C_{30}$ | $C_{29}$ | $C_{28}$ | $C_{27}$ | $C_{26}$ | $C_{25}$ | $C_{24}$ | Oct 4 |

1I-10

| Cell ID | DL/UL | BWP ID | State |

1I-15

METHOD AND APPARATUS FOR EFFICIENTLY OPERATING DORMANT BANDWIDTH PART IN A NEXT GENERATION MOBILE COMMUNICATION SYSTEM

CROSS-REFERENCE TO RELATED APPLICATION

This application is based on and claims priority under 35 U.S.C. 119 to Korean Patent Application No. 10-2019-0085099, filed on Jul. 15, 2019, in the Korean Intellectual Property Office, the disclosure of which is herein incorporated by reference in its entirety.

BACKGROUND

1. Field

The disclosure relates to operations of a mobile communication system terminal and a base station. Specifically, the disclosure relates to a method and an apparatus for efficiently operating a dormant bandwidth part in a next generation mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The need for a method for utilizing a carrier aggregation technology in next generation mobile communication systems has arisen.

The above information is presented as background information only to assist with an understanding of the disclosure. No determination has been made, and no assertion is made, as to whether any of the above might be applicable as prior art with regard to the disclosure.

SUMMARY

In a next generation mobile communication system, a carrier aggregation technology may be utilized to provide a service having a high data transmission rate and a low transmission delay to a terminal. However, there is a need for a method for preventing a processing delay that may occur when a carrier aggregation technology is configured and activated for a terminal for which connection to a network is configured or when a carrier aggregation technology is deactivated after being used. In particular, if a terminal maintains a plurality of cells in an active state so as to use a carrier aggregation technology, the terminal should perform PDCCH monitoring for each of the cells, and thus the battery consumption of the terminal may be increased. If the plurality of cells are maintained in a deactivated (inactive) state so as to reduce the battery consumption of the terminal, a data transmission or reception delay may occur due to a delay that occurs when the plurality of cells are activated at the time of using a carrier aggregation technology.

The disclosure proposes a dormant mode such that an RRC connected mode terminal for which connection to a network is configured can rapidly activate and deactivate a carrier aggregation technology in a next generation mobile communication system. The disclosure proposes a method for operating a dormant (or hibernation) mode in units of bandwidth parts (bandwidth part-level), such that a carrier aggregation technology can be rapidly activated and a battery of a terminal can be saved.

In an embodiment of the disclosure, a method performed by a terminal in a wireless communication system is provided. The method comprises: receiving, from a base station, a radio resource control (RRC) message including information on an identifier to indicate a secondary cell (Scell), information on at least one bandwidth part (BWP) of the Scell, and information including first information on a first BWP to be used as dormant BWP among the at least one BWP and second information on a second BWP to be activated as non-dormant BWP from dormant BWP; receiving, from the base station, downlink control information (DCI) including a bitmap associated with a BWP activation of the Scell; and activating a BWP identified based on the identifier, the bitmap, and at least one of the first information or the second information.

In an embodiment of the disclosure, the method performed by a terminal further comprises: as a response to the DCI, transmitting, to the base station, hybrid automatic repeat request (HARQ) information in case that the DCI includes scheduling information including at least one of downlink assignment or uplink grant; and as a response to the DCI, skipping transmitting, to the base station, the HARQ information in case that the DCI does not include the scheduling information.

In an embodiment of the disclosure, wherein activating the BWP comprises, in case that a bit of the bitmap corresponds to dormancy of the Scell, activating the first BWP of the Scell.

In an embodiment of the disclosure, the method performed by a terminal further comprises: in case that the activated BWP is the first BWP, stopping monitoring a physical downlink control channel (PDCCH) for the Scell and performing channel state information (CSI) measurements for the Scell.

In an embodiment of the disclosure, wherein activating the BWP comprises: in case that a bit of the bitmap corresponds to non-dormancy of the Scell and a current active BWP of the Scell is the first BWP, activating the second BWP of the Scell.

In an embodiment of the disclosure, wherein the Scell of the terminal is cell other than a special cell (SpCell) or physical uplink control channel (PUCCH) Scell.

In an embodiment of the disclosure, a method performed by a base station is provided. The method comprises: transmitting, to a terminal, a radio resource control (RRC) message including information on an identifier to indicate a secondary cell (Scell), information on at least one bandwidth part (BWP) of the Scell and information including first information on a first BWP to be used as dormant BWP among the at least one BWP and second information on a second BWP to be activated as non-dormant BWP from dormant BWP; and transmitting, to the base station, downlink control information (DCI) including a bitmap associated with a BWP activation of the Scell, wherein the identifier, the bitmap, and at least one of the first information or the second information are used for identifying a BWP of the Scell to be activated.

In an embodiment of the disclosure, a terminal comprises a transceiver, and a controller coupled with the transceiver and configured to: control the transceiver to receive, from a base station, a radio resource control (RRC) message including information on an identifier to indicate a secondary cell (Scell), information on at least one bandwidth part (BWP) of the Scell and information including first information on a first BWP to be used as dormant BWP among the at least one BWP and second information on a second BWP to be activated as non-dormant BWP from dormant BWP, control the transceiver to receive, from the base station, downlink control information (DCI) including a bitmap associated with a BWP activation of the Scell, and activate a BWP identified based on the identifier, the bitmap, and at least one of the first information or the second information.

In an embodiment of the disclosure, a base station comprises a transceiver, and a controller coupled with the transceiver and configured to: control the transceiver to transmit, to a terminal, a radio resource control (RRC) message including information on an identifier to indicate a secondary cell (Scell), information on at least one bandwidth part (BWP) of the Scell and information including first information on a first BWP to be used as dormant BWP among the at least one BWP and second information on a second BWP to be activated as non-dormant BWP from dormant BWP, and control the transceiver to transmit, to the base station, downlink control information (DCI) including a bitmap associated with a BWP activation of the Scell, wherein the identifier, the bitmap, and at least one of the first information or the second information are used for identifying a BWP of the Scell to be activated.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 1L illustrates MAC control information indicating a state shift to an active state, a dormant state, or an inactive state, proposed by the disclosure;

FIG. 1O illustrates the block composition of a TRP in a radio communication system to which an embodiment is applicable.

DETAILED DESCRIPTION

Figure 1A:
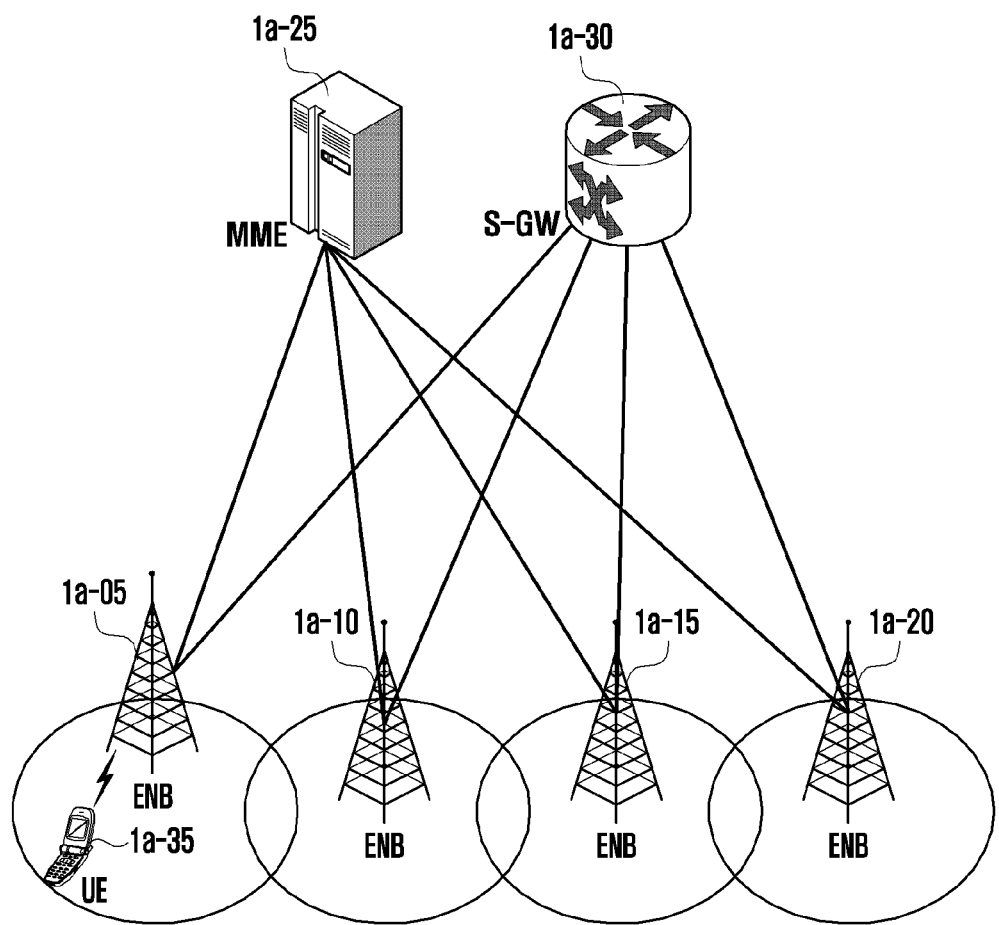
FIG. 1A illustrates the structure of an LTE system to which the disclosure is applicable.

FIGS. 1A through 1O, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a detailed description of known functions or configurations incorporated herein will be omitted when it may make the subject matter of the disclosure rather unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB". That is, a base station described as "eNB" may indicate "gNB".

FIG. 1A illustrates the structure of an LTE system to which the disclosure is applicable.

Referring to FIG. 1A, as illustrated therein, a radio access network of an LTE system is composed of a next generation base station (an evolved node B, hereinafter, an ENB, a node B, or a base station) 1A-05, 1A-10, 1A-15, or 1A-20, a mobility management entity (MME) 1A-25, and a serving-gateway (S-GW) 1A-30. User equipment (hereinafter, UE or a terminal) 1A-35 accesses an external network through ENBs 1A-05 to 1A-20 and an S-GW 1A-30.

In FIG. 1A, ENBs 1A-05 to 1A-20 correspond to an existing node B of a UMTS system. An ENB is connected to UE 1A-35 through a radio channel and performs a more complicated role than that of an existing node B. Since in an LTE system, all user traffics as well as a real time service such as voice over IP (VoIP) using an Internet protocol are serviced through a shared channel, a device for performing scheduling by gathering state information such as buffer states, available transmission power states, and channel states of pieces of UE is required, and ENBs 1A-05 to 1A-20 serve as such devices. One ENB generally controls multiple cells. For example, in order to implement a transmission speed of 100 Mbps, an LTE system uses, as a radio access technology, an orthogonal frequency division multiplexing (hereinafter, referred to as OFDM) scheme, for example, in a bandwidth of 20 mega-Hertz (MHz). In addition, an adaptive modulation & coding (hereinafter, referred to as AMC) scheme for determining a modulation scheme and a channel coding rate according to a channel state of a terminal is applied. An S-GW 1A-30 is a device for providing a data bearer and produces or removes a data bearer according to a control of an MME 1A-25. An MME is a device in charge of multiple control functions as well as a mobility management function for a terminal and is connected to multiple base stations.

Figure 1B:
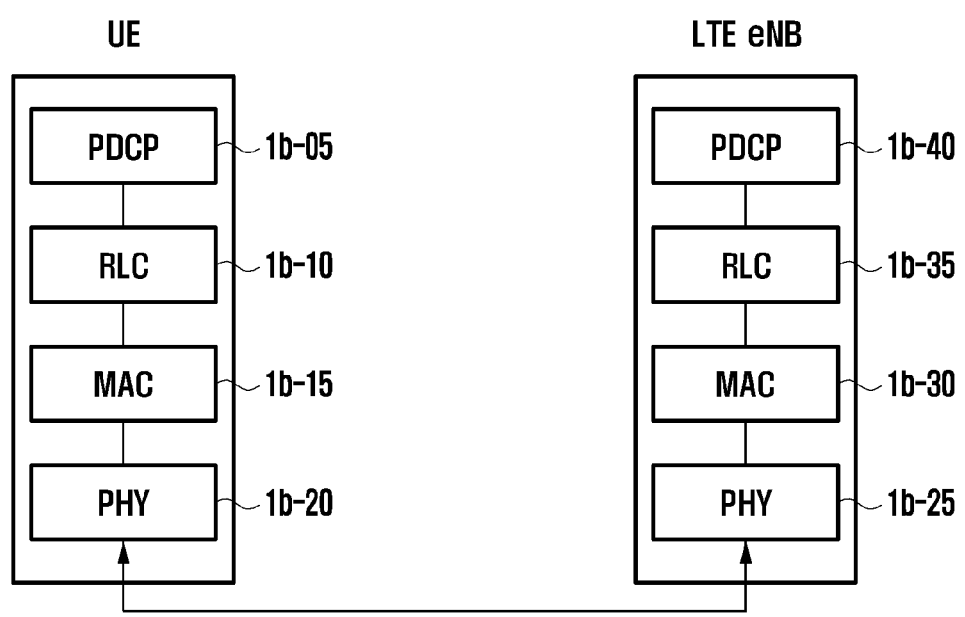
FIG. 1B illustrates a radio protocol structure in an LTE system to which the disclosure is applicable.

FIG. 1B shows a radio protocol structure in an LTE system to which the disclosure is applicable.

Referring to FIG. 1B, a radio protocol of an LTE system is composed of, in each of a terminal and an ENB, a packet data convergence protocol (PDCP) 1B-05 or 1B-40, a radio link control (RLC) 1B-10 or 1B-35, and a medium access control (MAC) 1B-15 or 1B-30. A packet data convergence protocol (PDCP) 1B-05 or 1B-40 is in charge of an operation such as IP header compression/restoration. The major functions of a PDCP are summarized as follows.

Header compression and decompression function (header compression and decompression: ROHC only)

User data transmission function (transfer of user data)

Sequential delivery function (in-sequence delivery of upper layer PDUs at PDCP re-establishment procedure for RLC AM)

Sequence rearrangement function (for split bearers in DC (only support for RLC AM): PDCP PDU routing for transmission and PDCP PDU reordering for reception)

Overlap detection function (duplicate detection of lower layer SDUs at PDCP re-establishment procedure for RLC AM)

Retransmission function (retransmission of PDCP SDUs at handover and, for split bearers in DC, of PDCP PDUs at PDCP data-recovery procedure, for RLC AM)

Ciphering and deciphering function

Timer-based SDU removal function (timer-based SDU discard in uplink)

A radio link control (hereinafter, referred to as RLC) 1B-10 or 1B-35 reconfigures a PDCP packet data unit (PDU) to have an appropriate size and performs an ARQ operation or the like. The major functions of an RLC are summarized as follows.

Data transmission function (transfer of upper layer PDUs)

ARQ function (error correction through ARQ (only for AM data transfer))

Concatenation, segmentation and reassembly function (concatenation, segmentation and reassembly of RLC SDUs (only for UM and AM data transfer))

Re-segmentation function (re-segmentation of RLC data PDUs (only for AM data transfer))

Sequence rearrangement function (reordering of RLC data PDUs (only for UM and AM data transfer))

Overlap detection function (duplicate detection (only for UM and AM data transfer))

Error detection function (protocol error detection (only for AM data transfer))

RLC SDU removal function (RLC SDU discard (only for UM and AM data transfer))

RLC re-establishment function

A MAC 1B-15 or 1B-30 is connected to multiple RLC layer devices configured in one terminal and performs an operation of multiplexing RLC PDUs to a MAC PDU and demultiplexing the RLC PDUs from the MAC PDU. The major functions of a MAC are summarized as follows.

Mapping function (mapping between logical channels and transport channels)

Multiplexing and demultiplexing function (multiplexing/demultiplexing of MAC SDUs belonging to one or different logical channels into/from transport blocks (TB) delivered to/from the physical layer on transport channels)

Scheduling information reporting function

HARQ function (error correction through HARQ)

Function of adjusting priority between logical channels (priority handling between logical channels of one UE)

Function of adjusting priority between terminals (priority handling between pieces of UE by means of dynamic scheduling)

MBMS service identification function

Transmission format selection function (transport format selection)

Padding function

A physical layer 1B-20 or 1B-25 performs an operation of performing channel coding and modulation on upper layer data to make an OFDM symbol therefrom and transmitting the OFDM symbol to a radio channel or an operation of performing demodulation and channel decoding on an OFDM symbol received through a radio channel and delivering the demodulated and channel-decoded symbol to an upper layer.

Figure 1C:
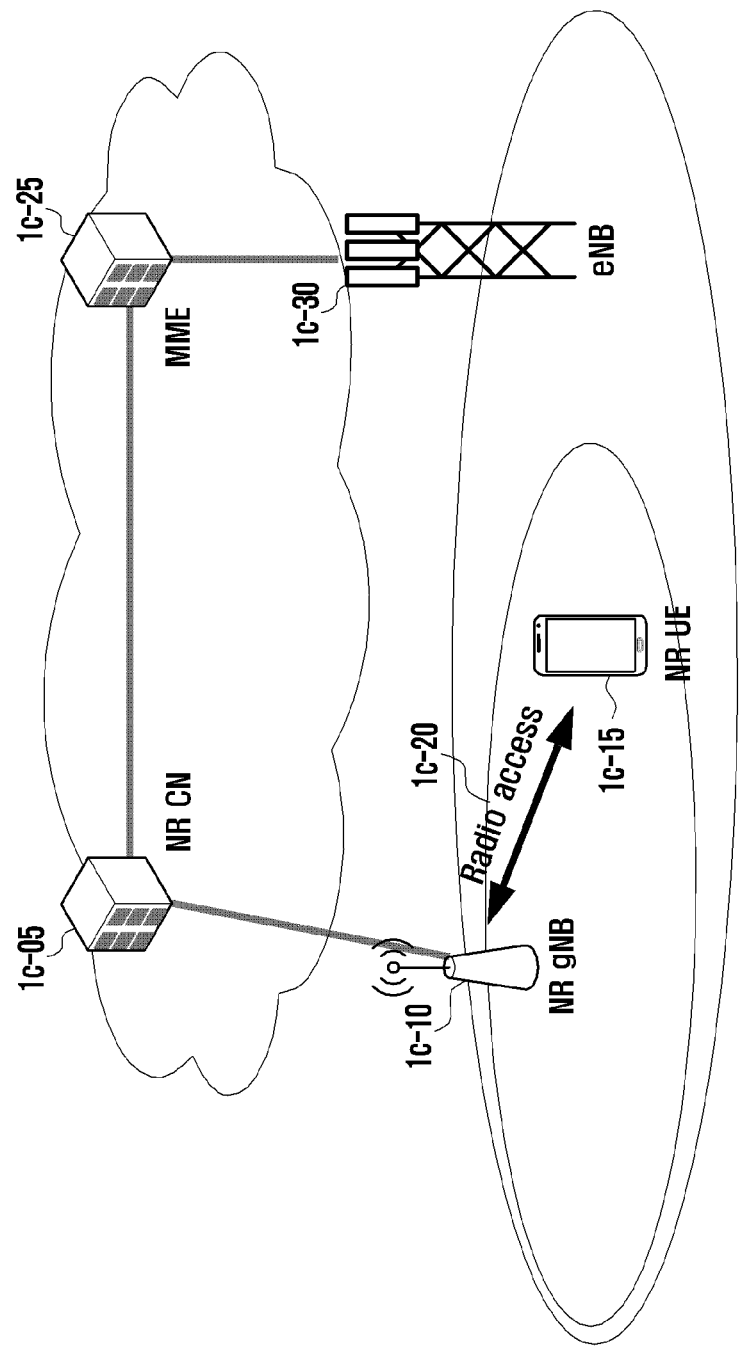
FIG. 1C illustrates the structure of a next generation mobile communication system to which the disclosure is applicable.

FIG. 1C illustrates the structure of a next generation mobile communication system to which the disclosure is applicable.

Referring to FIG. 1C, as illustrated therein, a radio access network of a next generation mobile communication system (hereinafter, NR or 5G) is composed of a next generation base station (a new radio node B, hereinafter, an NR gNB or an NR base station) 1C-10 and new radio core network (NR CN) 1C-05. New radio user equipment (hereinafter, NR UE or a terminal) 1C-15 accesses an external network through an NR gNB 1C-10 and an NR CN 1C-05.

In FIG. 1C, an NR gNB 1C-10 corresponds to an evolved node B (eNB) of an existing LTE system. An NR gNB is connected to NR UE 1C-15 through a radio channel and may provide a better service than that of an existing node B. Since in a next generation mobile communication system, all user traffics are serviced through a shared channel, a device for performing scheduling by gathering state information such as buffer states, available transmission power states, and channel states of pieces of UE is required, and an NR NB 1C-10 serves as the device. One NR gNB generally controls multiple cells. In order to implement ultrahigh-speed data transmission compared to current LTE, an existing maximum bandwidth or a larger bandwidth may be included, and by using an orthogonal frequency division multiplexing (hereinafter, referred to as OFDM) scheme as a radio access technology, a beamforming technology may be additionally grafted. In addition, an adaptive modulation & coding (hereinafter, referred to as AMC) scheme for determining a modulation scheme and a channel coding rate according to a channel state of a terminal is applied. An NR-CN 1C-05 performs a function such as mobility support, bearer configuration, QoS configuration, or the like. An NR-CN is a device in charge of multiple control functions as well as a mobility management function for a terminal and is connected to multiple base stations. Moreover, a next generation mobile communication system may be linked with an existing LTE system, and an NR CN is connected to an MME 1C-25 through a network interface. An MME may be connected to an eNB 1C-30, an existing base station.

Figure 1D:
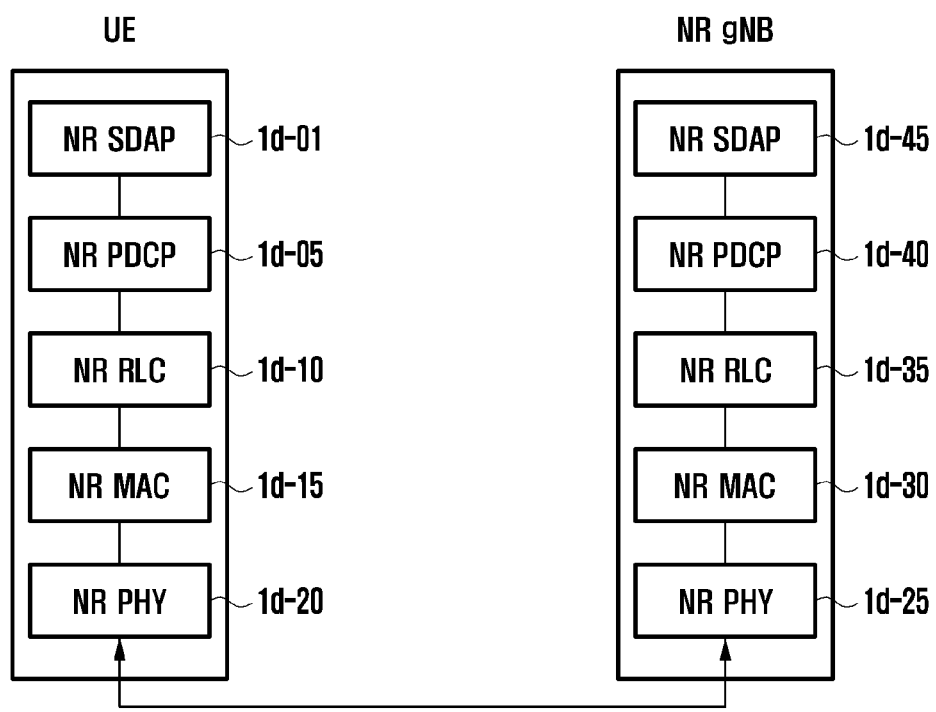
FIG. 1D illustrates a radio protocol structure of a next generation mobile communication system to which the disclosure is applicable.

FIG. 1D shows a radio protocol structure of a next generation mobile communication system to which the disclosure is applicable.

Referring to FIG. 1D, a radio protocol of a next generation mobile communication system is composed of, in each of a terminal and an NR base station, an NR SDAP 1D-01 or 1D-45, an NR PDCP 1D-05 or 1D-40, an NR RLC 1D-10 or 1D-35, or an NR MAC 1D-15 or 1D-30.

The major functions of an NR SDAP 1D-01 or 1D-45 may include a part of the following functions.

User data delivery function (transfer of user plane data)

Function of mapping a QoS flow and a data bearer for an uplink and a downlink (mapping between a QoS flow and a DRB for both DL and UL)

Function of marking QoS flow ID for an uplink and a downlink (marking QoS flow ID in both DL and UL packets)

Function of mapping a reflective QoS flow to a data bearer for uplink SDAP PDUs (reflective QoS flow to DRB mapping for the UL SDAP PDUs)

In relation to an SDAP layer device, whether or not to use a header of the SDAP layer device or whether or not to use a function of the SDAP layer device may be configured for a terminal by an RRC message for each of PDCP layer devices, each of bearers, or each of logical channels, and in case that an SDAP header is configured, an NAS QoS reflection configuration 1 bit indicator (NAS reflective QoS) and an AS QoS reflection configuration 1 bit indicator (AS reflective QoS) of the SDAP header may provide indication to a terminal such that the terminal may renew or reconfigure mapping information on a data bearer and a QoS flow of an uplink and a downlink. The SDAP header may include QoS flow ID information representing QoS. The QoS information may be used as data processing priority, scheduling information, or the like to support an active service.

The major functions of an NR PDCP 1D-05 or 1D-40 may include a part of the following functions.

Header compression and decompression function (header compression and decompression: ROHC only)

User data transmission function (transfer of user data)

Sequential delivery function (in-sequence delivery of upper layer PDUs)

Non-sequential delivery function (out-of-sequence delivery of upper layer PDUs)

Sequence rearrangement function (PDCP PDU reordering for reception)

Overlap detection function (duplicate detection of lower layer SDUs)

Retransmission function (retransmission of PDCP SDUs)

Ciphering and deciphering function

Timer-based SDU removal function (timer-based SDU discard in uplink.)

The sequence rearrangement function (reordering) for NR PDCP devices refers to a function of sequentially rearranging, based on a PDCP sequence number (SN), PDCP PDUs received from a lower layer, may include a function of delivering data to an upper layer in a rearranged sequence or a function of directly delivering data without considering a sequence, may include a function of recording lost PDCP PDUs by rearranging a sequence, may include a function of reporting, to a transmitter side, a state about lost PDCP PDUs, and may include a function of requesting retransmission of lost PDCP PDUs.

The major functions of an NR RLC 1D-10 or 1D-35 may include a part of the following functions.

Data transmission function (transfer of upper layer PDUs)

Sequential delivery function (in-sequence delivery of upper layer PDUs)

Non-sequential delivery function (out-of-sequence delivery of upper layer PDUs)

ARQ function (error correction through ARQ)

Concatenation, segmentation and reassembly function (concatenation, segmentation and reassembly of RLC SDUs)

Re-segmentation function (re-segmentation of RLC data PDUs)

Sequence rearrangement function (reordering of RLC data PDUs)

Overlap detection function (duplicate detection)

Error detection function (protocol error detection)

RLC SDU removal function (RLC SDU discard)

RLC re-establishment function (RLC re-establishment)

The sequential delivery function (in-sequence delivery) of an NR RLC device refers to a function of sequentially delivering RLC SDUs received from a lower layer to an upper layer, may have a function of, in case that one original RLC SDU is dividedly received as multiple RLC SDUs, reassembling and delivering the RLC SDUs, may include a function of rearranging, based on an RLC sequence number (SN) or a PDCP sequence number (SN), received RLC PDUs, may include a function of recording lost RLC PDUs by rearranging a sequence, may include a function of reporting, to a transmitter side, a state about lost RLC PDUs, may include a function of requesting retransmission of lost RLC PDUs, and may include a function of, in case that there is a lost RLC SDU, sequentially delivering, to an upper layer, only RLC SDUs before the lost RLC SDU, a function of, if a designated timer expires although there is a lost RLC SDU, sequentially delivering, to an upper layer, all RLC SDUs received before the timer starts, or a function of, if a designated timer expires although there is a lost RLC SDU, sequentially delivering, to an upper layer, all RLC SDUs having been received until the present time. In addition, RLC PDUs may be processed in the order in which the RLC PDUs are received (in the order of arrival, irrespective of a sequence number), and may be delivered to a PDCP device irrespective of a sequence (out-of-sequence delivery). In case of a segment, segments stored in a buffer or to be received later may be received, reconstituted into one complete RLC PDU, processed, and delivered to a PDCP device. The NR RLC layer may not include a concatenation function. The function may be performed in an NR MAC layer or may be replaced by a multiplexing function of an NR MAC layer.

The non-sequential delivery function (out-of-sequence delivery) of an NR RLC device refers to a function of directly delivering, to an upper layer, irrespective of a sequence, RLC SDUs received from a lower layer, may include a function of, in case that one original RLC SDU is dividedly received as multiple RLC SDUs, reassembling and delivering the RLC SDUs, and may include a function of storing an RLC SN or a PDCP SN of received RLC PDUs and arranging sequences to record lost RLC PDUs.

An NR MAC 1D-15 or 1D-30 may be connected to multiple NR RLC layer devices configured in one terminal, and the major functions of an NR MAC may include a part of the following functions.

Mapping function (mapping between logical channels and transport channels)

Multiplexing and demultiplexing function (multiplexing/demultiplexing of MAC SDUs)

Scheduling information reporting function

HARQ function (error correction through HARQ)

Function of adjusting priority between logical channels (priority handling between logical channels of one UE)

Function of adjusting priority between terminals (priority handling between pieces of UE by means of dynamic scheduling)

MBMS service identification function

Transmission format selection function (transport format selection)

Padding function

An NR PHY layer 1D-20 or 1D-25 performs an operation of performing channel coding and modulation on upper layer data to make an OFDM symbol therefrom and transmitting the OFDM symbol to a radio channel or an operation of performing demodulation and channel decoding on an OFDM symbol received through a radio channel and delivering the demodulated and channel-decoded symbol to an upper layer.

The disclosure proposes a method capable of rapidly activating a carrier aggregation technology in a next generation mobile communication system and saving a terminal battery.

A network or a base station may configure an SPCell (a PCell and a PSCell) and a plurality of SCells for a terminal.

The SPCell may indicate a PCell when the terminal communicates with one base station, and the SPCell may indicate a PCell of a master base station or a PSCell of a secondary base station when the terminal communicates with two base stations (the master base station and the secondary base station). The PCell or the PSCell refers to a main cell used when a terminal and a base station communicate in each MAC layer (MAC entity), and means a cell which matches a timing to perform synchronization, performs a random access, transmits an HARQ ACK/NACK feedback to a PUCCH transmission resource, and transmits or receives most control signals. A technique in which a base station operates a plurality of SCells together with an SPCell to increase transmission resources and increase uplink or downlink data transmission resources is called a carrier aggregation technology.

If an SPCell and a plurality of SCells are configured for a terminal, a mode may be configured for each of the SCells. As a mode (state) of the SCells, an active mode and a deactivated (inactive) mode may be configured. In the active mode, a terminal may transmit or receive uplink or downlink data to or from a base station in the active mode SCell(s) (or an activated bandwidth part of the SCell(s)). In addition, a terminal may monitor a PDCCH to identify indication of a base station, may perform channel measurement on a downlink of the active mode SCell(s) (or the activated bandwidth part of the SCells), and may periodically report measurement information to the base station. In order to allow the base station to perform uplink channel measurement, the terminal may periodically transmit a pilot signal (a sounding reference signal, SRS) to the base station.

However, in the deactivated mode, a terminal may not transmit or receive data to or from a base station in the SCells, does not monitor a PDCCH to identify indication of the base station, does not perform channel measurement, does not perform a measurement report, and does not transmit a pilot signal.

Accordingly, in order to activate SCells in a deactivated mode, a base station may firstly configure frequency measurement configuration information for a terminal via an RRC message. A terminal performs cell or frequency measurement, based on the frequency measurement configuration information. In addition, a base station may activate the deactivated SCells, based on frequency/channel measurement information after receiving a cell or frequency measurement report of a terminal. This causes a long delay while a base station activates a carrier aggregation technology for a terminal.

The disclosure proposes a dormant mode for a bandwidth part of each of SCells to reduce the delay and save a battery of a terminal.

In the dormant mode, a terminal may not transmit or receive data to or from a base station in a dormant bandwidth part (dormant BWP) of the SCells, and does not monitor a PDCCH for identifying indication of the base station. In addition, a terminal does not also transmit a pilot signal, but performs channel measurement and reports a measurement result for a measured frequency/cell/channel according to base station configuration, either periodically or when an event occurs. Accordingly, a terminal may save a battery compared to an active mode because a PDCCH is not monitored and a pilot signal is not transmitted in a dormant bandwidth part (BWP) of the SCells. Moreover, since a channel measurement report is performed unlike a deactivated mode, a base station may rapidly activate, based on a measurement report of a dormant bandwidth part of the SCells, a bandwidth part of the SCells and may rapidly use a carrier aggregation technology, so that a transmission delay is reduced.

In a next generation mobile communication system, a very high frequency band may be used, and thus a frequency bandwidth may also be very wide. However, supporting all of very wide bandwidths in terminal implementation requires high implementation complexity and high costs. Accordingly, in a next generation mobile communication system, a concept of a bandwidth part (BWP) may be introduced. Specifically, a plurality of bandwidth parts (BWP) may be configured for one cell (an SPCell or an SCell), and data may be transmitted or received to or from one or a plurality of bandwidth parts according to indication of a base station.

In the disclosure, when a dormant mode proposed in the disclosure is introduced, proposed are a state shift (bandwidth part switching) method and a specific operation considering the state of SCells and a plurality of bandwidth parts configured for the SCells. In addition, methods of managing the dormant mode in units of bandwidth parts (BWP-level) and shifting a state (or switching a bandwidth part) are respectively proposed, and a specific bandwidth part operation according to each of modes (active, deactivated, or dormant) is proposed.

In addition, in the disclosure, a plurality of bandwidth parts are configured for each of downlinks or uplinks in one cell (an SPCell, a PCell, a PSCell, or an SCell), and an active bandwidth part (an active DL or UL BWP), a dormant bandwidth part (a dormant BWP or dormant DL BWP), or a deactivated bandwidth part (an inactive or deactivated DL/UL BWP) may be configured and operated via bandwidth part switching. That is, by shifting a bandwidth part of a downlink or an uplink to an active state for the one cell, a data transmission rate may be increased via a method similar to a carrier aggregation technology. In addition, by shifting or switching a downlink bandwidth part to a dormant bandwidth part, a terminal does not perform PDCCH monitoring for the cell, and thus a battery may be saved. Moreover, by enabling a terminal to perform channel measurement on a downlink bandwidth part and report a channel measurement result, subsequent rapid activation of a cell or a bandwidth part may be supported. Furthermore, in the one cell, a downlink (or uplink) bandwidth part may be shifted to a deactivated state, and thus a battery of a terminal may be saved. Indication of shifting a state for each of bandwidth parts for each of cells may be configured and provided via an RRC message, a MAC CE, or downlink control information (DCI) of a PDCCH.

In the disclosure, a bandwidth part (BWP) may be used without distinguishing between an uplink and a downlink, and the meaning thereof may be indication of each of an uplink bandwidth part and a downlink bandwidth part according to a context.

In the disclosure, a link may be used without distinguishing between an uplink and a downlink, and the meaning thereof may be indication of each of an uplink and a downlink according to a context.

Figure 1E:
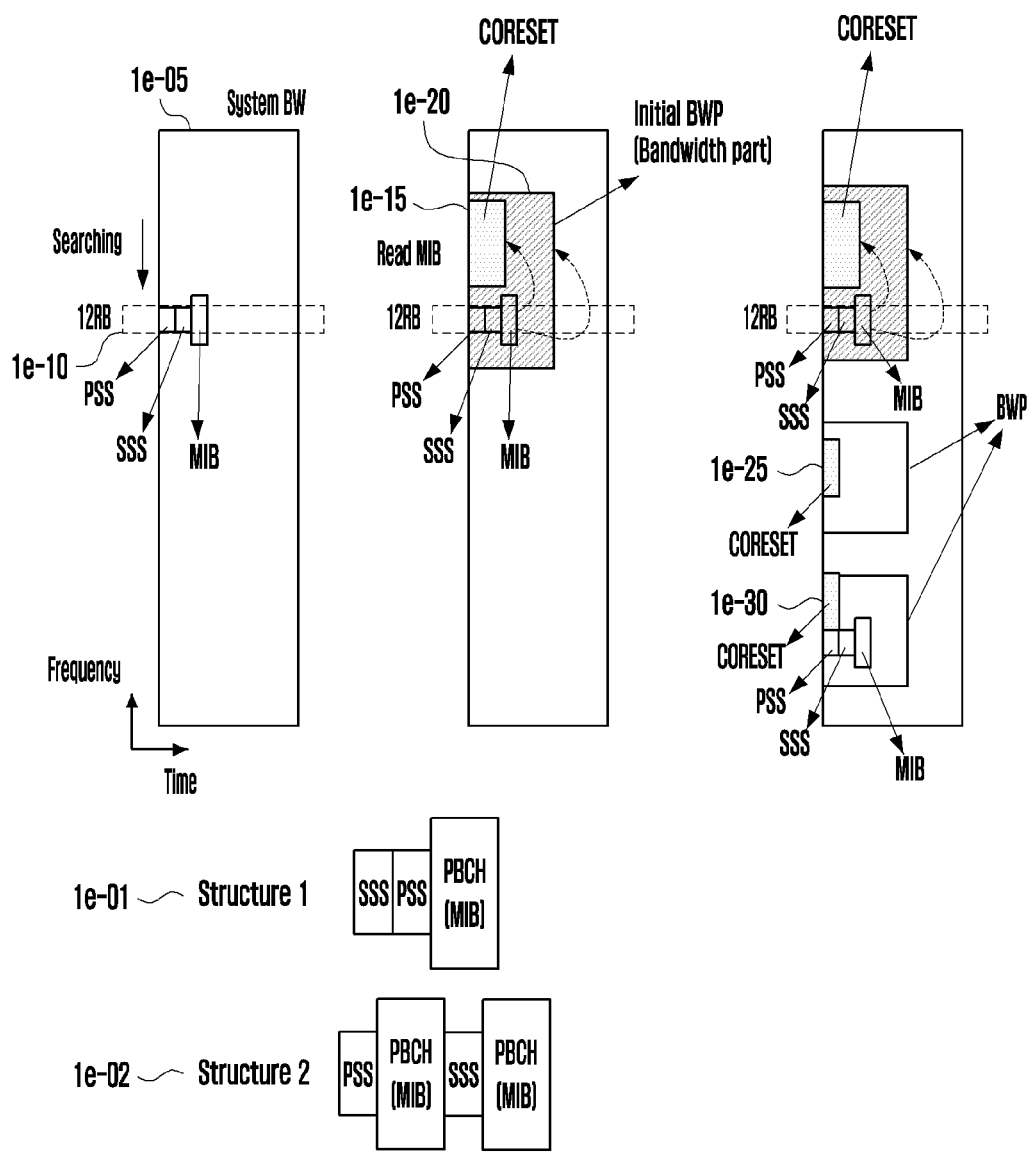
FIG. 1EA illustrates a procedure of providing a service to a terminal by efficiently using a very wide frequency bandwidth in a next generation mobile communication system of the disclosure FIG. 1EB illustrates a procedure of providing a service to a terminal by efficiently using a very wide frequency bandwidth in a next generation mobile communication system of the disclosure.
Figure 1E:
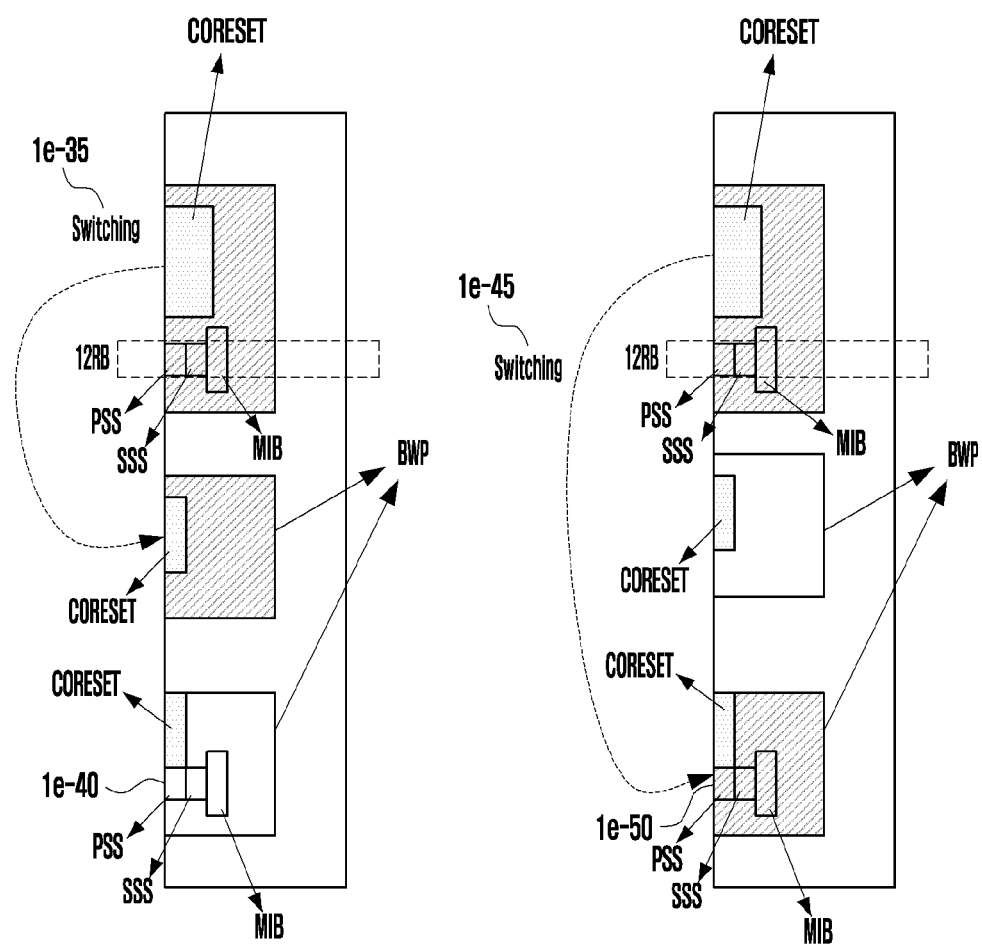

FIG. 1EA shows a procedure of providing a service to a terminal by efficiently using a very wide frequency bandwidth in a next generation mobile communication system of the disclosure, and FIG. 1EB shows a procedure of providing a service to a terminal by efficiently using a very wide frequency bandwidth in a next generation mobile communication system of the disclosure.

FIG. 1EA and FIG. 1EB will describe how a next generation mobile communication system efficiently uses a very wide frequency bandwidth to provide services to terminals having different capabilities (or categories) and to save a battery.

One cell in which a base station provides a service may service a very wide frequency band, as in 1E-05. However, in order to provide services to terminals having different capabilities, one cell may be managed by dividing the wide frequency band into a plurality of bandwidth parts.

First, a terminal that is initially powered on may search an entire frequency band provided by an operator (PLMN) in certain units of resource blocks (for example, in units of 12 resource blocks (RBs)). That is, a terminal may start searching for a primary synchronization sequence (PSS)/secondary synchronization sequence (SSS) in an entire system bandwidth in the units of resource blocks 1E-10. If a terminal detects a PSS/SSS 1E-01 or 1E-02 while searching the PSS/SSS in the units of the resource blocks, the terminal may read and interpret (decode) the signals so that the terminal can identify a boundary between a sub-frame and a radio transmission resource frame. Accordingly, sub-frames may be distinguished in units of 1 millisecond (ms), and synchronization of a downlink signal with a base station is achieved. A resource block (RB) may be defined in two-dimensional units with a size of a predetermined frequency resource and a predetermined time resource. For example, 1 ms units may be defined for time resources and twelve sub-carriers (1 carrier×15 kHz=180 kHz) may be defined for frequency resources. In case that synchronization is completed, a terminal may identify information of a control resource set (CORESET) by identifying a master system information block (MIB) or minimum system information (MSI), and may identify initial access bandwidth part (BWP) information 1E-15 and 1E-20. The CORESET information refers to a location of a time/frequency transmission resource to which a control signal is transmitted from a base station, and indicates, for example, a resource location to which a PDCCH channel is transmitted. That is, the CORESET information is information indicating where first system information (system information block 1, SIB1) is transmitted, and indicates the frequency/time resource from which a PDCCH is transmitted. In case that the terminal reads the first system information, information on an initial bandwidth part (initial BWP) may be identified. As described above, in case that a terminal completes synchronization of a downlink signal with a base station and may receive a control signal, the terminal may perform a random access procedure in an initial bandwidth part (initial BWP) of a camp-on cell, request RRC connection configuration, receive an RRC message, and configure RRC connection.

In the RRC connection configuration, a plurality of bandwidth parts may be configured for one cell (a PCell, a PSCell, an SPCell, or an SCell). A plurality of bandwidth parts may be configured for a downlink in the one cell, and a plurality of bandwidth parts may be configured separately for an uplink.

The plurality of bandwidth parts may be indicated and configured by a bandwidth part identifier (a BWP identifier) so as to be used as an initial bandwidth part (an initial BWP), a default bandwidth part (a default BWP), or a first active bandwidth part (a first active BWP).

The initial bandwidth part (initial BWP) may be used as a bandwidth part determined at a cell level (cell-specific) and present as one for each of cells, and may be used as a bandwidth part for allowing a terminal accessing a cell first to configure connection for the cell via a random access procedure or a terminal, for which connection has been configured, to perform synchronization. In addition, a base station may configure, for each of cells, an initial downlink bandwidth part (initial downlink BWP) to be used in a downlink and an initial uplink bandwidth part (initial uplink BWP) to be used in an uplink. Moreover, configuration information for the initial bandwidth part may be transmitted (broadcast) from first system information (system information 1, SIB1) indicated by CORESET, and may be reconfigured by a base station for a connected terminal by an RRC message. Furthermore, the initial bandwidth part may be used after being designated as no. 0 of a bandwidth part identifier in each of an uplink and a downlink. That is, any terminal accessing the same cell may use the same initial bandwidth part after identically designating the initial bandwidth part as bandwidth part identifier no. 0. It is because, when a random access procedure is performed, a base station may transmit a random access response (RAR) message to an initial bandwidth part readable by any terminal and thus there may be an advantage of facilitating a contention-based random access procedure.

The first active bandwidth part (first active BWP) may be configured to be different for each of terminals (UE-specific) and may be indicated from among a plurality of bandwidth parts by designation by a bandwidth part identifier. The first active bandwidth part may be configured for each of a downlink and an uplink and may be configured, by bandwidth part identifier, as each a first active downlink bandwidth part (first active downlink BWP) and a first active uplink bandwidth part (first active uplink BWP). When a plurality of bandwidth parts is configured for one cell, the first active bandwidth part may be used to indicate which bandwidth part is to be activated first to be used. For example, when a PCell, a PSCell, and a plurality of SCells are configured for a terminal and a plurality of bandwidth parts are configured for each of the PCell, the PSCell, or the SCells, if the PCell, the PSCell, or the SCell is activated, the terminal may activate and use a first active bandwidth part (first active BWP) from among the plurality of bandwidth parts configured for the PCell, the PSCell, or the SCells. That is, a first active downlink bandwidth part (first active downlink BWP) may be activated and used for a downlink, and a first active uplink bandwidth part (first active uplink BWP) may be activated and used for an uplink.

An operation in which a terminal, for an SCell, switches a downlink bandwidth part to be activated to a first active downlink bandwidth part and switches an uplink bandwidth part to be activated to a first active uplink bandwidth part may be performed when indication of activating an SCell or a bandwidth part from a deactivated state is received via an RRC message, MAC control information, or DCI. In addition, the operation may be performed when indication of shifting an SCell or a bandwidth part to a dormant state is received via an RRC message, MAC control information, or DCI. It is because, when an SCell or a bandwidth part is activated, a downlink bandwidth part and an uplink bandwidth part are to be switched to be activated to a first active downlink bandwidth part and to be activated to a first active uplink bandwidth part, respectively, and thus a base station may effectively use a carrier aggregation technology only if a frequency/channel should be measured and reported for a first active downlink/uplink bandwidth part when a channel measurement report is performed in a dormant state.

A default bandwidth part (default BWP) may be configured to be different for each of terminals (UE-specific) and may be designated and indicated from among a plurality of bandwidth parts by a bandwidth part identifier. The default bandwidth part may be configured only for a downlink. The default bandwidth part may be used as a bandwidth part to fall back after a certain period of time from an active bandwidth part from among a plurality of downlink bandwidth parts. For example, a bandwidth part inactive timer (BWP inactivity timer) may be configured for each of cells or each of bandwidth parts via an RRC message, and the timer may start or restart at the time of the occurrence of data transmission/reception in an active bandwidth part, not in a default bandwidth part, or may start or restart at the time of a switch of an active bandwidth part to another bandwidth part. When the timer expires, a terminal may allow a downlink bandwidth part activated for a cell to fall back or switch to a default bandwidth. The switching may mean a procedure of deactivating (inactivating) a current active bandwidth part and activating a bandwidth part to which indication of the switching has been provided, and the switching may be triggered by an RRC message, MAC control information (a MAC control element), or L1 signaling (downlink control information (DCI) of a PDCCH). The switching may be triggered by indicating a bandwidth part to be switched or to be activated, and a bandwidth part may be indicated by a bandwidth part indicator (for example, 0, 1, 2, 3, or 4).

The default bandwidth part is applied and used only for a downlink because a base station allows a terminal to fall back to a default bandwidth part for each of cells after a certain period of time and to receive indication (for example, DCI of a PDCCH) from the base station and thus base station scheduling may be facilitated. For example, if a base station configures, as initial bandwidth parts, default bandwidth parts of terminals accessing one cell, the base station may continuously perform scheduling indication only in the initial bandwidth parts after a certain period of time. In case that the default bandwidth parts are not configured in an RRC message, initial bandwidth parts may be considered as the default bandwidth parts which may fall back to initial bandwidth parts when a partial band inactive timer expires.

As another method, in order to enhance the freedom of implementation of a base station, a default bandwidth part may also be defined and configured for an uplink and may be used as a default bandwidth part of a downlink.

Figure 1F:
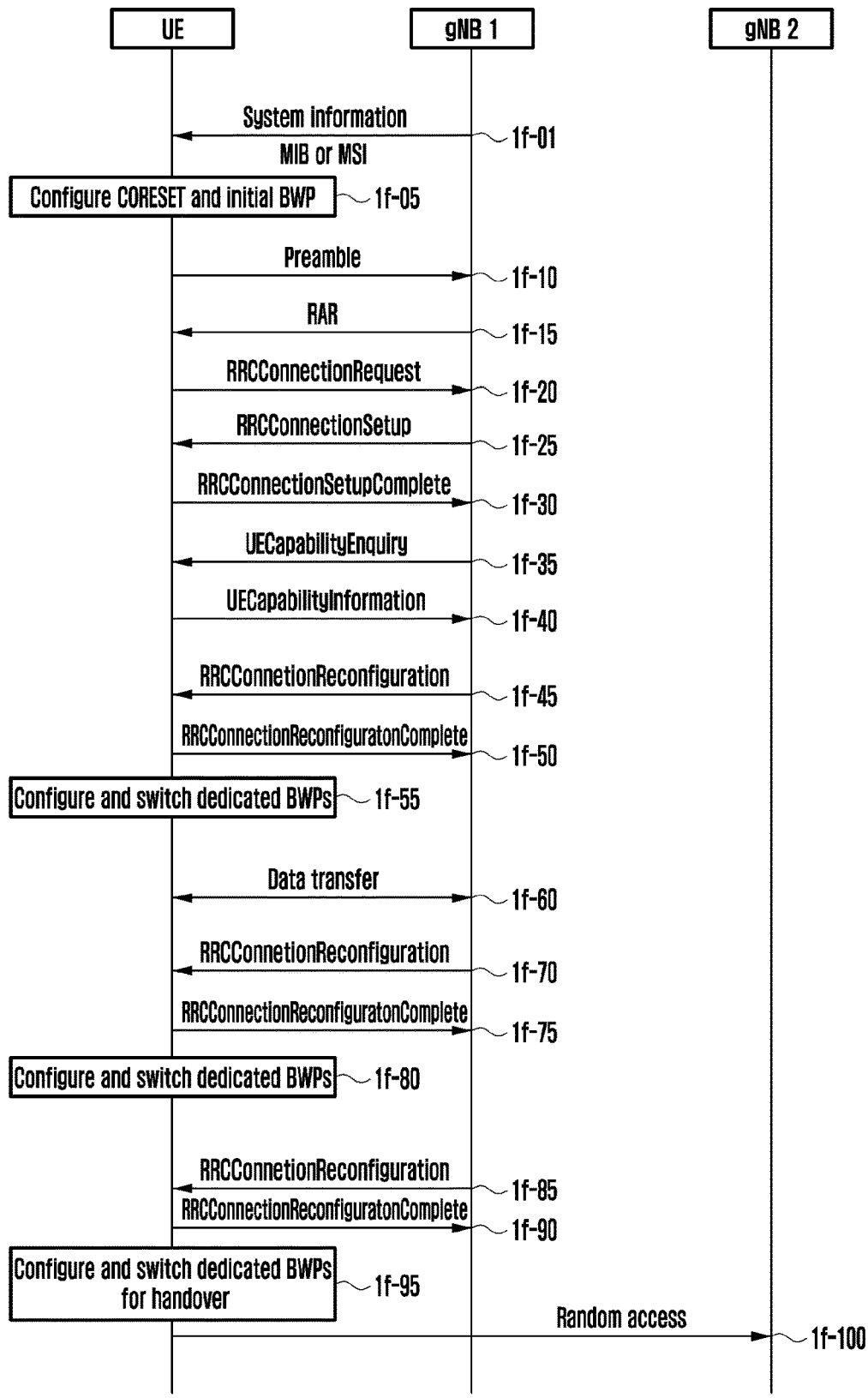
FIG. 1F illustrates a procedure in which a terminal switches from an RRC idle mode to an RRC connected mode in a next generation mobile communication system of the disclosure, and proposes a method for configuring a plurality of bandwidth parts (BWPs) and configuring a default bandwidth part (a default BWP) or a first active bandwidth part (a first active BWP)

FIG. 1F illustrates a procedure in which a terminal switches from an RRC idle mode to an RRC connected mode in a next generation mobile communication system of the disclosure, and proposes a method for configuring a plurality of bandwidth parts (BWPs) and configuring a default bandwidth part (a default BWP) or a first active bandwidth part (a first active BWP).

One cell in which a base station provides a service may service a very wide frequency band. First, a terminal may search an entire frequency band provided by an operator (PLMN) in certain units of resource blocks (for example, in units of 12 resource blocks (RBs)). That is, a terminal may start searching for a primary synchronization sequence (PSS)/secondary synchronization sequence (SSS) in an entire system bandwidth in the units of resource blocks. If a terminal detects a PSS/SSS 1E-01 or 1E-02 while searching the PSS/SSS in the units of the resource blocks, the terminal may read and interpret (decode) the signals so that the terminal can identify a boundary between a sub-frame and a radio transmission resource frame. In case that the terminal completes synchronization, the terminal may read system information of a currently camp-on cell. That is, information of a control resource set (CORESET) may be identified by identifying a master system information block (MIB) or minimum system information (MSI), and initial bandwidth part (BWP) information may be identified by reading system information 1F-01 and 1F-05. The CORESET information refers to a location of a time/frequency transmission resource to which a control signal is transmitted from a base station, and indicates, for example, a resource location to which a PDCCH channel is transmitted.

As described above, in case that a terminal completes synchronization of a downlink signal with a base station and may receive a control signal, the terminal may perform a random access procedure in an initial bandwidth part (initial BWP), receive a random access response, request RRC connection configuration, receive an RRC message, and configure RRC connection 1F-10, 1F-15, 1F-20, 1F-25, and 1F-30.

In case that basic RRC connection configuration is completed, a base station may transmit an RRC message to a terminal to inquire about the capability of the terminal so as to identify the UE capability of the terminal (UECapabilityEnquiry, 1f-35). As another method, a base station may inquire the capability of a terminal to an MME or an AMF so as to identify the capability of the terminal. It is because the MME or the AMF may have stored the capability information of the terminal if the terminal had been previously connected. If there is no terminal capability information desired by the base station, the base station may request a terminal capability to the terminal.

The base station transmits an RRC message to a terminal to identify the capability of the terminal, and thus the capability of the terminal may be identified, for example, the frequency band which the terminal may read or a readable frequency band region may be determined. In addition, after the capability of the terminal is identified, an appropriate bandwidth part (BWP) may be configured for the terminal. In case that a terminal receives an RRC message inquiring about the capability of the terminal, in response to this, the terminal may provide, from a reference center frequency to an offset, indication of a range of a bandwidth supported by the terminal or the range of a current system bandwidth in which the bandwidth is supported, may provide direct indication of a start point and an end point of a supported frequency bandwidth, or may provide indication to a center frequency and a bandwidth 1F-40.

A bandwidth part may be configured via an RRCSetup message, an RRCResume message 1F-25, or an RRCReconfiguration message 1F-45 of RRC connection configuration, and the RRC message may include configuration information for a PCell, a PSCell, or a plurality of SCells, and may configure a plurality of bandwidth parts for each of the cells (the PCell, the PSCell, or the SCells). When a plurality of bandwidth parts is configured for each of the cells, a plurality of bandwidth parts to be used in a downlink of each of the cells may be configured. In case of an FDD system, separately from downlink bandwidth parts, a plurality of bandwidth parts to be used in an uplink of each of the cells may be configured. In case of a TDD system, a plurality of bandwidth parts to be commonly used in a downlink and an uplink of each of the cells may be configured.

Information for configuring bandwidth parts of each of the cells (the PCell, the PSCell, or the SCells) may include a part of the following pieces of information.

Downlink bandwidth part configuration information of the cell(s)

Initial downlink bandwidth part (initial downlink BWP) configuration information A plurality of bandwidth part configuration information, and a bandwidth part identifier (BWP ID) corresponding to each of bandwidth parts Initial state configuration information of a downlink bandwidth part of the cell(s) (for example, an active state, a dormant state, or a deactivated (inactive) state)

A bandwidth part identifier for indicating a first active downlink bandwidth part (first active downlink BWP)

A bandwidth part identifier for indicating a default bandwidth part (default BWP)

Configuration information for PDCCH monitoring for each of bandwidth parts. For example, CORESET information, search space resource information, PDCCH transmission resource, period, sub-frame number information, or the like A bandwidth part identifier for indicating a dormant bandwidth part, or a 1 bit indicator for indicating a dormant bandwidth part for each of bandwidth parts in the bandwidth part configuration information Bandwidth part inactive timer configuration and a timer value Uplink bandwidth part configuration information of the cell(s)

Initial uplink bandwidth part (initial uplink BWP) configuration information

A plurality of bandwidth part configuration information, and a bandwidth part identifier (BWP ID) corresponding to each of bandwidth parts Initial state configuration information of an uplink bandwidth part of the cell(s) (for example, an active state, a dormant state, or a deactivated state)

A bandwidth part identifier for indicating a dormant bandwidth part, or a 1 bit indicator for indicating a dormant bandwidth part for each of bandwidth parts in the bandwidth part configuration information A bandwidth part identifier for indicating a first active uplink bandwidth part (first active uplink BWP)

An initial bandwidth part (initial BWP), a default bandwidth part (default BWP), or a first active bandwidth part (first active BWP) configured as described above may be used for the following tasks and may be operated as follows according to the tasks.

The initial bandwidth part (initial BWP) may be used as a bandwidth part determined at a cell level (cell-specific) and present as one for each of cells, and may be used as a bandwidth part for allowing a terminal accessing a cell first to configure connection for the cell via a random access procedure or a terminal, for which connection has been configured, to perform synchronization. In addition, a base station may configure, for each of cells, an initial downlink bandwidth part (initial downlink BWP) to be used in a downlink and an initial uplink bandwidth part (initial uplink BWP) to be used in an uplink. Moreover, configuration information for the initial bandwidth part may be transmitted (broadcast) from first system information (system information 1, SIB1) indicated by CORESET, and may be reconfigured by a base station for a connected terminal by an RRC message. Furthermore, the initial bandwidth part may be used after being designated as no. 0 of a bandwidth part identifier in each of an uplink and a downlink. That is, any terminal accessing the same cell may use the same initial bandwidth part after identically designating the initial bandwidth part as bandwidth part identifier no. 0. It is because, when a random access procedure is performed, a base station may transmit a random access response (RAR) message to an initial bandwidth part readable by any terminal and thus there may be an advantage of facilitating a contention-based random access procedure.

The first active bandwidth part (first active BWP) may be configured to be different for each of terminals (UE-specific) and may be indicated from among a plurality of bandwidth parts by designation by a bandwidth part identifier. The first active bandwidth part may be configured for each of a downlink and an uplink and may be configured, by bandwidth part identifier, as each a first active downlink bandwidth part (first active downlink BWP) and a first active uplink bandwidth part (first active uplink BWP). When a plurality of bandwidth parts is configured for one cell, the first active bandwidth part may be used to indicate which bandwidth part is to be activated first to be used. For example, when a PCell, a PSCell, and a plurality of SCells are configured for a terminal and a plurality of bandwidth parts are configured for each of the PCell, the PSCell, or the SCells, if the PCell, the PSCell, or the SCell is activated, the terminal may activate and use a first active bandwidth part (first active BWP) from among the plurality of bandwidth parts configured for the PCell, the PSCell, or the SCells. That is, a first active downlink bandwidth part (first active downlink BWP) may be activated and used for a downlink, and a first active uplink bandwidth part (first active uplink BWP) may be activated and used for an uplink.

An operation in which a terminal, for an SCell, switches a downlink bandwidth part to be activated to a first active downlink bandwidth part and switches an uplink bandwidth part to be activated to a first active uplink bandwidth part may be performed when indication of activating an SCell or a bandwidth part of an SCell from a deactivated state or a dormant state is received or indication of switching a deactivated or dormant bandwidth part to an active bandwidth part is received via an RRC message, MAC control information, or DCI. In addition, when indication of shifting an SCell or a bandwidth part to a dormant state or indication of switching to a dormant bandwidth part is received via an RRC message, MAC control information, or DCI, a bandwidth part may be switched to a dormant bandwidth part or the bandwidth part may be made to be dormant. Being made dormant may mean that an operation proposed in a dormant state is performed. That is, without performing PDCCH monitoring, an operation of measuring a channel for a downlink bandwidth part (or a dormant bandwidth part) and reporting the measured channel to a base station may be performed. As another method, when an SCell or a bandwidth part is activated, a downlink bandwidth part and an uplink bandwidth part are to be switched to be activated to a first active downlink bandwidth part and to be activated to a first active uplink bandwidth part, respectively, and thus a base station may effectively use a carrier aggregation technology only if a frequency/channel should be measured and reported for a first active downlink/uplink bandwidth part when a channel measurement report is performed in a dormant state although a dormant state is indicated or switching to a dormant bandwidth part is indicated.

A default bandwidth part (default BWP) may be configured to be different for each of terminals (UE-specific) and may be designated and indicated from among a plurality of bandwidth parts by a bandwidth part identifier. The default bandwidth part may be configured only for a downlink. The default bandwidth part may be used as a bandwidth part to fall back after a certain period of time from an active bandwidth part from among a plurality of downlink bandwidth parts. For example, a bandwidth part inactive timer (BWP inactivity timer) may be configured for each of cells or each of bandwidth parts via an RRC message, and the timer may start or restart at the time of the occurrence of data transmission/reception in an active bandwidth part, not in a default bandwidth part, or may start or restart at the time of a switch of an active bandwidth part to another bandwidth part. When the timer expires, a terminal may allow a downlink bandwidth part activated for a cell to fall back or switch to a default bandwidth part. The switching may mean a procedure of deactivating (inactivating) a current active bandwidth part and activating a bandwidth part to which indication of the switching has been provided, and the switching may be triggered by an RRC message, MAC control information (a MAC control element), or L1 signaling (downlink control information (DCI) of a PDCCH). The switching may be triggered by indicating a bandwidth part to be switched or to be activated, and a bandwidth part may be indicated by a bandwidth part indicator (for example, 0, 1, 2, 3, or 4).

The default bandwidth part is applied and used only for a downlink because a base station allows a terminal to fall back to a default bandwidth part for each of cells after a certain period of time to receive indication (for example, DCI of a PDCCH) from the base station and thus base station scheduling may be facilitated. For example, if a base station configures, as initial bandwidth parts, default bandwidth parts of terminals accessing one cell, the base station may continuously perform scheduling indication only in the initial bandwidth parts after a certain period of time. In case that the default bandwidth parts are not configured in an RRC message, initial bandwidth parts may be considered as the default bandwidth parts which may fall back to initial bandwidth parts when a bandwidth part inactive timer expires.

As another method, in order to enhance the freedom of implementation of a base station, a default bandwidth part may be also defined and configured for an uplink and may be used as a default bandwidth part of a downlink.

In addition, in an RRCSetup message, an RRCResume message 1F-25, or an RRCReconfiguration message 1F-45 of RRC connection configuration, a state shift timer may be configured to allow a terminal to autonomously perform a state shift although the terminal does not receive indication by an RRC message, MAC control information, or DCI of a PDCCH. For example, a cell deactivation timer (ScellDeactivationTimer) may be configured for each of SCells, and the SCells may be shifted to a deactivated state if the cell deactivation (inactive) timer expires. Otherwise, by configuring a downlink (or uplink) bandwidth part dormant timer (DLBWPHibernationTimer or ULBWPHibernationTimer) for each of bandwidth parts and by configuring a cell dormant timer (ScellHibernationTimer) for each of SCells, the SCells or a downlink (or uplink) bandwidth part may be shifted to a dormant state or switched to a dormant bandwidth part if the cell dormant timer or the downlink (or uplink) bandwidth part dormant timer expires. For example, in case that the cell dormant timer or the downlink (or uplink) bandwidth part dormant timer expires, an active SCell or downlink (or uplink) bandwidth part is shifted to a dormant state or switched to a dormant bandwidth part, and a deactivated or dormant SCell or downlink (or uplink) bandwidth part is not shifted to a dormant state or a dormant bandwidth part. In addition, for each of SCells or a downlink (or uplink) bandwidth part, a dormant state cell deactivation timer (dormantScellDeactivationTimer) or a dormant state or downlink (or uplink) dormant bandwidth part inactive timer (dormantDLDeactivationTimer or dormantULDeactivationTimer) may be configured to shift a dormant SCell or downlink (or uplink) dormant bandwidth part to a deactivated state. In case that the dormant state cell deactivation timer or the dormant state or downlink (or uplink) dormant bandwidth part inactive (deactivation) timer expires, only a dormant SCell or downlink (or uplink) bandwidth part is shifted to a deactivated state, and an active or deactivated SCell or downlink (or uplink) bandwidth part is not shifted to a deactivated state. If the cell deactivation timer (ScellDeactivationTimer) (or the downlink (or uplink) bandwidth part dormant timer) and the cell dormant timer (ScellHibernationTimer) (or the downlink (or uplink) dormant bandwidth part inactive timer) are configured together, the cell dormant timer (ScellHibernationTimer) (or the downlink (or uplink) bandwidth part dormant timer) is prioritized. That is, in case that a cell dormant timer (ScellHibernationTimer) (or a downlink (or uplink) bandwidth part dormant timer) is configured, a corresponding SCell or downlink (or uplink) bandwidth part is not deactivated although a cell deactivation timer (ScellDeactivationTimer) (or a downlink (or uplink) dormant bandwidth part inactive (deactivation) timer) expires. In other words, in case that a cell dormant timer (or a downlink (or uplink) bandwidth part dormant timer) is configured, the SCell or downlink (or uplink) bandwidth part is shifted from an active state to a dormant state first due to the expiration of the timer or is switched to a dormant bandwidth part, and the cell or the bandwidth part shifted to a dormant state is gradationally re-shifted to a deactivated state due to the expiration of a dormant state cell deactivation timer or bandwidth part inactive (deactivation) timer. Accordingly, in case that a cell dormant timer or bandwidth part dormant timer is configured, a cell deactivation timer or a dormant bandwidth part deactivation timer does not affect shifting of the state of an SCell or a downlink (or uplink) bandwidth part. In case that a cell dormant timer or a bandwidth part dormant timer is configured, an SCell or a downlink (or uplink) bandwidth part is not immediately shifted to a deactivated state although a cell deactivation timer or a dormant bandwidth part deactivation timer expires.

In case that a cell deactivation timer (or a downlink (or uplink) bandwidth part deactivation timer) is not configured for an RRC message, a terminal may consider that the cell deactivation timer (or the downlink (or uplink) bandwidth part inactive (deactivation) timer) is configured in an infinite value.

In addition, in an RRC setup message, an RRCResume message 1F-25, or an RRCReconfiguration message 1F-45 of RRC connection configuration, frequency measurement configuration information, frequency measurement gap configuration information, and the like may be configured, and information on a frequency measurement object may be included. A frequency measurement report target may include bandwidth part information for which a reference signal (RS)/synchronization signal (SS) is configured, and a center frequency, a bandwidth corresponding to a bandwidth part, a time pattern needed to be applied at the time of measurement, and the like may be included. Measurement report gap information may include a measurement gap length, measurement gap period, and measurement gap start time information corresponding to how long time to perform measurement. The RS refers to a signal of a base station, which is transmitted with a partial time/frequency pattern in a transmission resource of a sub-frame in which a control signal or a data signal is transmitted, and may be used to determine the intensity of a signal of a corresponding cell or a corresponding bandwidth part. The SS is a synchronization signal, such as PSS or SSS, which is periodically transmitted, and may be also used to determine the intensity of a signal of a corresponding cell or a corresponding bandwidth part.

In addition, in an RRCSetup message, an RRCResume message 1F-25, or an RRCReconfiguration message 1F-45 of RRC connection configuration, scheduling information may be included for each of cells.

The scheduling information for each of cells may include a part of the following pieces of information.

Cross-carrier scheduling configuration information

Scheduling cell information

Own indicator (indicating that there is no cross-carrier scheduling, that is, indicating self-scheduling) and a carrier indicator field (CIF) indicator (cif-Presence, indicating whether or not a CIF filed is present in a DCI format of a PDCCH)

Other indicators (indicating that there is cross-carrier scheduling), cell indicators (schedulingCellId, ServCellIndex) indicating from which cell cross-carrier scheduling is to be received, and a CIF indicator (cif-InSchedulingCell) for separating a cell scheduled or to be scheduled from cells which receive scheduling Dormant bandwidth part identifier or a dormant bandwidth part configuration indicator (when a dormant bandwidth part is configured for a current cell and a dormant bandwidth part is used or when switching is performed on a dormant bandwidth part (BWP switching), an indicator or configuration information for reception of indication of scheduling in another cell by cross-carrier scheduling or bandwidth part switching)

In case that RRC connection configuration is completed as described above, a terminal may configure a plurality of bandwidth parts according to indication configured by an RRC message. In addition, one or a small number of a plurality of configured bandwidth parts may be activated so as to save a battery. For example, one bandwidth part to be activated may be indicated. Moreover, a base station may indicate activation of a bandwidth part via an RRC message, MAC control information (a MAC CE), or L1 signaling (a PHY layer control signal such as a PDCCH) (for example, activation or deactivation may be indicated by bitmap information) to indicate switching from an initial access bandwidth part to a new bandwidth part. Since there may be many new users accessing the initial access bandwidth part, it may be more advantageous, in terms of scheduling, to assign a new bandwidth part and separately manage connected users. It is because the initial access bandwidth part is not configured for each of terminals but may be shared and used in common for all terminals. Furthermore, to reduce signaling overhead, a default bandwidth part may be dynamically indicated by MAC control information, L1 signaling, or system information.

In the disclosure below, newly proposed is a dormant bandwidth part in a next generation mobile communication system, and proposed is a method for supporting three state shifts for a bandwidth part.

Figure 1G:
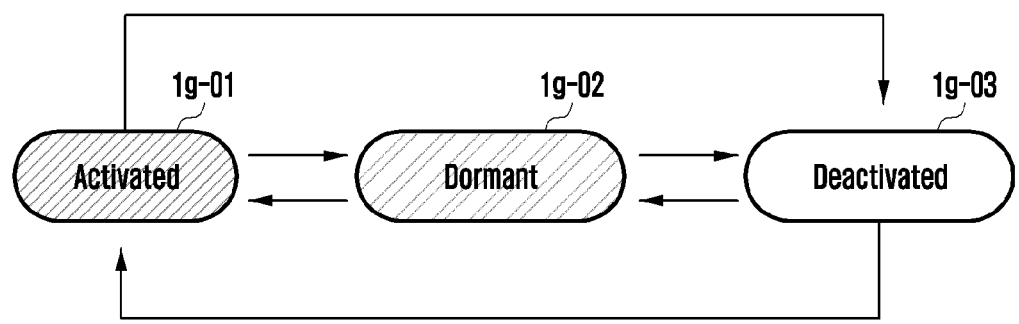
FIG. 1G illustrates a bandwidth part-specific state shift (switching) procedure proposed by the disclosure.

FIG. 1G shows a bandwidth part-specific state shift (switching) procedure proposed by the disclosure.

As in FIG. 1G, a bandwidth part of each of cells of a terminal may have an active state 1G-01, a deactivated state 1G-03, or a dormant state 1G-02, or a state may be shifted by indication by RRC message configuration information, MAC control information, or DCI of a PDCCH.

An SCell bandwidth part-specific state shift operation (activation, deactivation, or hibernation) proposed by the disclosure may be performed in the following cases.

In case that a state of a bandwidth part of an SCell is configured by an RRC message or in case that a bandwidth part of each of SCells is configured by an RRC message and a dormant bandwidth part is configured for the SCell, the SCell may start after switching to a dormant bandwidth part and an operation in a dormant bandwidth part may be performed.

In case that an SCell activation, deactivation, or hibernation MAC CE is received, In case that a bandwidth part activation, deactivation, or hibernation MAC CE is received, In case that a cell dormant timer is not configured for an active state SCell and a configured cell deactivation timer expires, In case that a bandwidth part dormant timer is not configured for an active state bandwidth part and a configured bandwidth part state inactive (deactivation) timer (for example, bwpDeactivatedTimer) expires, In case that a cell dormant (hibernation) timer configured for an active state SCell expires, In case that a bandwidth part dormant timer configured for an active state bandwidth part expires, In case that a dormant state SCell deactivation timer configured for a dormant state SCell expires, In case that a dormant bandwidth part inactive (deactivation) timer (dormantBWPDeactivatedTimer) configured for a dormant bandwidth part expires, In addition, a state shift operation proposed by the disclosure may be characterized as follows.

An SPCell (a PCell or a PSCell) (or downlink bandwidth part or uplink bandwidth part of the cell) may not be shifted to a dormant state, and is always activated. Since the SPCell synchronizes and transmits/receives a main control signal, in case that the SPCell is made to be dormant or is deactivated, connection to a base station is canceled, and thus an active state should be always maintained.

In case that a PUCCH is configured despite a bandwidth part of an SCell or a bandwidth part of the SCell, shifting to a dormant state may not be performed. Since there may be another cell which should transmit a feedback such as HARQ ACK/NACK through a PUCCH, an active state should be maintained.

Due to the above-described features, a cell deactivation timer (ScellDeactivationTimer) is also not applied to an SPCell or a bandwidth part of the SPCell, and SCell for which a PUCCH is configured or a bandwidth part of the SCell, and may be driven only for other SCells.

A cell or bandwidth part dormant timer (ScellHibernationTimer) is prioritized than a cell or bandwidth part state deactivation timer (ScellDeactivationTimer). In addition, if one timer value is configured as an RRC message, the same timer value may be applied to all cells. As another method, a base station may configure different timer values for each of SCells or for each of BWPs by considering SCell-specific or BWP-specific characteristics.

If an SCell or a bandwidth part is not provided with indication of activation or hibernation in an RRC message, the SCell or the bandwidth part is basically operated in a deactivated state.

In the disclosure, an uplink may indicate an uplink bandwidth part, and a downlink may indicate a downlink bandwidth part. It is because only one active or dormant bandwidth part may be operated for each uplink or downlink.

In the disclosure below, specifically proposed is a method for operating a state shift mode in units of bandwidth parts (bandwidth part-level), such that a carrier aggregation technology may be rapidly activated and a battery of a terminal may be saved.

In the disclosure, as explained in FIG. 1F above, a bandwidth part may be configured via an RRCSetup message, an RRCReconfiguration message, or an RRCResume message. The RRC message may include configuration information for a PCell, a PSCell, or a plurality of SCells, and may configure a plurality of bandwidth parts for each of the cells (the PCell, the PSCell, or the SCells). When a plurality of bandwidth parts is configured for each of the cells in the RRC message, a plurality of bandwidth parts to be used in a downlink of each of the cells may be configured. In case of an FDD system, separately from downlink bandwidth parts, a plurality of bandwidth parts to be used in an uplink of each of the cells may be configured. In case of a TDD system, a plurality of bandwidth parts to be commonly used in a downlink and an uplink of each of the cells may be configured.

A first method of an information configuration method for configuring a bandwidth part of each of cells (PCells, PSCells or SCells) may include one or a plurality of information among the following pieces of information and may introduce a new indicator to bandwidth parts to indicate whether each of the bandwidth parts is a normal bandwidth part (for example, a bandwidth part which may be operated or configured in an active state or a deactivated state) or a dormant bandwidth part (for example, a bandwidth part which may be operated or configured in a dormant state). For example, whether or not a bandwidth part is a dormant bandwidth part may be indicated using a bandwidth part identifier.

Downlink bandwidth part configuration information of each of cells

Initial downlink bandwidth part (initial downlink BWP) configuration information A plurality of bandwidth part configuration information, and a bandwidth part identifier (BWP ID) corresponding to each of bandwidth parts Initial state configuration information of a downlink of the cells (for example, an active state, a dormant state, or a deactivated state)

A bandwidth part identifier for indicating a first active downlink bandwidth part (first active downlink BWP)

A bandwidth part identifier for indicating a default bandwidth part (default BWP)

A bandwidth part identifier for indicating a dormant bandwidth part, or a 1 bit indicator for indicating a dormant bandwidth part for each of bandwidth parts in the bandwidth part configuration information Bandwidth part inactive timer configuration and a timer value Uplink bandwidth part configuration information of each of cells Initial uplink bandwidth part (initial uplink BWP) configuration information A plurality of bandwidth part configuration information, and a bandwidth part identifier (BWP ID) corresponding to each of bandwidth parts Initial state configuration information of an uplink of the cells (for example, an active state, a dormant state, or a deactivated state)

A bandwidth part identifier for indicating a first active uplink bandwidth part (first active uplink BWP)

A bandwidth part identifier for indicating a dormant bandwidth part, or a 1 bit indicator for indicating a dormant bandwidth part for each of bandwidth parts in the bandwidth part configuration information As another method of an information configuration method for configuring a bandwidth part of each of cells (PCells, PSCells or SCells), a second method may not configure configuration information (for example, a search space, a PDCCH transmission resource, a period, or the like) required to read (detect) a PDCCH for a bandwidth part corresponding to a dormant bandwidth part (a cycle may be configured to be very long along with other configuration information by another method), and may configure configuration information (for example, a search space, a PDCCH transmission resource, a period, or the like) required to read a PDCCH for a general bandwidth part, so as to distinguish information. It is because a dormant bandwidth part is a bandwidth part which does not read a PDCCH to reduce battery consumption of a terminal, performs channel measurement, and reports a channel measurement result to a PCell, thereby enabling rapid bandwidth part or cell activation and enabling rapid assignment of an uplink or downlink transmission resource. Accordingly, in the disclosure, a dormant bandwidth part may indicate a bandwidth part for which configuration information for PDCCH monitoring (for example, a search space, a PDCCH transmission resource, a period, or the like) is not configured, or may mean a bandwidth part indicated by a dormant bandwidth part identifier or a bandwidth part configured to perform monitoring with a very long period although configuration information for PDCCH monitoring is configured therefor. As another method, in the disclosure, in a dormant bandwidth part, a PDCCH transmission resource, a period, or the like is not configured in configuration information for PDCCH monitoring, and thus configuration is made such that PDCCH monitoring is not performed in a cell for which the dormant bandwidth part is configured. However, search space information or cross-carrier scheduling configuration information is configured, and thus a bandwidth part which enables another cell to receive switching or indication for the dormant bandwidth part may be indicated by cross-carrier scheduling. In the dormant bandwidth part, data transmission or reception is impossible, and thus only PDCCH configuration information (PDCCH-config) is configured (for example, only search space information is configured) for the dormant bandwidth part (or a first bandwidth part). On the other hand, in a general bandwidth part (or a second bandwidth part) which is not a dormant bandwidth part, PDCCH monitoring should also be performed, and data transmission or reception should also be possible. Thus, PDCCH configuration information (for example, CORESET configuration information, search space configuration information, a PDCCH transmission resource or period, or the like), PDSCH configuration information, PUSCH configuration information, random access-related configuration information, or the like may be further configured.

Therefore, as described above, an uplink or downlink general bandwidth part should be configured for each of cells. However, a dormant bandwidth part may be configured for each of cells or may not be configured, and configuration may depend on base station implementation according to a task thereof. In addition, according to base station implementation, a first active bandwidth part, a default bandwidth part, or an initial bandwidth part may be configured as a dormant bandwidth part.

In a dormant mode bandwidth part, a terminal may not transmit or receive data to or from a base station and does not monitor a PDCCH for identifying indication of the base station. In addition, a terminal does not also transmit a pilot signal, but performs channel measurement and reports a measurement result for a measured frequency/cell/channel according to base station configuration, either periodically or when an event occurs. Accordingly, a terminal may save a battery compared to an active mode because a PDCCH is not monitored and a pilot signal is not transmitted in a dormant bandwidth part. Moreover, since a channel measurement report is performed unlike a deactivated mode, a base station may rapidly activate, based on a measurement report of a dormant bandwidth part, a cell for which the dormant bandwidth part is configured, and may rapidly use a carrier aggregation technology. Furthermore, in the disclosure, a dormant bandwidth part may be configured in downlink bandwidth part configuration information and may be used only for a downlink bandwidth part.

In the disclosure, a terminal operation for a dormant bandwidth part (a dormant BWP) is as follows.

If a terminal is indicated to operate in a dormant bandwidth part for a serving cell (a PCell or an SCell), if indication of hibernation of a bandwidth part (for example, a downlink bandwidth part) of a current cell (a PCell or an SCell) or the cell is received by DCI (an L1 control signal) of a PDCCH, a MAC CE, or an RRC message, if indication of switching a bandwidth part (for example, a downlink bandwidth part) to a dormant bandwidth part is received by DCI (an L1 control signal) of a PDCCH, a MAC CE, or an RRC message (in case that indication is received by an L1 control signal of a PDCCH, indication may be received in a PDCCH of an own cell by self-scheduling or indication may be received in a PDCCH for a PCell in the cell by cross-carrier scheduling), or if a bandwidth part dormant timer has been configured and the timer has expired, one or a plurality of the following operations may be performed.

Switching to an uplink or downlink bandwidth part indicated above or a designated bandwidth part (for example, a dormant bandwidth part) is performed, and the bandwidth part is made to be dormant.

A cell deactivation (inactive) timer which is configured for in the cell or the bandwidth part or which is being operated is stopped.

If a bandwidth part dormant timer is configured for the bandwidth part of the cell, the bandwidth part dormant timer is stopped.

In the bandwidth part of the cell, a dormant state bandwidth part inactive timer starts or restarts.

A bandwidth part inactive timer configured for the bandwidth part of the cell is stopped. This is to prevent an unnecessary bandwidth part switching procedure in the cell.

A periodic downlink transmission resource (DL SPS or configured downlink assignment) or a periodic uplink transmission resource (UL SPS or configured uplink grant type 2) configured in a bandwidth part of the cell may be released (cleared). In the above, releasing (clearing) means that configuration information such as cycle information configured in an RRC message is stored in a terminal, but information on a periodic transmission resource indicated or activated by L1 signaling (for example, DCI) is removed and is no longer used. The method proposed above, that is, an operation of releasing (clearing) a configured periodic downlink transmission resource (DL SPS or configured downlink assignment) or a configured periodic uplink transmission resource (UL SPS or configured uplink grant) may be performed only in case that a bandwidth part is shifted from an active state to a dormant state. It is because in case that a bandwidth part shifts from a deactivated state to a dormant state, there is no information on periodic transmission resource information indicated or activated by L1 signaling. As another method, periodic transmission resources may be released only in case that a periodic downlink transmission resource or a periodic uplink transmission resource is configured or is configured and used.

A periodic uplink transmission resource (configured uplink grant Type 1 configured by RRC) configured in the bandwidth part of the cell may be suspended (stopped). In the above, suspending (stopping) means that transmission resource configuration information configured in an RRC message is stored in a terminal but is no longer used. The method proposed above, that is, an operation of suspending a configured periodic uplink transmission resource (configured uplink grant type 1) may be performed only in case that a bandwidth part is shifted from an active state to a dormant state. It is because in case that a bandwidth part shifts from a deactivated state to a dormant state, a periodic transmission resource is not being used. As another method, periodic transmission resources may be released only in case that a periodic downlink transmission resource or a periodic uplink transmission resource is configured or is configured and used.

All HARQ buffers configured in an uplink or downlink bandwidth part are emptied.

A terminal does not transmit an SRS for an uplink bandwidth part of the cell.

In the bandwidth part of the cell, a terminal performs channel measurement (CSI, CQI, PMI, RI, PTI, CRI, or the like) according to configuration of a base station for a downlink and performs a measurement report. For example, a channel or frequency measurement report may be periodically performed.

In the bandwidth part of the cell, uplink data is not transmitted by UL-SCH.

A random access procedure is not performed for the bandwidth part of the cell.

In the bandwidth part of the cell, a terminal does not monitor a PDCCH.

A terminal does not monitor a PDCCH for the bandwidth part of the cell. However, in case of cross-scheduling, a PDCCH for the cell (for example, the SCell) may be monitored and indicated in a scheduled cell (for example, a PCell).

PUCCH or SPUCCH transmission is not performed in the bandwidth part of the cell.

The downlink bandwidth part may be made to be dormant, channel measurement may be performed and reported, and the uplink bandwidth part of the cell may be deactivated and may not be used. It is because channel measurement is performed only for a downlink bandwidth part in a dormant SCell and a measurement result is reported in the uplink bandwidth part of the SCell with a PUCCH or an SPCell (a PCell or a PSCell).

If switching to a dormant bandwidth part is indicated for the downlink or hibernation is indicated for the bandwidth part, a random access procedure may be performed without being canceled. It is because when a random access procedure is performed in an SCell, a preamble is transmitted to an uplink and a random access response is received to a downlink of a PCell. Accordingly, although the downlink bandwidth part is made to be dormant or is switched to a dormant bandwidth, no problem occurs.

In the disclosure, a terminal operation for an active bandwidth part (an active BWP) is as follows.

If indication of activation of a bandwidth part (for example, a downlink bandwidth part) of a current cell (a PCell or an SCell) or the cell is received by DCI (an L1 control signal) of a PDCCH, a MAC CE, or an RRC message, or if indication of switching a bandwidth part (for example, a downlink bandwidth part) to an active bandwidth part (or a bandwidth part which is not a dormant bandwidth part) is received by DCI (an L1 control signal) of a PDCCH, a MAC CE, or an RRC message (in case that indication is received by an L1 control signal of a PDCCH, indication may be received in a PDCCH of an own cell by self-scheduling or indication may be received in a PDCCH for a PCell in the cell by cross-carrier scheduling), one or a plurality of the following operations may be performed.

Switching to an uplink or downlink bandwidth part indicated above and activation are performed. Otherwise, an uplink or downlink bandwidth part is switched to a designated bandwidth part (for example, an uplink or uplink first active bandwidth part), and the bandwidth part is activated.

In the activated bandwidth part, a terminal transmits a sounding reference signal (SRS) so that a base station can perform channel measurement for an uplink. For example, periodical transmission may be performed.

If a PUCCH is configured in the activated bandwidth part, PUCCH transmission is performed.

In relation to the above, a bandwidth part inactive timer or cell deactivation timer starts or restarts. As another method, a bandwidth part inactive timer or cell deactivation timer may start or restart only in case that a bandwidth part dormant timer or cell dormant timer is not configured. If the bandwidth part dormant timer or cell dormant timer may be configured by an RRC message, a bandwidth part or a cell may be made to be dormant when the timer expires. For example, the bandwidth part inactive timer or cell deactivation timer may start or restart only in the dormant bandwidth part or cell.

If there is a type 1 configuration transmission resource of which a use is suspended (stopped), a stored type 1 transmission resource may be initialized and used according to original configuration. The type 1 configuration transmission resource is a periodic transmission resource (an uplink or a downlink) assigned in advance by an RRC message and means a transmission resource which may be activated and used by an RRC message.

PHR is triggered for the bandwidth part.

In the activated bandwidth part, a terminal may report a channel measurement result (CSI, CQI, PMI, RI, PTI, or CRI) according to base station configuration for a downlink.

A PDCCH is monitored to read indication of a base station in the activated bandwidth part.

A PDCCH is monitored to read cross-scheduling for the activated bandwidth part.

In relation to the above, a bandwidth part inactive timer starts or restarts. As another method, a bandwidth part inactive timer may start or restart only in case that a bandwidth part dormant timer is not configured. If the bandwidth part dormant timer may be configured by an RRC message, a bandwidth part may be made to be dormant or may be switched to a dormant bandwidth part when the timer expires. For example, the bandwidth part inactive timer may start or restart only in the dormant bandwidth part.

If a link bandwidth part dormant timer is configured for the bandwidth part, a bandwidth part dormant timer starts or restarts for the bandwidth part.

In the disclosure, a terminal operation for a deactivated (inactive) bandwidth part (a deactivated BWP) is as follows.

If indication of deactivation of a bandwidth part (for example, a downlink bandwidth part) of a current cell (a PCell or an SCell) or the cell is received by DCI (an L1 control signal) of a PDCCH, a MAC CE, or an RRC message, if indication of deactivating a bandwidth part (for example, a downlink bandwidth part) or switching the bandwidth part to an inactive bandwidth part is received by DCI (an L1 control signal) of a PDCCH, a MAC CE, or an RRC message (in case that indication is received by an L1 control signal of a PDCCH, indication may be received in a PDCCH of an own cell by self-scheduling or indication may be received in a PDCCH for a PCell in the cell by cross-carrier scheduling), or if a bandwidth part inactive timer or cell deactivation (inactive) timer has expired in the cell, one or a plurality of the following operations may be performed.

An uplink bandwidth part or downlink bandwidth part of the cell indicated above is deactivated.

A terminal stops a bandwidth part inactive timer (for example, an inactive timer for a downlink bandwidth part) which is configured and operated in the cell or the bandwidth part.

A periodic downlink transmission resource (DL SPS or configured downlink assignment) or a periodic uplink transmission resource (UL SPS or configured uplink grant type 2) configured in the cell or the bandwidth part may be released (cleared). In the above, releasing (clearing) means that configuration information such as cycle information configured in an RRC message is stored in a terminal, but information on a periodic transmission resource indicated or activated by L1 signaling (for example, DCI) is removed and is no longer used. The periodic transmission resource may be referred to as a type 2 configuration transmission resource. In addition, an operation of releasing the periodic transmission resource may be performed only when the SCell shifts from an active state to a deactivated state. It is because when shifting from a dormant state to an inactive state is performed, there is no periodic transmission resource in a dormant state and thus a releasing operation is also not required. As another method, periodic transmission resources may be released only in case that a periodic downlink transmission resource or a periodic uplink transmission resource is configured or is configured and used.

A periodic uplink transmission resource (configured uplink grant type 1 configured by RRC) configured in the cell or the bandwidth part may be suspended (stopped). In the above, suspending (stopping) means that transmission resource configuration information configured in an RRC message is stored in a terminal but is no longer used. The periodic transmission resource may be referred to as a type 1 configuration transmission resource. In addition, an operation of releasing the periodic transmission resource may be performed only when the SCell shifts from an active state to a deactivated state. It is because when shifting from a dormant state to a deactivated state is performed, there is no periodic transmission resource in a dormant state and thus a releasing operation is also not required. As another method, periodic transmission resources may be released only in case that a periodic downlink transmission resource or a periodic uplink transmission resource is configured or is configured and used.

All HARQ buffers configured for the cell or the bandwidth part emptied.

If there is a PUSCH transmission resource configured for a periodic channel measurement report (semi-persistent CSI reporting) for the cell or the bandwidth part, releasing (clearing) is performed.

A terminal does not transmit an SRS for the cell or the bandwidth part.

For the cell or the bandwidth part, a terminal does not perform and report channel measurement (CSI, CQI, PMI, RI, PTI, or CRI) for a downlink.

In the cell or the bandwidth part, uplink data is not transmitted by UL-SCH.

A random access procedure is not performed for the cell or the bandwidth part.

In the cell or the bandwidth part, a terminal does not monitor a PDCCH.

A terminal does not monitor a PDCCH for the cell or the bandwidth part. In addition, in case of cross-scheduling, a PDCCH for the cell is not monitored in a scheduled cell.

PUCCH or SPUCCH transmission is not performed in the cell or the bandwidth part.

In the disclosure, an active state, an inactive state, or a dormant state is operated, and when a cell or a bandwidth part is shifted or switched, shifting or switching is performed in units of bandwidth parts. When shifting or switching occurs in units of bandwidth parts, a bandwidth part (a downlink bandwidth part or an uplink bandwidth part) indicated to shift or switch a state shifts or switches a state according to indication of shifting or switching a state. For example, if a bandwidth part (a downlink or uplink bandwidth part) shifts from an active state to a dormant state or shifts to a dormant bandwidth part, shifting to a dormant state or switching to a dormant bandwidth part may be performed by the bandwidth part.

In the disclosure, bandwidth part switching (BWP switching) means that: at the time of indicating bandwidth part switching by DCI of a PDCCH, if switching is indicated by a bandwidth part identifier while downlink assignment is assigned, a downlink bandwidth part is switched to a bandwidth part indicated by the bandwidth part identifier; and at the time of indicating bandwidth part switching by DCI of a PDCCH, if switching is indicated by a bandwidth part identifier while UL grant is assigned, an uplink bandwidth part is switched to a bandwidth part indicated by the bandwidth part identifier. In addition, in a DCI format of a PDCCH, a format (format 1) for downlink assignment and a format (format 0) for UL grant are difference from each other, and thus a terminal operation may be operated according to the DCI format although an uplink and a downlink are not separately explained.

In the disclosure, a method for operating a state shift (or bandwidth part switching) in units of bandwidth parts (bandwidth part level) and an operation of a bandwidth part according to each of states, proposed above, may be expanded and applied to various embodiments. In the disclosure below, specific embodiments to which the above-proposed description of the disclosure is expanded and applied will be explained.

In the disclosure, a first embodiment of shifting a state (or switching a bandwidth part) in units of bandwidth parts and operating an operation according thereto is as follows.

In the first embodiment, when a plurality of bandwidth parts is configured for each of cells in a terminal by an RRC message, a dormant bandwidth part is configured by an indicator or a bandwidth part identifier, as in FIG. 1F. In addition, a base station indicates switching a bandwidth part to a dormant bandwidth part for an active cell by using DCI of a PDCCH, which is L1 signaling. In the dormant bandwidth part, monitoring of a PDCCH is not performed, and data transmission or reception is not performed, but a channel measurement report is performed so as to reduce consumption of a terminal battery and allow rapid bandwidth part activation. A base station may indicate bandwidth part switching by transmitting DCI of a PDCCH, which is L1 signaling, in the cell (self-scheduling) or in a PCell or another SCell (cross-carrier scheduling). Furthermore, in case that data transmission or reception is required for an active cell switched by the dormant bandwidth part, a base station may indicate switching of a dormant bandwidth part to a bandwidth part (or an active bandwidth part) other than a dormant bandwidth part among a plurality of bandwidth parts configured by an RRC message for the active cell by using DCI of a PDCCH, which is L1 signaling, may re-monitor a PDCCH in the switched bandwidth part, and may start data transmission or reception. When a base station indicates switching of a dormant bandwidth part of the cell to a general bandwidth part, since a terminal does not perform PDCCH monitoring in the dormant bandwidth part, DCI of a PDCCH, which is L1 signaling, may be transmitted (cross-carrier scheduling) and indicated in a PCell or another SCell by using cross-scheduling. It is because in case that a bandwidth part of the active cell is switched to a dormant bandwidth part, a PDCCH may not be monitored for the cell and thus cross-carrier scheduling may be applied to a PCell or another SCell to indicate bandwidth part switching to the cell. In the first embodiment, a bandwidth part may not be operated or used in a deactivated cell. In addition, switching a bandwidth part to a dormant bandwidth part may indicate switching of a downlink bandwidth part. It is because an operation of not monitoring a PDCCH and performing a channel measurement report is an operation of a terminal for a downlink bandwidth part of the cell. Moreover, in the first embodiment, when a MAC CE indicating activation or deactivation of a cell is received by a terminal, indication of the MAC CE may not be followed or may be ignored in case that the MAC CE indicates activation of an active cell switched to a dormant bandwidth part. Furthermore, if the MAC CE indicates deactivation of an active cell switched to a dormant bandwidth part, the cell may be deactivated according to indication of the MAC CE, and a downlink or uplink bandwidth part configured in the cell may be deactivated. As another method, in case that the MAC CE indicates activation of an active cell switched to a dormant bandwidth part, a terminal may perform data transmission or reception by switching and activating a downlink bandwidth part or an uplink bandwidth part to a downlink first active bandwidth part or an uplink first active bandwidth part, respectively.

In the first embodiment, scheduling configuration information for each of cells may be configured as follows, as in FIG. 1F of the disclosure.

That is, in an RRCSetup message, an RRCResume message 1F-25, or an RRCReconfiguration message 1F-45 of RRC connection configuration, scheduling information may be included for each of cells.

The scheduling information for each of cells may include a part of the following pieces of information.

Cross-carrier scheduling configuration information

Scheduling cell information

Own indicator (indicating that there is no cross-carrier scheduling, that is, indicating self-scheduling) and a carrier indicator field (CIF) indicator (cif-Presence, indicating whether or not a CIF filed is present in a DCI format of a PDCCH)

Other indicators (indicating that there is cross-carrier scheduling), cell indicators (schedulingCellId and ServCellIndex) indicating from which cell cross-carrier scheduling is to be received, and a CIF indicator (cif-InSchedulingCell) for separating a cell scheduled or to be scheduled from cells which receive scheduling Dormant bandwidth part identifier or a dormant bandwidth part configuration indicator (when a dormant bandwidth part is configured for a current cell and a dormant bandwidth part is used or when switching is performed on a dormant bandwidth part (BWP switching), an indicator or configuration information for reception of indication of scheduling in another cell by cross-carrier scheduling or bandwidth part switching)

Based on scheduling configuration information for each of cells as described above, a terminal may indicate bandwidth part switching of a general bandwidth part (for example, a bandwidth which is not a dormant bandwidth) and a dormant bandwidth part for each of cells by downlink control information (DCI) of a PDCCH based on self-scheduling or cross-carrier scheduling.

Proposed in the first embodiment is a bandwidth part switching procedure between a first bandwidth part (for example, a dormant bandwidth part) and a second bandwidth part (for example, a bandwidth part which is not a dormant bandwidth part, or a general bandwidth part) according to scheduling configuration information for each of cells.

Figure 1H:
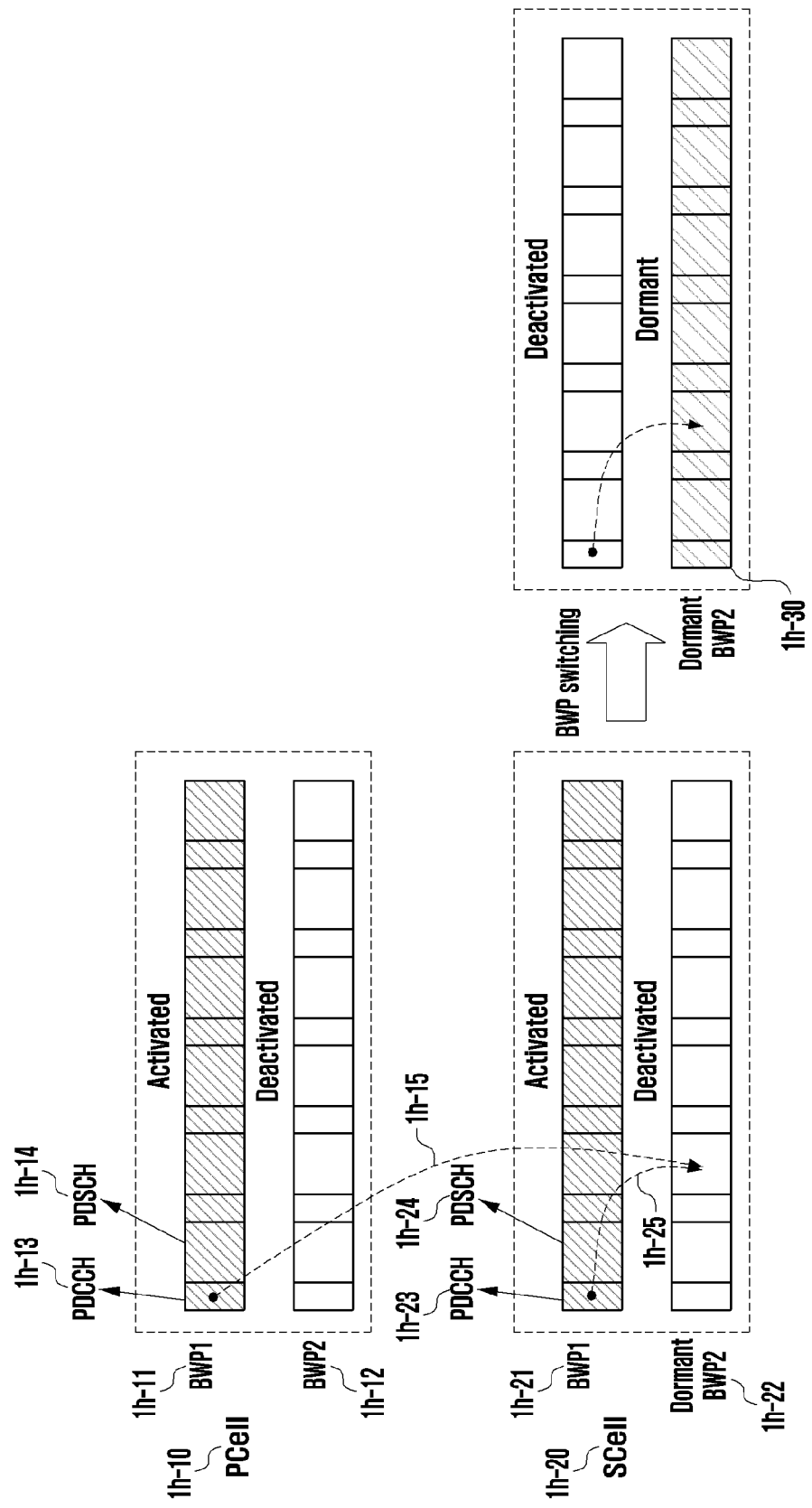
FIG. 1H illustrates bandwidth part switching in a first embodiment.
Figure 1I:
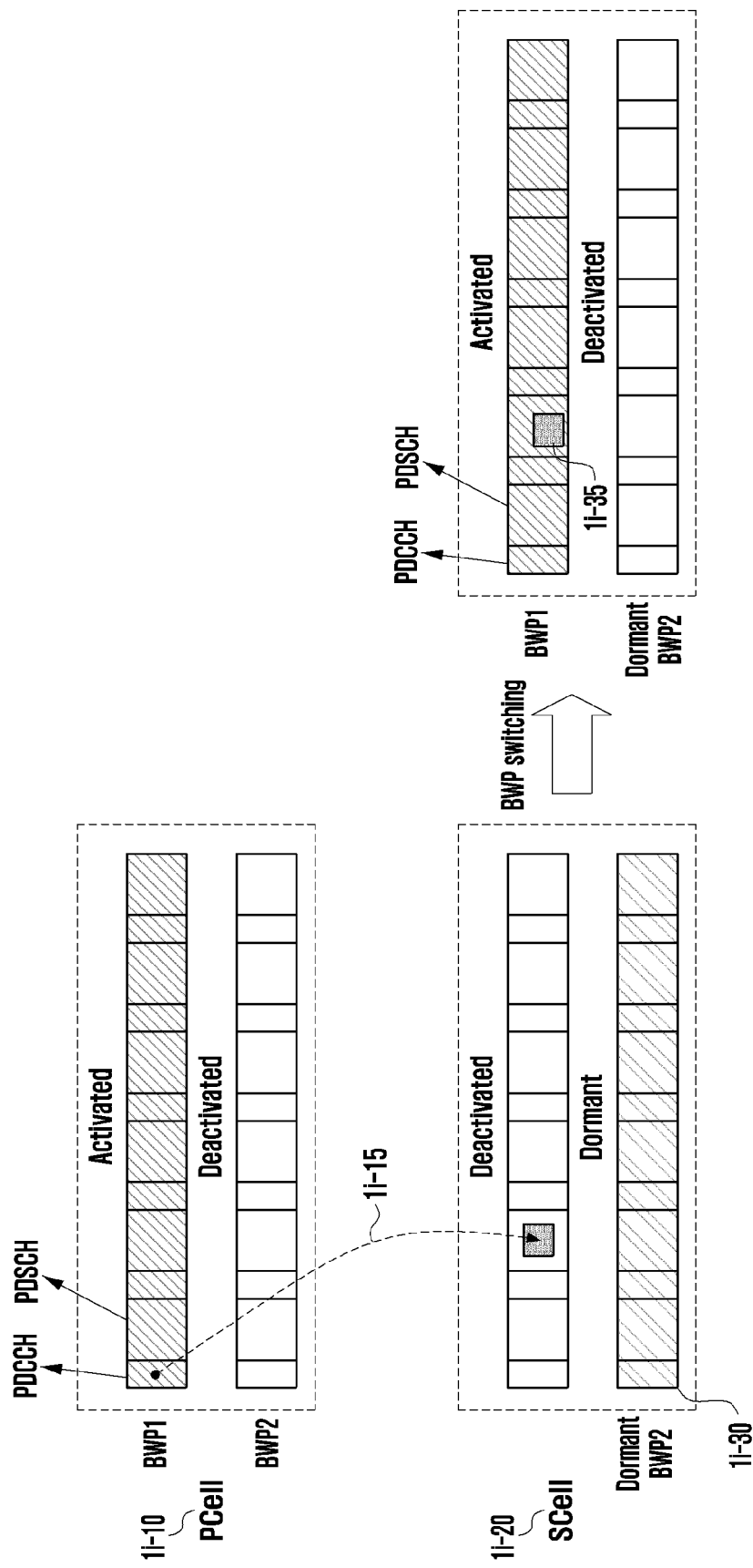
FIG. 1I illustrates bandwidth part switching in a first embodiment.

FIG. 1H explains bandwidth part switching in the first embodiment, and FIG. 1I explains bandwidth part switching in the first embodiment.

FIG. 1H shows a procedure of switching a second bandwidth part to a first bandwidth part.

In FIG. 1H, as in FIG. 1F, a plurality of bandwidth parts may be configured for an uplink or a downlink for a plurality of cells 1h-10 and 1h-20, respectively, in a terminal, and one or a plurality of dormant bandwidth parts among the plurality of bandwidth parts may be indicated separately. For convenience of description, FIG. 1H shows only downlink bandwidth parts. In FIG. 1H, an SCell 1H-20 may be currently maintained or operated in an active state, and may transmit or receive data in an active second bandwidth. In addition, according to the scheduling configuration information for each of cells, PDCCH monitoring may be performed in an SCell 1H-20 by self-scheduling 1H-25, or PDCCH monitoring 1H-15 may be performed in a PCell 1H-10 by cross-carrier scheduling. If downlink control information (DCI) of a PDCCH is received 1H-15 or 1H-25 in the PCell 1H-10 or the SCell 1H-20 and a current bandwidth part is indicated to be switched to a first bandwidth part 1H-22 by a bitmap, a terminal may deactivate a current second bandwidth part 1H-21 and switches the second bandwidth part to a first bandwidth part 1H-30, wherein the first bandwidth part is a bandwidth part configured as a dormant bandwidth part, and thus an operation of a terminal may be performed at the time of hibernation. That is, PDCCH monitoring is no longer performed for the SCell 1H-20, but an operation of performing and reporting channel measurement for a first bandwidth part 1H-30 of the SCell 1H-20 may be performed and data transmission or reception may not be performed.

FIG. 1I illustrates a procedure of switching a first bandwidth part to a second bandwidth part or another first bandwidth part.

In FIG. 1I, as in FIG. 1F, a plurality of bandwidth parts may be configured for an uplink or a downlink for a plurality of cells 1h-10 and 1h-20, respectively, in a terminal, and one or a plurality of dormant bandwidth parts among the plurality of bandwidth parts may be indicated separately. For convenience of description, FIG. 1I shows only downlink bandwidth parts. In FIG. 1I, an SCell 1I-20 is currently maintained or operated in a dormant state by a first bandwidth part, and PDCCH monitoring is no longer performed for the SCell 1I-20. However, a procedure of performing and reporting channel measurement for a first bandwidth part 1I-30 of the SCell 1I-20 is performed, and data transmission or reception is not performed.

PDCCH monitoring is not performed in the SCell 1I-20, and thus base station indication may not be read. Accordingly, in the first embodiment, a cross-scheduling method is applied to read indication of a base station for the first bandwidth part. That is, if an SCell is configured to a first bandwidth part, PDCCH monitoring 1I-15 may be performed in a PCell 1I-10 or another SCell by cross-carrier scheduling according to scheduling configuration information. If downlink control information (DCI) of a PDCCH is received 1I-15 in the PCell 1I-10 and a current bandwidth part is indicated to be switched to a second bandwidth part 1I-35 by a bitmap, a terminal may deactivate a current first bandwidth part 1I-30 and switches the first bandwidth part to a second bandwidth part 1I-35, wherein the second bandwidth part 1I-35 is a bandwidth part which is not a dormant bandwidth part, and thus an operation of a terminal may be performed at the time of activation. That is, according to the scheduling configuration information, PDCCH monitoring may be performed for the PCell 1I-10 or the SCell 1I-20, an operation of performing and reporting channel measurement for a second bandwidth part 1I-35 of the SCell 1I-20 may be performed, and data transmission or reception may be performed. A bandwidth part switching method based on cross-carrier scheduling proposed above may also be expanded and used when switching from a first bandwidth part to another first bandwidth part is indicated.

In FIG. 1I and FIG. 1H, a bandwidth part switching procedure indicated by DCI of a PDCCH may indicate uplink bandwidth part switching or downlink bandwidth part switching according to a DCI format. For example, DCI format 0 of a PDCCH may indicate an uplink bandwidth part and may simultaneously assign an uplink transmission resource (uplink grant), and DCI format 1 of the PDCCH may indicate a downlink bandwidth part and may simultaneously assign a downlink transmission resource (downlink assignment).

Figure 1J:
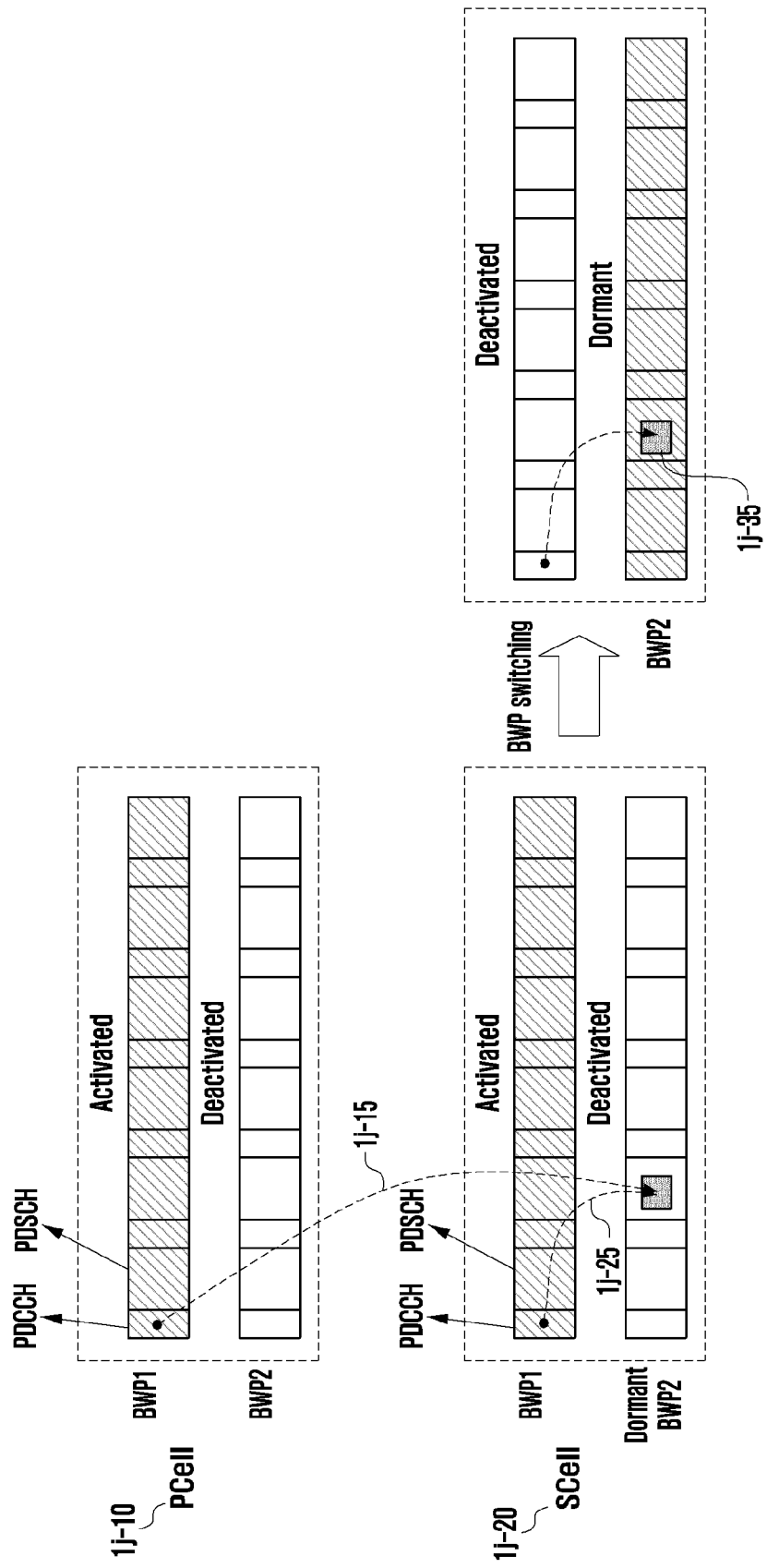
FIG. 1J illustrates a first method for performing bandwidth part switching in a first embodiment.

FIG. 1J shows a first method for performing bandwidth part switching in the first embodiment. The first method may show a specific operation of a switching procedure from a second bandwidth part to another second bandwidth part in a serving cell (a PCell or an SCell), and may show a specific operation of switching from a first bandwidth part to a second bandwidth part in a serving cell (an SCell).

In FIG. 1J, a PCell and an SCell may be configured with a plurality of bandwidth parts, and one bandwidth part may be maintained or operated in an active or dormant state for a downlink or an uplink of each of cells. For convenience of description, FIG. 1F explains a downlink bandwidth part.

In FIG. 1J, an SCell 1J-20 may receive indication of switching of a current bandwidth part of the SCell 1J-20 from a PDCCH of the SCell 1J-20 by self-scheduling 1J-25 or from a PDCCH of a PCell 1J-10 by cross-carrier scheduling 1J-15 according to scheduling configuration information configured by an RRC message, as in FIG. 1F. Indication of switching of the bandwidth part may be performed by DCI of a PDCCH. For uplink bandwidth part switching indication, an uplink transmission resource (a transmission resource for a current or next bandwidth part after a terminal switches a bandwidth part) may be always accompanied and assigned. For downlink bandwidth part switching indication, a downlink transmission resource (a transmission resource for a current or next bandwidth part after a terminal switches a bandwidth part 1J-35) may be always accompanied and assigned. It is because when the base station provides, to a terminal, indication of switching of a bandwidth part, the base station has no way to identify whether the terminal has successfully received the indication of switching of a bandwidth part.

Specifically, in case of an uplink, if a terminal transmits data to an uplink transmission resource (a transmission resource for a current or next bandwidth part after the terminal switches a bandwidth part) accompanied with bandwidth part indication, the terminal transmits uplink data to an uplink transmission resource for a bandwidth part indicated by DCI of a PDCCH, and thus a base station may identify that the terminal has successfully performed uplink bandwidth part switching.

In addition, in case of a downlink, if a terminal receives data to a downlink transmission resource (a transmission resource for a current or next bandwidth part after the terminal switches a bandwidth part) accompanied with bandwidth part indication and HARQ ACK (indicating successful downlink data reception) or NACK (indicating failure of successful reception of downlink data) is transmitted to a base station, the base station may identify that the terminal has successfully performed downlink bandwidth part switching by receiving HARQ ACK or NACK for downlink transmission data for a bandwidth part indicated by DCI of a PDCCH. It should be noted that when HARQ ACK or HARQ NACK is received, the HARQ ACK or NACK itself may serve for a terminal to provide, to a base station, indication of successful performance of a downlink bandwidth part. It should be noted that HARQ ACK or NACK information indicates whether or not downlink data is successfully received and that HARQ NACK information does not indicate a failure of downlink bandwidth part switching. A terminal may transmit HARQ ACK or NACK information by using a transmission resource corresponding to downlink data in a PUCCH transmission resource indicated or preconfigured for the terminal by a PDCCH.

Figure 1K:
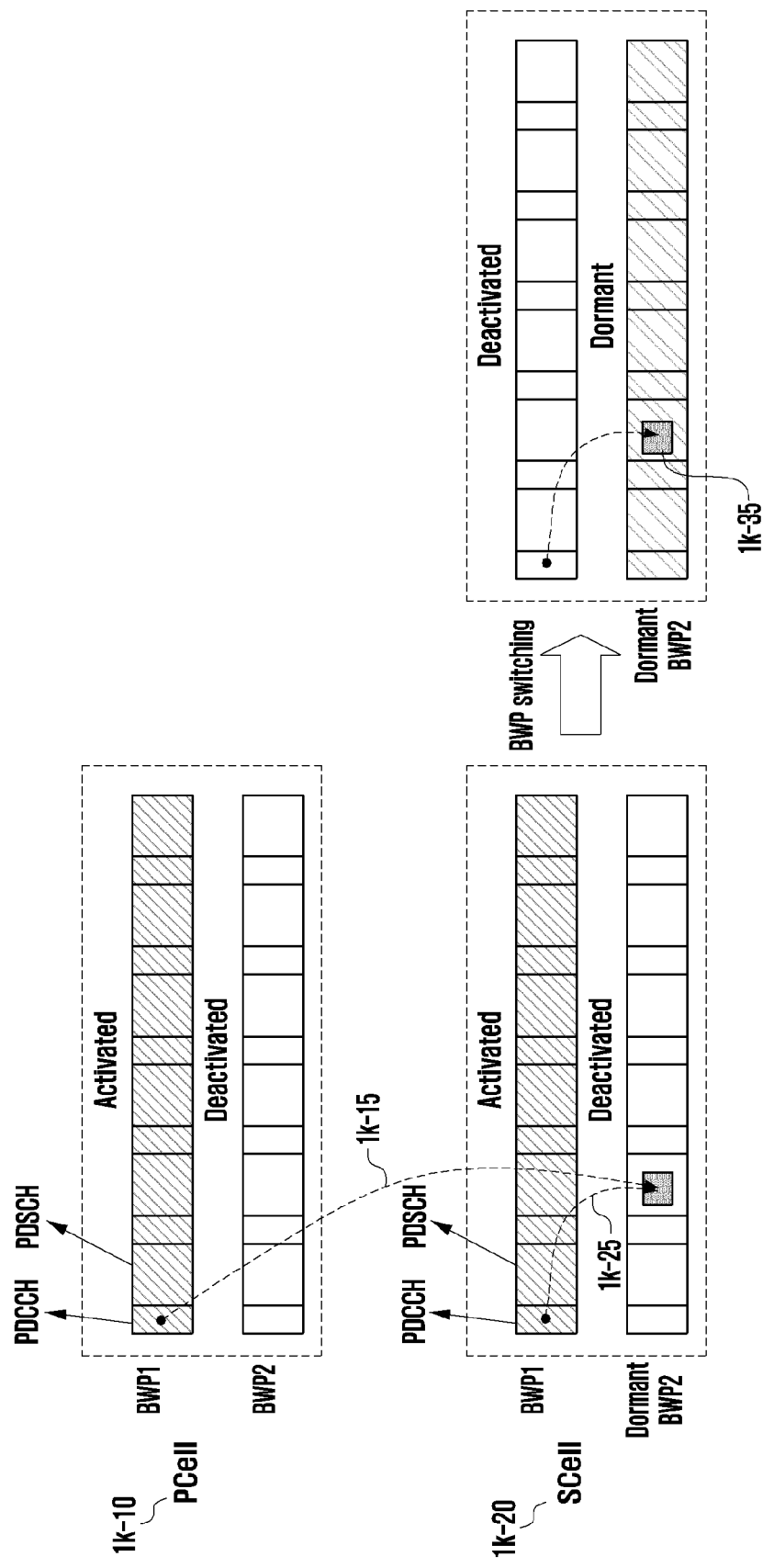
FIG. 1K illustrates a second method for performing bandwidth part switching in a first embodiment.

FIG. 1K shows a second method for performing bandwidth part switching in the first embodiment. The second method may show a specific operation of a switching procedure from a second bandwidth part to a first bandwidth part in a serving cell (a PCell or an SCell).

In FIG. 1K, a PCell 1K-10 and an SCell 1K-20 may be configured with a plurality of bandwidth parts, and one bandwidth part may be maintained or operated in an active or dormant state for a downlink or an uplink of each of cells. For convenience of description, FIG. 1K explains a downlink bandwidth part.

In FIG. 1K, an SCell 1K-20 may receive indication of switching of a current bandwidth part of the SCell 1K-20 from a PDCCH of the SCell 1K-20 by self-scheduling 1K-25 or from a PDCCH of a PCell 1K-10 by cross-carrier scheduling 1K-15 according to scheduling configuration information configured by an RRC message, as in FIG. 1F.

In FIG. 1K of the disclosure, a (2-1)th method of performing switching from a second bandwidth part to a first bandwidth part is as follows.

In the (2-1)th method, indication of switching of the bandwidth part may be performed by DCI of a PDCCH. For downlink bandwidth part switching indication, a downlink transmission resource (a transmission resource 1K-35 for a current or next bandwidth part after a terminal switches a bandwidth part) may be always accompanied and assigned. It is because when the base station provides, to a terminal, indication of switching of a bandwidth part, the base station has no way to identify whether the terminal has successfully received the indication of switching of a bandwidth part.

Specifically, in case of a downlink, if a terminal receives data via a downlink transmission resource (a transmission resource for a current or next bandwidth part after the terminal switches a bandwidth part) accompanied with bandwidth part indication and HARQ ACK (indicating successful downlink data reception) or NACK (indicating failure of successful reception of downlink data) is transmitted to a base station, the base station may identify that the terminal has successfully performed downlink bandwidth part switching by receiving HARQ ACK or NACK for downlink transmission data for a bandwidth part indicated by DCI of a PDCCH. It should be noted that when HARQ ACK or HARQ NACK is received, the HARQ ACK or NACK itself may serve for a terminal to provide, to a base station, indication of successful performance of a downlink bandwidth part. It should be noted that HARQ ACK or NACK information indicates whether or not downlink data is successfully received and that HARQ NACK information does not indicate a failure of downlink bandwidth part switching. A terminal may transmit HARQ ACK or NACK information by using a transmission resource corresponding to downlink data in a PUCCH transmission resource indicated or preconfigured for the terminal by a PDCCH. More specifically, a terminal successfully receives bandwidth part switching indication for the serving cell (the PCell or the SCell), and if the downlink data is received, a MAC layer (MAC entity) may transmit HARQ ACK or NACK information indication for the downlink data to a lower layer (for example, a PHY layer device) to indicate whether or not data is successfully received or to indicate successful bandwidth part switching.

In FIG. 1K of the disclosure, a (2-2)th method of performing switching from a second bandwidth part to a first bandwidth part is as follows.

In the (2-2)th method, indication of switching of the bandwidth part may be performed by DCI of a PDCCH. For downlink bandwidth part switching indication, a downlink transmission resource (a transmission resource 1K-35 for a current or next bandwidth part after a terminal switches a bandwidth part) may be always accompanied and assigned. In addition, downlink data may be transmitted by a base station while including padding. The padding is data including a meaningless discarding value. If a terminal receives the data, the data is processed and discarded because of padding, but there is an advantage in that HARQ ACK or NACK for padding data may be transmitted to a base station. It is because if downlink data transmission does not occur and the base station provides, to a terminal, indication of switching of a bandwidth part, the base station has no way to identify whether the terminal has successfully received the indication of switching of a bandwidth part. For example, a successful bandwidth part switching may be indicated by a terminal transmitting HARQ ACK or NACK, and if both HARQ ACK and HARQ NACK are not transmitted, it may indicate that the bandwidth part switching has failed.

Specifically, in case of a downlink, if a terminal receives data via a downlink transmission resource (a transmission resource for a current or next bandwidth part after the terminal switches a bandwidth part) accompanied with bandwidth part indication and HARQ ACK (indicating successful downlink data reception) or NACK (indicating failure of successful reception of downlink data) is transmitted to a base station, the base station may identify that the terminal has successfully performed downlink bandwidth part switching by receiving HARQ ACK or NACK for downlink transmission data for a bandwidth part indicated by DCI of a PDCCH. It should be noted that when HARQ ACK or HARQ NACK is received, the HARQ ACK or NACK itself may serve for a terminal to provide, to a base station, indication of successful performance of a downlink bandwidth part. It should be noted that HARQ ACK or NACK information indicates whether or not downlink data is successfully received and that HARQ NACK information does not indicate a failure of downlink bandwidth part switching. A terminal may transmit HARQ ACK or NACK information by using a transmission resource corresponding to downlink data in a PUCCH transmission resource indicated or preconfigured for the terminal by a PDCCH. More specifically, a terminal successfully receives bandwidth part switching indication for the serving cell (the PCell or the SCell), and if the downlink data is received, a MAC layer (MAC entity) may transmit HARQ ACK or NACK information indication for the downlink data to a lower layer (for example, a PHY layer device) to indicate whether or not data is successfully received or to indicate successful bandwidth part switching.

In FIG. 1K of the disclosure, a (2-3)th method of performing switching from a second bandwidth part to a first bandwidth part is as follows.

In the (2-3)th method, indication of switching of the bandwidth part may be performed by DCI of a PDCCH. For downlink bandwidth part switching indication, a downlink transmission resource (a transmission resource 1K-35 for a current or next bandwidth part after a terminal switches a bandwidth part) may be always accompanied and assigned. However, data is not transmitted or received in a dormant bandwidth part (a first bandwidth part) for which switching is indicated, and thus a terminal may not receive data for a downlink transmission resource. It is known by a base station that a terminal does not receive data in a downlink transmission resource indicated by DCI of a PDCCH including bandwidth part switching indication, and thus downlink data may be transmitted by the base station while including padding. A terminal does not receive and process the downlink data, but the terminal transmits HARQ ACK or NACK corresponding to the downlink data to a base station to indicate whether or not a bandwidth part is successfully switched. For example, a successful bandwidth part switching may be indicated by a terminal transmitting HARQ ACK or NACK, and if both HARQ ACK and HARQ NACK are not transmitted, it may indicate that the bandwidth part switching has failed. It is because if downlink data transmission does not occur, and the base station provides, to a terminal, indication of switching of a bandwidth part, the base station has no way to identify whether the terminal has successfully received the indication of switching of a bandwidth part.

Specifically, in case of a downlink, if HARQ ACK (indicating successful downlink data reception) or NACK (indicating failure of successful reception of downlink data) is transmitted to a base station although a terminal does not receive data via a downlink transmission resource (a transmission resource for a current or next bandwidth part after the terminal switches a bandwidth part) accompanied with bandwidth part indication, the base station may identify that the terminal has successfully performed downlink bandwidth part switching by receiving HARQ ACK or NACK for downlink transmission data for a bandwidth part indicated by DCI of a PDCCH. It should be noted that when HARQ ACK or HARQ NACK is received, the HARQ ACK or NACK itself may serve for a terminal to provide, to a base station, indication of successful performance of a downlink bandwidth part. It should be noted that HARQ ACK or NACK information indicates whether or not downlink data is successfully received and that HARQ NACK information does not indicate a failure of downlink bandwidth part switching. A terminal may transmit HARQ ACK or NACK information by using a transmission resource corresponding to downlink data in a PUCCH transmission resource indicated or preconfigured for the terminal by a PDCCH. More specifically, a terminal successfully receives bandwidth part switching indication for the serving cell (the PCell or the SCell), and although the downlink data is not received, a MAC layer (MAC entity) may transmit HARQ ACK or NACK information indication for the downlink data to a lower layer (for example, a PHY layer device) to indicate successful bandwidth part switching.

In FIG. 1K of the disclosure, a (2-4)th method of performing switching from a second bandwidth part to a first bandwidth part is as follows.

In the (2-4)th method, indication of switching of the bandwidth part may be performed by DCI of a PDCCH. For downlink bandwidth part switching indication, a downlink transmission resource (a transmission resource 1K-35 for a current or next bandwidth part after a terminal switches a bandwidth part) may be always accompanied and assigned. However, data is not transmitted or received in a dormant bandwidth part (a first bandwidth part) for which switching is indicated, and thus a terminal may not receive data for a downlink transmission resource. It is known by a base station that a terminal does not receive data in a downlink transmission resource indicated by DCI of a PDCCH including bandwidth part switching indication, and thus a base station may not transmit data to the downlink transmission resource so as to prevent waste of transmission resources. A terminal does not receive and process data from the downlink transmission resource, and a base station does not transmit data in the downlink transmission resource, but the terminal transmits HARQ ACK or NACK corresponding to the downlink transmission resource or the data to a base station to indicate whether or not a bandwidth part is successfully switched. For example, a successful bandwidth part switching may be indicated by a terminal transmitting HARQ ACK or NACK, and if both HARQ ACK and HARQ NACK are not transmitted, it may indicate that the bandwidth part switching has failed. It is because if downlink data transmission does not occur, and the base station provides, to a terminal, indication of switching of a bandwidth part, the base station has no way to identify whether the terminal has successfully received the indication of switching of a bandwidth part.

Specifically, in case of a downlink, a terminal does not receive data in a downlink transmission resource (a transmission resource for a current or next bandwidth part after the terminal switches a bandwidth part) accompanied with bandwidth part indication and a base station does not transmit data to the downlink transmission resource. However, if a terminal transmits HARQ ACK (indicating successful downlink data reception) or NACK (indicating failure of successful reception of downlink data) to a base station, the base station may identify that the terminal has successfully performed downlink bandwidth part switching by receiving HARQ ACK or NACK for a downlink transmission resource or data for a bandwidth part indicated by DCI of a PDCCH. It should be noted that when HARQ ACK or HARQ NACK is received, the HARQ ACK or NACK itself may serve for a terminal to provide, to a base station, indication of successful performance of a downlink bandwidth part. It should be noted that HARQ ACK or NACK information indicates whether or not downlink data is successfully received and that HARQ NACK information does not indicate a failure of downlink bandwidth part switching. A terminal may transmit HARQ ACK or NACK information by using a transmission resource corresponding to downlink data in a PUCCH transmission resource indicated or pre-configured for the terminal by a PDCCH. More specifically, a terminal successfully receives bandwidth part switching indication for the serving cell (the PCell or the SCell). Although the downlink data is not received to a terminal, a MAC layer (MAC entity) may transmit HARQ ACK or NACK information indication for the downlink data to a lower layer (for example, a PHY layer device) to indicate successful bandwidth part switching.

As another method, in the (2-1)th method, the (2-2)th method, the (2-3)th method, or the (2-4)th method, HARQ ACK may indicate successful bandwidth part switching, and HARQ NACK may indicate that bandwidth part switching has failed.

In FIG. 1K of the disclosure, a (2-5)th method of performing switching from a second bandwidth part to a first bandwidth part is as follows.

In the fifth method, switching indication of a bandwidth part is received by DCI of a PCDDH. If switching to a second bandwidth part is indicated when a base station performs downlink bandwidth part switching indication, a DCI format which is always accompanied with a downlink transmission resource (a transmission resource 1K-35 for a current or next bandwidth part after a terminal switches a bandwidth part) may be used and a downlink transmission resource may be assigned. If switching to a first bandwidth part is indicated, a new DCI format which is not always accompanied with a downlink transmission resource (a transmission resource 1K-35 for a current or next bandwidth part after a terminal switches a bandwidth part) may be used and a downlink transmission resource may not be assigned. In a dormant bandwidth part (a first bandwidth part) to which switching is indicated, data is not transmitted or received, and thus a terminal may not receive data for the downlink transmission resource.

In addition, in the fifth method, bandwidth part switching is indicated in DCI of a PDCCH, but a downlink transmission resource or data does not occur, and thus it may not be knows by a base station whether a terminal has successfully performed bandwidth part switching. Accordingly, a transmission resource or period to report channel measurement may be configured by a base station separately (differently from other bandwidth parts) by using a terminal which does not perform PDCCH monitoring but should periodically perform and report channel measurement in a first bandwidth part. That is, in case that a base station provides, to a terminal, indication of switching to a first bandwidth part by the fifth method, if a channel measurement report for the first bandwidth part is performed corresponding to a transmission resource or period configured for the first bandwidth part, it may be identified that bandwidth switching is successful. If a channel measurement report for the first bandwidth part is not performed corresponding to a transmission resource or period configured for the first bandwidth part, a base station may determine that bandwidth part switching indication has failed.

Moreover, the fifth method does not indicate an uplink transmission resource or a downlink transmission resource in DCI of a PDCCH, but may be used as a method for indicating switching to a first bandwidth part or a method for maintaining a first bandwidth part as is, and a cell deactivation timer (SCellDeactivationTimer) may restart. That is, the fifth method may be used as a method for indicating restart of a cell deactivation timer to maintain a cell in an active state and maintain a bandwidth part as a first bandwidth part.

The first method, the second method, the third method, the fourth method, or the fifth method may also be applied when switching from a first bandwidth part to another first bandwidth part is indicated.

In addition, the first method, the second method, the third method, the fourth method, or the fifth method may be used as a method for indicating switching to a first bandwidth part or a method for maintaining a first bandwidth part as is. Otherwise, when switching to a first bandwidth part is indicated or a terminal has switched to a first bandwidth part by applying the method, a cell deactivation timer (SCellDeactivationTimer) of a serving cell may restart. That is, the first method, the second method, the third method, the fourth method, or the fifth method may be used as a method for allowing a cell deactivation timer to restart by the method to maintain a cell in an active state and maintain a bandwidth part as a first bandwidth part.

As another method, the first method, the second method, the third method, the fourth method, or the fifth method may be used as a method for indicating switching to a first bandwidth part or a method for maintaining a first bandwidth part as is. When switching to a first bandwidth part is indicated or a terminal has switched to a first bandwidth part by applying the method, a cell deactivation (inactive) timer (SCellDeactivationTimer) of a serving cell may be stopped. That is, the first method, the second method, the third method, the fourth method, or the fifth method may be used as a method for stopping a cell deactivation (inactive) timer by the method to maintain a cell in an active state and maintain a bandwidth part as a first bandwidth part.

In the first embodiment, a specific operation for downlink bandwidth part switching of a base station is as follows.

When a base station performs switching indication of a bandwidth part by DCI of a PDCCH and the base station performs downlink bandwidth part switching indication, if switching to a second bandwidth part is indicated, a DCI format which is always accompanied with a downlink transmission resource (a transmission resource 1K-35 for a current or next bandwidth part after a terminal switches a bandwidth part) may be used, a downlink transmission resource may be assigned, and switching to a second bandwidth part is indicated (for example, each of bandwidth part identifiers may be indicated by a bitmap).

if switching to a first bandwidth part is indicated, switching to a first bandwidth part may be indicated by using the first method, the second method, the third method, the fourth method, or the fifth method proposed in the disclosure. (For example, each of bandwidth part identifiers may be indicated by a bitmap.)

In the first embodiment, a specific operation for downlink bandwidth part switching of a terminal is as follows.

When a terminal receives switching indication of a bandwidth part by DCI of a PDCCH and receives downlink bandwidth part switching indication from a base station, if switching to a second bandwidth part is indicated, a DCI format which is always accompanied with a downlink transmission resource (a transmission resource 1K-35 for a current or next bandwidth part after a terminal switches a bandwidth part) may be read, switching to the indicated second bandwidth part may be performed, data may be received in the indicated downlink transmission resource, and HARQ ACK or NACK information on the downlink data may be transmitted to an indicated PUCCH transmission resource.

if switching to a first bandwidth part is indicated, the first method, the second method, the third method, the fourth method, or the fifth method proposed in the disclosure may be performed, switching to the first bandwidth part may be performed, and an operation according to each of the methods may be performed.

The features of the first method, the second method, the third method, the fourth method, and the fifth method may be combined or fused with each other to design and expand a new method.

In the disclosure below, a (1-1)th embodiment about a specific terminal operation of reading a PDCCH according to scheduling configuration information for each of cells in the first embodiment is proposed as follows.

1> In case that scheduling configuration information of a serving cell includes self-scheduling configuration information (for example, an own identifier) or cross-carrier scheduling configuration information (for example, another identifier) and a dormant bandwidth part identifier or indicator is included in the cross-carrier scheduling configuration information (or in case that a dormant bandwidth part identifier or indicator is included in the scheduling configuration information), a first operation below is performed.

2> If an active bandwidth part of a current serving cell (SCell) is a first bandwidth part, 3> by applying a cross-carrier scheduling method, a PDCCH is received in a cell indicated as a cell scheduled in the scheduling configuration information (or a scheduling cell which receives scheduling indication), and a PDCCH is not received in the current serving cell (SCell).

3> if bandwidth part switching to a first bandwidth part is indicated in the received PDCCH, 4> the first method, the second method, the third method, the fourth method, or the fifth method is applied. For example, switching to a bandwidth part indicated in the DCI is performed, and data corresponding to a downlink transmission resource indicated in the DCI is not received and is ignored.

3> if bandwidth part switching to a second bandwidth part is indicated in the received PDCCH, 4> switching to a bandwidth part indicated in the DCI is performed, data corresponding to a downlink transmission resource indicated in the DCI is received, and HARQ ACK or NACK corresponding thereto is transmitted.

2> If an active bandwidth part of a current serving cell (SCell) is a second bandwidth part, 3> a PDCCH is not received in a cell indicated as a cell scheduled in the scheduling configuration information (or a scheduling cell which receives scheduling indication), and a PDCCH is received in the current serving cell (SCell).

3> if bandwidth part switching to a first bandwidth part is indicated in the received PDCCH, 4> the first method, the second method, the third method, the fourth method, or the fifth method is applied. For example, switching to a bandwidth part indicated in the DCI is performed, and data corresponding to a downlink transmission resource indicated in the DCI is not received and is ignored.

3> if bandwidth part switching to a second bandwidth part is indicated in the received PDCCH, 4> switching to a bandwidth part indicated in the DCI is performed, data corresponding to a downlink transmission resource indicated in the DCI is received, and HARQ ACK or NACK corresponding thereto is transmitted.

1> In case that scheduling configuration information of a serving cell includes self-scheduling configuration information (for example, an own identifier) or cross-carrier scheduling configuration information (for example, another identifier) and a dormant bandwidth part identifier or indicator is not included in the cross-carrier scheduling configuration information (or in case that a dormant bandwidth part identifier or indicator is not included in the scheduling configuration information), a second operation below is performed.

2> A PDCCH is received and read in an active bandwidth part of a current cell or a scheduled cell by a self-scheduling method or a cross-carrier scheduling method according to the scheduling configuration information.

2> if bandwidth part switching to a second bandwidth part is indicated in the received PDCCH, 3> switching to a bandwidth part indicated in the DCI is performed, data corresponding to a downlink transmission resource indicated in the DCI is received, and HARQ ACK or NACK corresponding thereto is transmitted.

In the disclosure below, a (1-2)th embodiment about a specific terminal operation of reading a PDCCH according to scheduling configuration information for each of cells in the first embodiment is proposed as follows.

1> In case that scheduling configuration information of a serving cell includes self-scheduling configuration information (for example, an own identifier) or cross-carrier scheduling configuration information (for example, another identifier) and a dormant bandwidth part identifier or indicator is included in the cross-carrier scheduling configuration information (or in case that a dormant bandwidth part identifier or indicator is included in the scheduling configuration information), and in case that self-scheduling is configured in a current serving cell (in case that cross-carrier scheduling is not configured), a first operation below is performed.

2> If an active bandwidth part of a current serving cell (SCell) is a first bandwidth part, 3> by applying a cross-carrier scheduling method, a PDCCH is received in a cell indicated as a cell scheduled in the scheduling configuration information (or a scheduling cell which receives scheduling indication), and a PDCCH is not received in the current serving cell (SCell).

3> if bandwidth part switching to a first bandwidth part is indicated in the received PDCCH, 4> the first method, the second method, the third method, the fourth method, or the fifth method is applied. For example, switching to a bandwidth part indicated in the DCI is performed, and data corresponding to a downlink transmission resource indicated in the DCI is not received and is ignored.

3> if bandwidth part switching to a second bandwidth part is indicated in the received PDCCH, 4> switching to a bandwidth part indicated in the DCI is performed, data corresponding to a downlink transmission resource indicated in the DCI is received, and HARQ ACK or NACK corresponding thereto is transmitted.

2> If an active bandwidth part of a current serving cell (SCell) is a second bandwidth part, 3> a PDCCH is not received in a cell indicated as a cell scheduled in the scheduling configuration information (or a scheduling cell which receives scheduling indication), and a PDCCH is received in an active bandwidth part of the current serving cell (SCell) by applying a self-scheduling method.

3> if bandwidth part switching to a first bandwidth part is indicated in the received PDCCH, 4> the first method, the second method, the third method, the fourth method, or the fifth method is applied. For example, switching to a bandwidth part indicated in the DCI is performed, and data corresponding to a downlink transmission resource indicated in the DCI is not received and is ignored.

3> if bandwidth part switching to a second bandwidth part is indicated in the received PDCCH, 4> switching to a bandwidth part indicated in the DCI is performed, data corresponding to a downlink transmission resource indicated in the DCI is received, and HARQ ACK or NACK corresponding thereto is transmitted.

1> In case that scheduling configuration information of a serving cell includes self-scheduling configuration information (for example, an own identifier) or cross-carrier scheduling configuration information (for example, another identifier) and a dormant bandwidth part identifier or indicator is not included in the cross-carrier scheduling configuration information (or in case that a dormant bandwidth part identifier or indicator is not included in the scheduling configuration information), and in case that self-scheduling is configured in a current serving cell (in case that cross-carrier scheduling is not configured), a second operation below is performed.

2> A PDCCH is received and read in an active bandwidth part of a current cell by a self-scheduling method according to the scheduling configuration information. Cross-carrier scheduling is not applied.

2> If bandwidth part switching to a second bandwidth part is indicated in the received PDCCH, 3> switching to a bandwidth part indicated in the DCI is performed, data corresponding to a downlink transmission resource indicated in the DCI is received, and HARQ ACK or NACK corresponding thereto is transmitted.

1> In case that scheduling configuration information of a serving cell includes self-scheduling configuration information (for example, an own identifier) or cross-carrier scheduling configuration information (for example, another identifier) and a dormant bandwidth part identifier or indicator is included in the cross-carrier scheduling configuration information (or in case that a dormant bandwidth part identifier or indicator is included in the scheduling configuration information), and in case that cross-carrier scheduling is configured in a current serving cell (in case that self-scheduling is not configured), a third operation below is performed.

2> By applying a cross-carrier scheduling method, a PDCCH is received in a cell indicated as a cell scheduled in the scheduling configuration information (or a scheduling cell which receives scheduling indication), and a PDCCH is not received in the current serving cell (SCell).

2> If bandwidth part switching to a first bandwidth part is indicated in the received PDCCH, 3> the first method, the second method, the third method, the fourth method, or the fifth method is applied. For example, switching to a bandwidth part indicated in the DCI is performed, and data corresponding to a downlink transmission resource indicated in the DCI is not received and is ignored.

2> if bandwidth part switching to a second bandwidth part is indicated in the received PDCCH, 3> switching to a bandwidth part indicated in the DCI is performed, data corresponding to a downlink transmission resource indicated in the DCI is received, and HARQ ACK or NACK corresponding thereto is transmitted.

1> In case that scheduling configuration information of a serving cell includes self-scheduling configuration information (for example, an own identifier) or cross-carrier scheduling configuration information (for example, another identifier) and a dormant bandwidth part identifier or indicator is not included in the cross-carrier scheduling configuration information (or in case that a dormant bandwidth part identifier or indicator is not included in the scheduling configuration information), and in case that cross-carrier scheduling is configured in a current serving cell (in case that self-scheduling is not configured), a fourth operation below is performed.

2> A PDCCH is received and read in an active bandwidth part of a scheduled cell indicated in the scheduling information by a cross-carrier scheduling method according to the scheduling configuration information. Self-scheduling is not applied.

2> If bandwidth part switching to a second bandwidth part is indicated in the received PDCCH, 3> switching to a bandwidth part indicated in the DCI is performed, data corresponding to a downlink transmission resource indicated in the DCI is received, and HARQ ACK or NACK corresponding thereto is transmitted.

A bandwidth part switching procedure or a reception method of a PDCCH, proposed in the disclosure, may be expanded and identically applied to an uplink bandwidth part switching procedure.

A (1-3-1)th embodiment about a specific operation related to a bandwidth part of a MAC layer (MAC entity) and a bandwidth part inactive timer according to the first embodiment is as follows. A bandwidth part inactive timer starts or restarts only in case that a default bandwidth part is configured and a bandwidth part for which bandwidth part switching is indicated is not a dormant bandwidth part or is not a default bandwidth part, or in case that a default bandwidth part is not configured and a bandwidth part for which bandwidth part switching is indicated is not a dormant bandwidth part or is not an initial bandwidth part.

If a MAC layer (MAC entity) receives indication of a PDCCH for bandwidth part switching of a serving cell (a PCell, a PSCell, or an SCell), the MAC layer (MAC entity) operates as follows for the serving cell for which a bandwidth part inactive timer configured.

1> If a PDCCH for bandwidth part switching indication is received and a MAC layer (MAC entity) switches a downlink active bandwidth part according to the indication, 2> if a downlink default bandwidth part identifier (defaultDownlinkBWP-Id) is configured and the MAC layer (MAC entity) performs switching to a bandwidth part which is not indicated by the downlink default bandwidth part identifier and/or a downlink dormant bandwidth part, or 2> if downlink default bandwidth part identifier (defaultDownlinkBWP-Id) is not configured and the MAC layer (MAC entity) performs switching to a bandwidth part which is not a downlink initial bandwidth part and/or a downlink dormant bandwidth part, 3> a bandwidth part inactive timer (bwp-InactivityTimer) related to the downlink active bandwidth part starts or restarts.

A (1-3-2)th embodiment about a specific operation related to a bandwidth part of a MAC layer (MAC entity) and a bandwidth part inactive timer according to the first embodiment is as follows. A bandwidth part inactive timer starts or restarts only in case that a switched active bandwidth part is not a dormant bandwidth part.

If a MAC layer (MAC entity) receives indication of a PDCCH for bandwidth part switching of a serving cell (a PCell, a PSCell, or an SCell), the MAC layer (MAC entity) operates as follows for the serving cell for which a bandwidth part inactive timer configured.

1> If a PDCCH for bandwidth part switching indication is received and a MAC layer (MAC entity) switches a downlink active bandwidth part according to the indication, 2> if a downlink default bandwidth part identifier (defaultDownlinkBWP-Id) is configured and the MAC layer (MAC entity) performs switching to a bandwidth part which is not indicated by the downlink default bandwidth part identifier, or 2> if downlink default bandwidth part identifier (default-DownlinkBWP-Id) is not configured and the MAC layer (MAC entity) performs switching to a bandwidth part which is not a downlink initial bandwidth part, 3> if switched active downlink bandwidth part is not a dormant bandwidth part or is not a bandwidth part indicated by a dormant bandwidth part identifier, 4> a bandwidth part inactive timer (bwp-InactivityTimer) related to the downlink active bandwidth part starts or restarts.

A (1-3-3)th embodiment about a specific operation related to an uplink bandwidth part at the time of switching of a downlink bandwidth part of a MAC layer (MAC entity) to a dormant bandwidth part according to the first embodiment is as follows. If a downlink bandwidth part is switched to a dormant bandwidth part, an active uplink bandwidth part is deactivated. It is because a PDCCH is not monitored in a dormant bandwidth part, and data is not transmitted or received, and thus an uplink bandwidth part will not be used.

If a MAC layer (MAC entity) receives indication of a PDCCH for bandwidth part switching of a serving cell (a PCell, a PSCell, or an SCell), 1> if there is no random access procedure in progress in the serving cell, 1> or if a random access procedure in progress in the serving cell is successfully completed when a PDCCH indicated by C-RNTI is received, 2> a terminal switches a current bandwidth part of the serving cell to a bandwidth part indicated by the PDCCH.

2> if a bandwidth part indicated by the PDCCH is a downlink bandwidth part having the same bandwidth part identifier as a downlink dormant bandwidth part identifier or if a switched active bandwidth part is a downlink dormant bandwidth part, 3> an active uplink bandwidth part of the current serving cell is deactivated.

3> if a bandwidth part active timer related to an active downlink bandwidth part is operating in the current serving cell, the bandwidth part active timer is stopped. This serves to prevent a dormant bandwidth part from being automatically switched to a default bandwidth part and activated (battery consumption due to PDCCH monitoring). If a default bandwidth part is configured to a dormant bandwidth part, the above-described problem may also be prevented.

3> In another method, if a cell deactivation timer is operating, the cell deactivation timer may also be stopped. This is an operation applicable to prevent a dormant bandwidth part from being cell-deactivated due to cell timer expiration and being automatically deactivated.

A (1-3-4)th embodiment about a specific operation related to an uplink bandwidth part at the time of switching of a downlink bandwidth part of a MAC layer (MAC entity) to a general bandwidth part, which is not a dormant bandwidth part, although the downlink bandwidth part is a dormant bandwidth part, according to the first embodiment, is as follows. If a downlink bandwidth part is switched from a dormant bandwidth part to a general bandwidth part, an uplink bandwidth part is switched to a first active bandwidth part and activated.

If a MAC layer (MAC entity) receives indication of a PDCCH for bandwidth part switching of a serving cell (a PCell, a PSCell, or an SCell), 1> if there is no random access procedure in progress in the serving cell, 1> or if a random access procedure in progress in the serving cell is successfully completed when a PDCCH indicated by C-RNTI is received, 2> a terminal switches a current bandwidth part of the serving cell to a bandwidth part indicated by the PDCCH.

2> if a bandwidth part indicated by the PDCCH is a downlink bandwidth part having the same bandwidth part identifier as a downlink dormant bandwidth part identifier or if a switched active bandwidth part is a downlink dormant bandwidth part, 3> an active uplink bandwidth part of the current serving cell is deactivated.

3> if a bandwidth part active timer related to an active downlink bandwidth part is operating in the current serving cell, the bandwidth part active timer is stopped. This serves to prevent a dormant bandwidth part from being automatically switched to a default bandwidth part and activated (battery consumption due to PDCCH monitoring). If a default bandwidth part is configured to a dormant bandwidth part, the above-described problem may also be prevented.

3> In another method, if a cell deactivation timer is operating, the cell deactivation timer may also be stopped. This is an operation applicable to prevent a dormant bandwidth part from being cell-deactivated due to cell timer expiration and being automatically deactivated.

2> If an active downlink bandwidth part (for example, a previous downlink bandwidth part) is a dormant bandwidth part or a bandwidth part indicated by a dormant bandwidth part identifier 2> and a bandwidth part indicated by the PDCCH is a bandwidth part having a bandwidth part identifier different from a dormant bandwidth part identifier, or if a switched active downlink bandwidth part according to PDCCH indication is not a dormant bandwidth part, 3> an uplink bandwidth part of the current serving cell is activated to an uplink bandwidth part indicated by a first active part bandwidth identifier or a first active bandwidth part.

A (1-3-5)th embodiment about a specific operation related to an uplink bandwidth part at the time of switching of a downlink bandwidth part of a MAC layer (MAC entity) to a general bandwidth part, which is not a dormant bandwidth part, although the downlink bandwidth part is a dormant bandwidth part, according to the first embodiment, is as follows. If a downlink bandwidth part is switched from a dormant bandwidth part to a general bandwidth part, an uplink bandwidth part is switched to an uplink bandwidth part having the same bandwidth part identifier as a bandwidth part identifier indicated in a PDCCH and is activated.

If a MAC layer (MAC entity) receives indication of a PDCCH for bandwidth part switching of a serving cell (a PCell, a PSCell, or an SCell), 1> if there is no random access procedure in progress in the serving cell, 1> or if a random access procedure in progress in the serving cell is successfully completed when a PDCCH indicated by C-RNTI is received, 2> a terminal switches a current bandwidth part of the serving cell to a bandwidth part indicated by the PDCCH.

2> if a bandwidth part indicated by the PDCCH is a downlink bandwidth part having the same bandwidth part identifier as a downlink dormant bandwidth part identifier or if a switched active bandwidth part is a downlink dormant bandwidth part, 3> an active uplink bandwidth part of the current serving cell is deactivated.

3> if a bandwidth part active timer related to an active downlink bandwidth part is operating in the current serving cell, the bandwidth part active timer is stopped. This serves to prevent a dormant bandwidth part from being automatically switched to a default bandwidth part and activated (battery consumption due to PDCCH monitoring). If a default bandwidth part is configured to a dormant bandwidth part, the above-described problem may also be prevented.

3> In another method, if a cell deactivation timer is operating, the cell deactivation timer may also be stopped. This is an operation applicable to prevent a dormant bandwidth part from being cell-deactivated due to cell timer expiration and being automatically deactivated.

2> If an active downlink bandwidth part (for example, a previous downlink bandwidth part) is a dormant bandwidth part or a bandwidth part indicated by a dormant bandwidth part identifier 2> and a bandwidth part indicated by the PDCCH is a bandwidth part having a bandwidth part identifier different from a dormant bandwidth part identifier, or if a switched active downlink bandwidth part according to PDCCH indication is not a dormant bandwidth part, 3> an uplink bandwidth part of the current serving cell is activated to an uplink bandwidth part having the same bandwidth part identifier as a bandwidth part identifier indicated in the PDCCH or an uplink bandwidth part having the same bandwidth part identifier as a bandwidth part identifier of a current downlink bandwidth part.

A (1-3-6)th embodiment about a specific operation related to an uplink bandwidth part at the time of switching of a downlink bandwidth part of a MAC layer (MAC entity) to a general bandwidth part, which is not a dormant bandwidth part, although the downlink bandwidth part is a dormant bandwidth part, according to the first embodiment, is as follows. If a downlink bandwidth part is switched from a dormant bandwidth part to a general bandwidth part, an uplink bandwidth part is switched to an uplink bandwidth part activated at the time of switching of a previous downlink bandwidth part to a dormant bandwidth part or a finally activated uplink bandwidth part, and is activated.

If a MAC layer (MAC entity) receives indication of a PDCCH for bandwidth part switching of a serving cell (a PCell, a PSCell, or an SCell), 1> if there is no random access procedure in progress in the serving cell, 1> or if a random access procedure in progress in the serving cell is successfully completed when a PDCCH indicated by C-RNTI is received, 2> a terminal switches a current bandwidth part of the serving cell to a bandwidth part indicated by the PDCCH.

2> if a bandwidth part indicated by the PDCCH is a downlink bandwidth part having the same bandwidth part identifier as a downlink dormant bandwidth part identifier or if a switched active bandwidth part is a downlink dormant bandwidth part, 3> an active uplink bandwidth part of the current serving cell is deactivated.

3> if a bandwidth part active timer related to an active downlink bandwidth part is operating in the current serving cell, the bandwidth part active timer is stopped. This serves to prevent a dormant bandwidth part from being automatically switched to a default bandwidth part and activated (battery consumption due to PDCCH monitoring). If a default bandwidth part is configured to a dormant bandwidth part, the above-described problem may also be prevented.

3> In another method, if a cell deactivation timer is operating, the cell deactivation timer may also be stopped. This is an operation applicable to prevent a dormant bandwidth part from being cell-deactivated due to cell timer expiration and being automatically deactivated.

2> If an active downlink bandwidth part (for example, a previous downlink bandwidth part) is a dormant bandwidth part or a bandwidth part indicated by a dormant bandwidth part identifier 2> and if a bandwidth part indicated by the PDCCH is a bandwidth part having a bandwidth part identifier different from a dormant bandwidth part identifier, or if a switched active downlink bandwidth part according to PDCCH indication is not a dormant bandwidth part, 3> an uplink bandwidth part of the current serving cell is activated to an uplink bandwidth part activated at the time of switching of a previous downlink bandwidth part to a dormant bandwidth part or a finally activated uplink bandwidth part, and is activated.

A (1-3-7)th embodiment about a specific operation depending on a cell state (an active state or a deactivated state) of a MAC layer (MAC entity) according to the first embodiment is as follows.

If indication of deactivation of a serving cell (a PCell or an SCell) is received a MAC CE or an RRC message or if a cell deactivation timer has been configured and the timer has expired, one or a plurality of the following operations may be performed.

A downlink bandwidth part or uplink bandwidth part is inactivated.

A cell deactivation timer which is configured for in the cell or the bandwidth part or which is being operated is stopped.

If a bandwidth part inactive timer configured for the bandwidth part of the cell is being operated, the bandwidth part inactive timer is stopped. This is to prevent an unnecessary bandwidth part switching procedure in the cell.

A periodic downlink transmission resource (DL SPS or configured downlink assignment) or a periodic uplink transmission resource (UL SPS or configured uplink grant type 2) configured in a bandwidth part of the cell may be released (cleared). In the above, releasing (clearing) means that configuration information such as cycle information configured in an RRC message is stored in a terminal, but information on a periodic transmission resource indicated or activated by L1 signaling (for example, DCI) is removed and is no longer used. The method proposed above, that is, an operation of releasing (clearing) a configured periodic downlink transmission resource (DL SPS or configured downlink assignment) or a configured periodic uplink transmission resource (UL SPS or configured uplink grant) may be performed only in case that a bandwidth part is shifted from an active state to a dormant state. It is because in case that a bandwidth part shifts from a deactivated state to a dormant state, there is no information on periodic transmission resource information indicated or activated by L1 signaling. As another method, periodic transmission resources may be released only in case that a periodic downlink transmission resource or a periodic uplink transmission resource is configured or is configured and used.

A periodic uplink transmission resource (configured uplink grant Type 1 configured by RRC) configured in the bandwidth part of the cell may be suspended (stopped). In the above, suspending (stopping) means that transmission resource configuration information configured in an RRC message is stored in a terminal but is no longer used. The method proposed above, that is, an operation of suspending a configured periodic uplink transmission resource (configured uplink grant type 1) may be performed only in case that a bandwidth part is shifted from an active state to a dormant state. It is because in case that a bandwidth part shifts from a deactivated state to a dormant state, a periodic uplink transmission resource is not being used. As another method, periodic transmission resources may be released only in case that a periodic downlink transmission resource or a periodic uplink transmission resource is configured or is configured and used.

All HARQ buffers configured in an uplink or downlink bandwidth part are emptied.

A terminal does not transmit an SRS for an uplink bandwidth part of the cell.

In the bandwidth part of the cell, uplink data is not transmitted by UL-SCH.

A random access procedure is not performed for the bandwidth part of the cell.

In the bandwidth part of the cell, a terminal does not monitor a PDCCH.

A terminal does not monitor a PDCCH for the bandwidth part of the cell. However, if a dormant bandwidth part is configured for the cell, in case of cross-scheduling, a PDCCH for the cell (for example, the SCell) may be monitored and indicated in a scheduled cell (for example, a PCell).

PUCCH or SPUCCH transmission is not performed in the bandwidth part of the cell.

If indication of activation of a bandwidth part (for example, a downlink bandwidth part) of a current cell (a PCell or an SCell) or the cell is received by DCI (an L1 control signal) of a PDCCH, a MAC CE, or an RRC message, or if indication of switching a dormant bandwidth part (for example, a downlink bandwidth part) to an active bandwidth part (or a bandwidth part which is not a dormant bandwidth part) is received by DCI (an L1 control signal) of a PDCCH, a MAC CE, or an RRC message (in case that indication is received by an L1 control signal of a PDCCH, indication may be received in a PDCCH of an own cell by self-scheduling or indication may be received in a PDCCH for a PCell in the cell by cross-carrier scheduling), one or a plurality of the following operations may be performed.

If a current downlink bandwidth part of a serving cell is not a dormant bandwidth part or if the serving cell was deactivated and is activated by indication of the MAC CE, an uplink bandwidth part or downlink bandwidth part is switched to a designated bandwidth part (for example, an uplink bandwidth part or uplink first active bandwidth part), and the bandwidth part is activated.

If a current downlink bandwidth part of a serving cell is not a dormant bandwidth part or if the serving cell was deactivated and is activated by indication of the MAC CE, in the activated bandwidth part, a terminal transmits a sounding reference signal (SRS) so that a base station can perform channel measurement for an uplink. For example, periodical transmission may be performed.

If a current downlink bandwidth part of a serving cell is not a dormant bandwidth part or if the serving cell was deactivated and is activated by indication of the MAC CE, in case that a PUCCH is configured in the activated bandwidth part, PUCCH transmission is performed.

If a current downlink bandwidth part of a serving cell is not a dormant bandwidth part or if the serving cell was deactivated and is activated by indication of the MAC CE, in relation to the above, a bandwidth part inactive timer or cell deactivation timer starts or restarts. As another method, a bandwidth part inactive timer or cell deactivation timer may start or restart only in case that a bandwidth part dormant timer or cell dormant timer is not configured. If the bandwidth part dormant timer or cell dormant timer may be configured by an RRC message, a bandwidth part or a cell may be made to be dormant when the timer expires. For example, the bandwidth part inactive timer or cell deactivation (inactive) timer may start or restart only in the dormant bandwidth part or cell.

If a current downlink bandwidth part of a serving cell is not a dormant bandwidth part or if the serving cell was deactivated and is activated by indication of the MAC CE, in case that there is a type 1 configuration transmission resource of which a use is suspended, a stored type 1 transmission resource may be initialized and used according to original configuration. The type 1 configuration transmission resource is a periodic transmission resource (an uplink or a downlink) assigned in advance by an RRC message and means a transmission resource which may be activated and used by an RRC message.

If a current downlink bandwidth part of a serving cell is not a dormant bandwidth part or if the serving cell was deactivated and is activated by indication of the MAC CE, PHR is triggered for the bandwidth part.

In the activated bandwidth part, a terminal may report a channel measurement result (CSI, CQI, PMI, RI, PTI, or CRI) according to base station configuration for a downlink.

If a current downlink bandwidth part of a serving cell is not a dormant bandwidth part or if the serving cell was deactivated and is activated by indication of the MAC CE, a PDCCH is monitored to read indication of a base station in the activated bandwidth part.

If a current downlink bandwidth part of a serving cell is not a dormant bandwidth part or if the serving cell was deactivated and is activated by indication of the MAC CE, a PDCCH is monitored to read cross-scheduling for the activated bandwidth part.

If a current downlink bandwidth part of a serving cell is not a dormant bandwidth part or if the serving cell was deactivated and is activated by indication of the MAC CE, in relation to the above, a bandwidth part inactive timer starts or restarts. As another method, a bandwidth part inactive timer may start or restart only in case that a bandwidth part dormant timer is not configured. If the bandwidth part dormant timer may be configured by an RRC message, a bandwidth part may be made to be dormant or may be switched to a dormant bandwidth part when the timer expires. For example, the bandwidth part inactive timer may start or restart only in the dormant bandwidth part.

If a current downlink bandwidth part of a serving cell is not a dormant bandwidth part or if the serving cell was deactivated and is activated by indication of the MAC CE, and if a link bandwidth part dormant timer is configured for the bandwidth part, a bandwidth part dormant timer starts or restarts for the bandwidth part.

In addition, in the first embodiment, if a base station has triggered a random access procedure for an SCell, the base station may not indicate bandwidth part switching of a downlink bandwidth part to a dormant bandwidth part for the SCell. It is because if switching to a downlink dormant bandwidth part is performed, a random access procedure may not be successfully performed because an uplink bandwidth part is deactivated.

Moreover, in the first embodiment, switching and a related operation of a general bandwidth part (for example, a bandwidth part which is not a dormant bandwidth part) or a dormant bandwidth part may be performed when a cell (for example, an SCell) in which the bandwidth part is operated is active. Accordingly, in case that MAC control information (a MAC control element, a MAC CE) including an indicator for activating or deactivating a cell is received, if the cell is operating a downlink dormant bandwidth part, and if a MAC CE including an indicator for activating the cell is received, the indicator may be ignored. Furthermore, if a MAC CE including an indicator for deactivating the cell is received while the cell is operating a downlink dormant bandwidth part, the downlink dormant bandwidth part of the cell may be deactivated. As another method, in the first embodiment, if a cell deactivation timer is operating when a downlink bandwidth part is switched to a dormant bandwidth part, the cell deactivation timer may be stopped. This is an operation applicable to prevent a dormant bandwidth part from being cell-deactivated due to cell timer expiration and being automatically deactivated.

In the disclosure, a second embodiment of shifting a state in units of bandwidth parts and operating an operation according thereto is as follows.

In the second embodiment, when a plurality of bandwidth parts is configured for each of cells in a terminal by an RRC message, a dormant bandwidth part is configured by an indicator or a bandwidth part identifier, as in FIG. 1F. In addition, if a base station transmits, to a terminal, a MAC CE including an indicator for deactivating a specific cell, the terminal may deactivate the specific cell and switch the specific cell to a dormant bandwidth part according to indication of the MAC CE in case that a dormant bandwidth part is configured for the cell. In the dormant bandwidth part of the specific cell, monitoring of a PDCCH is not performed, and data transmission or reception is not performed, but a channel measurement report is performed so as to reduce consumption of a terminal battery and allow rapid bandwidth part activation. Moreover, in case that data transmission or reception is required for a deactivated cell switched by the dormant bandwidth part, a base station may transmit a MAC CE including an indicator for activating a specific cell to a terminal. If a terminal receives the MAC CE, the specific cell may be activated and switched to a first active bandwidth part and may be activated. A PDCCH may be re-monitored in the switched bandwidth part, and data transmission or reception may start. However, in the second embodiment, in case that deactivation of a specific cell is indicated by an RRC message, all bandwidth parts may be deactivated although a dormant bandwidth part is configured for the specific cell. Furthermore, if indication of deactivation of a cell deactivated by an RRC message is received by a MAC CE, a terminal may activate a dormant bandwidth part, perform an operation in the dormant bandwidth part, and start a channel measurement report in case that a dormant bandwidth part is configured for the cell.

In the second embodiment, a dormant bandwidth part may be operated or used in a deactivated cell. In addition, in the second embodiment, switching a bandwidth part to a dormant bandwidth part may indicate switching of a downlink bandwidth part. It is because an operation of not monitoring a PDCCH and performing a channel measurement report is an operation of a terminal for a downlink bandwidth part of the cell.

In the second embodiment, a state for a cell (for example, an SCell) may maintain and operate in an active or deactivated state, state shifts between states may be supported, a state for a bandwidth part may maintain and operate in an active, dormant, or deactivated state, and a state shift of a bandwidth part or switching of a bandwidth part may operate depending on a cell state.

A (2-1)th embodiment about a specific operation according to a cell state (an active state or a deactivated state) of a MAC layer (MAC entity) according to the second embodiment is as follows.

If a terminal is indicated to operate in a dormant bandwidth part for a serving cell (a PCell or an SCell), if indication of deactivation of the cell is received by a MAC CE or an RRC message, if indication of switching a bandwidth part (for example, a downlink bandwidth part) to a dormant bandwidth part is received by DCI (an L1 control signal) of a PDCCH, a MAC CE, or an RRC message, or if a cell deactivation timer has been configured and the timer has expired, one or a plurality of the following operations may be performed.

If a dormant bandwidth part is configured for the serving cell, the bandwidth part is switched to a downlink bandwidth part indicated by a dormant bandwidth part identifier. Otherwise, the bandwidth part is made to be dormant.

An uplink bandwidth part is deactivated.

A cell deactivation timer which is configured for in the cell or the bandwidth part or which is being operated is stopped.

If a bandwidth part inactive timer configured for the bandwidth part of the cell is being operated, the bandwidth part inactive timer is stopped. This is to prevent an unnecessary bandwidth part switching procedure in the cell.

A periodic downlink transmission resource (DL SPS or configured downlink assignment) or a periodic uplink transmission resource (UL SPS or configured uplink grant type 2) configured in a bandwidth part of the cell may be released (cleared). In the above, releasing (clearing) means that configuration information such as cycle information configured in an RRC message is stored in a terminal, but information on a periodic transmission resource indicated or activated by L1 signaling (for example, DCI) is removed and is no longer used. The method proposed above, that is, an operation of releasing (clearing) a configured periodic downlink transmission resource (DL SPS or configured downlink assignment) or a configured periodic uplink transmission resource (UL SPS or configured uplink grant) may be performed only in case that a bandwidth part is shifted from an active state to a dormant state. It is because in case that a bandwidth part shifts from a deactivated state to a dormant state, there is no information on periodic transmission resource information indicated or activated by L1 signaling. As another method, periodic transmission resources may be released only in case that a periodic downlink transmission resource or a periodic uplink transmission resource is configured or is configured and used.

A periodic uplink transmission resource (configured uplink grant Type 1 configured by RRC) configured in the bandwidth part of the cell may be suspended (stopped). In the above, suspending (stopping) means that transmission resource configuration information configured in an RRC message is stored in a terminal but is no longer used. The method proposed above, that is, an operation of suspending a configured periodic uplink transmission resource (configured uplink grant type 1) may be performed only in case that a bandwidth part is shifted from an active state to a dormant state. It is because in case that a bandwidth part shifts from a deactivated state to a dormant state, a periodic uplink transmission resource is not being used. As another method, periodic transmission resources may be released only in case that a periodic downlink transmission resource or a periodic uplink transmission resource is configured or is configured and used.

All HARQ buffers configured in an uplink or downlink bandwidth part are emptied.

A terminal does not transmit an SRS for an uplink bandwidth part of the cell.

If a dormant bandwidth part is configured for the cell, in the dormant bandwidth part, a terminal performs channel measurement (CSI, CQI, PMI, RI, PTI, CRI, or the like) according to configuration of a base station for a downlink and performs a measurement report. For example, a channel or frequency measurement report may be periodically performed.

In the bandwidth part of the cell, uplink data is not transmitted by UL-SCH.

A random access procedure is not performed for the bandwidth part of the cell.

In the bandwidth part of the cell, a terminal does not monitor a PDCCH.

A terminal does not monitor a PDCCH for the bandwidth part of the cell. However, if a dormant bandwidth part is configured for the cell, in case of cross-scheduling, a PDCCH for the cell (for example, the SCell) may be monitored and indicated in a scheduled cell (for example, a PCell).

PUCCH or SPUCCH transmission is not performed in the bandwidth part of the cell.

If a dormant bandwidth part is configured for the cell, the downlink bandwidth part may be made to be dormant, channel measurement may be performed and reported, and the uplink bandwidth part of the cell may be deactivated and may not be used. It is because channel measurement is performed only for a downlink bandwidth part in a dormant SCell and a measurement result is reported in the uplink bandwidth part of the SCell with a PUCCH or an SPCell (a PCell or a PSCell).

In the disclosure, a terminal operation for an active bandwidth part (an active BWP) is as follows.

If indication of activation of a bandwidth part (for example, a downlink bandwidth part) of a current cell (a PCell or an SCell) or the cell is received by DCI (an L1 control signal) of a PDCCH, a MAC CE, or an RRC message, or if indication of switching a bandwidth part (for example, a downlink bandwidth part) to an active bandwidth part (or a bandwidth part which is not a dormant bandwidth part) is received by DCI (an L1 control signal) of a PDCCH, a MAC CE, or an RRC message (in case that indication is received by an L1 control signal of a PDCCH, indication may be received in a PDCCH of an own cell by self-scheduling or indication may be received in a PDCCH for a PCell in the cell by cross-carrier scheduling), one or a plurality of the following operations may be performed.

Switching to an uplink bandwidth part or downlink bandwidth part indicated above and activation are performed. Otherwise, an uplink bandwidth part or downlink bandwidth part is switched to a designated bandwidth part (for example, an uplink bandwidth part or uplink first active bandwidth part), and the bandwidth part is activated.

In the activated bandwidth part, a terminal transmits a sounding reference signal (SRS) so that a base station can perform channel measurement for an uplink. For example, periodical transmission may be performed.

If a PUCCH is configured in the activated bandwidth part, PUCCH transmission is performed.

In relation to the above, a bandwidth part inactive timer or cell deactivation timer starts or restarts. As another method, a bandwidth part inactive timer or cell deactivation timer may start or restart only in case that a bandwidth part dormant timer or cell dormant timer is not configured. If the bandwidth part dormant timer or cell dormant timer may be configured by an RRC message, a bandwidth part or a cell may be made to be dormant when the timer expires. For example, the bandwidth part inactive (deactivation) timer or cell deactivation (inactive) timer may start or restart only in the dormant bandwidth part or cell.

If there is a type 1 configuration transmission resource of which a use is suspended (stopped), a stored type 1 transmission resource may be initialized and used according to original configuration. The type 1 configuration transmission resource is a periodic transmission resource (an uplink or a downlink) assigned in advance by an RRC message and means a transmission resource which may be activated and used by an RRC message.

PHR is triggered for the bandwidth part.

In the activated bandwidth part, a terminal may report a channel measurement result (CSI, CQI, PMI, RI, PTI, or CRI) according to base station configuration for a downlink.

A PDCCH is monitored to read indication of a base station in the activated bandwidth part.

A PDCCH is monitored to read cross-scheduling for the activated bandwidth part.

In relation to the above, a bandwidth part inactive timer starts or restarts. As another method, a bandwidth part inactive timer may start or restart only in case that a bandwidth part dormant timer is not configured. If the bandwidth part dormant timer may be configured by an RRC message, a bandwidth part may be made to be dormant or may be switched to a dormant bandwidth part when the timer expires. For example, the bandwidth part inactive timer may start or restart only in the dormant bandwidth part.

If a link bandwidth part dormant timer is configured for the bandwidth part, a bandwidth part dormant timer starts or restarts for the bandwidth part.

In the disclosure, the first embodiment or the second embodiment of operating a state shift (or bandwidth part switching) and an operation according thereto in units of bandwidth parts may be fused or expanded to compose and operate various embodiments. For example, a third embodiment of operating a state shift and an operation according thereto in units of bandwidth parts may be as follows.

In the third embodiment, when a plurality of bandwidth parts is configured for each of cells in a terminal by an RRC message, a dormant bandwidth part is configured by an indicator or a bandwidth part identifier, as in FIG. 1F. In addition, a base station may indicate switching of a bandwidth part to a dormant bandwidth part for an active cell by using DCI of a PDCCH, which is L1 signaling, monitoring of a PDCCH is not performed in the dormant bandwidth part, and data transmission or reception is not performed, but a channel measurement report is performed so as to reduce consumption of a terminal battery and allow rapid bandwidth part activation. A base station may indicate bandwidth part switching by transmitting DCI of a PDCCH, which is L1 signaling, in the cell (self-scheduling) or in a PCell (cross-carrier scheduling).

In addition, in case that data transmission or reception is required for an active cell switched by the dormant bandwidth part, a base station may transmit, to a terminal, a MAC CE including an indicator for activating a cell, may indicate switching of a dormant bandwidth part to a bandwidth part (or an active bandwidth part) other than a dormant bandwidth part among a plurality of bandwidth parts configured by an RRC message for the active cell, may re-monitor a PDCCH in the switched bandwidth part, and may start data transmission or reception.

Moreover, in case that a base station transmits a MAC CE including an indicator for deactivating a cell to a terminal, the terminal may deactivate an uplink bandwidth part or downlink bandwidth part of the specific cell and perform deactivation operations proposed in the disclosure. In the third embodiment, a bandwidth part may not be operated or used in a deactivated cell. Furthermore, in the third embodiment, if switching a bandwidth part to a dormant bandwidth part indicates switching of a downlink bandwidth part, switching a dormant bandwidth part to an active bandwidth part may be performed by a cell activation indicator of a MAC CE. Specific operations related to a cell state and bandwidth part switching operations may be operated based on operations proposed in the first embodiment or the second embodiment.

Likewise, the first embodiment, the second embodiment, or the third embodiment may be fused or expanded to compose and operate various embodiments.

FIG. 1L shows MAC control information indicating a state shift to an active state, a dormant state, or a deactivated state, proposed by the disclosure.

An activation and deactivation MAC CE proposed in the disclosure may have a structure illustrated in FIG. 1L as an embodiment, and may be divided into a MAC CE structure (1L-05) having a size of 1 byte supporting seven SCells and a MAC CE structure (1L-10) having a size of 4 bytes supporting thirty-one SCells. The activation and deactivation MAC CE are characterized as follows.

When a dormant MAC CE is not received and only the activation and deactivation MAC CE is received, a terminal operation is as follows.

If each of fields of the activation and deactivation MAC CE represents a corresponding SCell identifier, a value corresponding to each of the fields indicates whether an SCell is activated or deactivated. If the value of an indicator for an SCell represented by an SCell identifier is 1, the SCell is activated in case that the SCell is in a deactivation state. However, if the SCell is in a state other than a deactivated state, the indicator value is ignored. If the value of an indicator for an SCell represented by an SCell identifier is 0, the SCell is deactivated. That is, irrespective of the state of the SCell, the SCell is deactivated in case that the value of the indicator for the SCell is 0.

A hibernation (dormant) MAC CE proposed in the disclosure may have a structure illustrated in FIG. 1L as an embodiment, and may be divided into a MAC CE structure (1L-05) having a size of 1 byte supporting seven SCells and a MAC CE structure (1L-10) having a size of 4 bytes supporting thirty-one SCells. The hibernation MAC CE is characterized as follows.

When an activation and deactivation MAC CE is not received and only the dormant MAC CE is received, a terminal operation is as follows.

If each of fields of the dormant MAC CE represents a corresponding SCell identifier, a value corresponding to each of the fields indicates whether an SCell is activated or deactivated. If the value of an indicator for an SCell represented by an SCell identifier is 1, the SCell is made to be dormant. That is, irrespective of the state of the SCell, the SCell is made to be dormant in case that the value of the indicator for the SCell is 1. If the value of an indicator for an SCell represented by an SCell identifier is 0, the SCell is activated in case that the SCell is in a dormant state. However, if the SCell is in a state other than a dormant state, the indicator value is ignored.

When an activation and deactivation MAC CE and a dormant MAC CE are simultaneously received to one MAC layer (MAC entity), a terminal operation is as follows.

If each of fields of the activation and deactivation MAC CE and the dormant MAC CE represents a corresponding SCell identifier, a combination of values corresponding to the fields, respectively, indicates a state shift such as activation, hibernation, or deactivation of an SCell. In terms of the activation and deactivation MAC CE and the dormant MAC CE, MAC CEs having a size of 1 byte or MAC CEs having a size of 4 bytes may be received together in one MAC layer (MAC entity). When the two types of MAC CEs are received together, a state shift of each of SCells indicated by the MAC CEs may be determined according to a combination of indication values of the MAC CEs as in the following table.

TABLE 1

| Hibernation MAC control element $C_i$ | Activation/Deactivation MAC control element $C_i$ | SCell shall be |
|---|---|---|
| 0 | 0 | Deactivated |
| 0 | 1 | Activated |
| 1 | 0 | Reserved MAC control element combination |
| 1 | 1 | Dormant |

By using an R field included in the structure of a cell activation and deactivation MAC CE or a cell hibernation MAC CE proposed above, state indication for activation, deactivation, and hibernation for each of links may be performed. For example, if an R field is 0, a downlink of a cell may be indicated to shift to an active, deactivated, or dormant state. If an R field is 1, an uplink of a cell may be indicated to shift to an active, deactivated, or dormant state. As another method, the R field may be defined and used to indicate only a state shift of a downlink (or an uplink). In addition, as in 1L-15, a MAC CE including each of cell identifiers and each of link indicators or state indicators may be defined to indicate a state shift for each of cells and for each of links.

In addition, a new MAC CE for supporting embodiments and expanding embodiments to various embodiments may be designed or existing MAC CE functions may be expanded.

For example, MAC CEs proposed and described in FIG. 1L of the disclosure may be applied, and in FIG. 1L, in 1L-05 or 1L-10, a reservation bit (an R bit) may be expanded to expand and apply functions described in FIG. 1L of the disclosure.

For example, if a reservation bit is configured to 0, a 1 bit indicator indicating an identifier of each of cells (SCells) may be defined and used as follows.

If a 1 bit indicator is configured to 0, a state shift of a cell or a bandwidth part may be performed as follows.

A deactivated cell or bandwidth part is shifted to a deactivated state or is maintained as is.

An active cell or bandwidth part is shifted to a deactivated state.

A dormant cell or bandwidth part is shifted to a deactivated state

If a 1 bit indicator is configured to 1, a state shift of a cell or a bandwidth part may be performed as follows.

An active cell or bandwidth part is shifted to an active state or is maintained as is.

A deactivated cell or bandwidth part is shifted to an active state.

A dormant cell or bandwidth part is shifted to a dormant state or is maintained as is.

If a reservation bit is configured to 1, a 1 bit indicator indicating an identifier of each of cells (SCells) may be defined and used as follows. As another method, a newly defined logical identifier and a newly defined MAC CE may be defined and used as follows.

If a 1 bit indicator is configured to 0, a state shift of a cell or a bandwidth part may be performed as follows.

An active cell or bandwidth part is shifted to an active state or is maintained as is.

A dormant cell or bandwidth part is shifted to an active state.

A deactivated cell or bandwidth part is shifted to a deactivated state or is maintained as is.

If a 1 bit indicator is configured to 1, a state shift of a cell or a bandwidth part may be performed as follows.

An active cell or bandwidth part is shifted to a dormant state.

A deactivated cell or bandwidth part is shifted to a dormant state.

A dormant cell or bandwidth part is shifted to a dormant state or is maintained as is.

Functions of a MAC CE, exemplified and described above, may be variously expanded and designed to indicate a state shift or switching of a cell or a bandwidth part so as to be applied to embodiments.

Figure 1M:
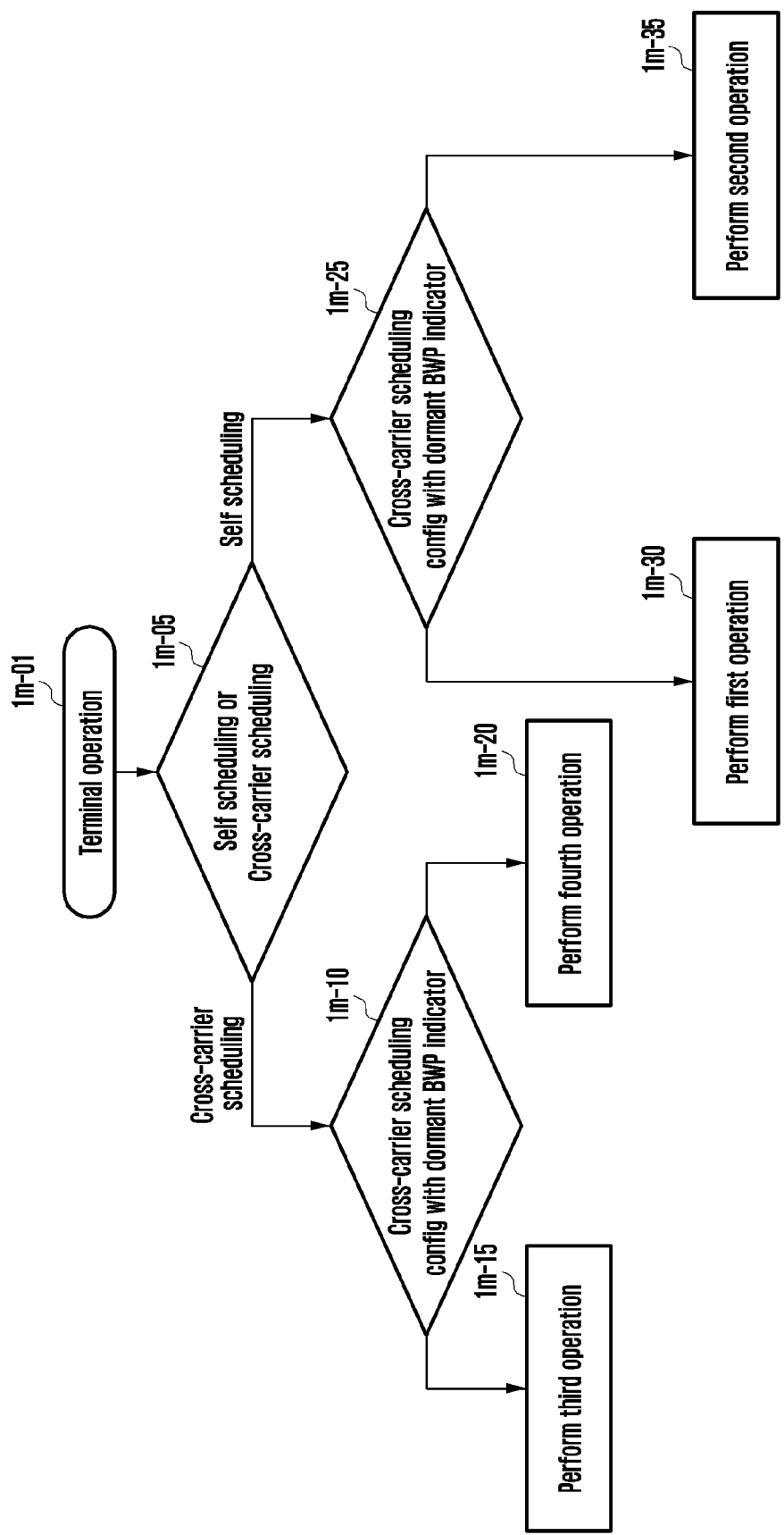
FIG. 1M illustrates a specific terminal operation in which, in the disclosure, a terminal reads a PDCCH according to cell-specific scheduling configuration information and performs a bandwidth part switching procedure.

FIG. 1M shows a specific terminal operation in which, in the disclosure, a terminal reads a PDCCH according to cell-specific scheduling configuration information and performs a bandwidth part switching procedure.

An embodiment (1M-01) about a specific operation of a terminal of the disclosure is as follows.

1> In case that scheduling configuration information of a serving cell includes self-scheduling configuration information (for example, an own identifier) or cross-carrier scheduling configuration information (for example, another identifier) and a dormant bandwidth part identifier or indicator is included in the cross-carrier scheduling configuration information (or in case that a dormant bandwidth part identifier or indicator is included in the scheduling configuration information, 1M-25), and in case that self-scheduling is configured in a current serving cell (in case that cross-carrier scheduling is not configured, 1M-05), a first operation below is performed (1M-30).

2> If an active bandwidth part of a current serving cell (SCell) is a first bandwidth part, 3> by applying a cross-carrier scheduling method, a PDCCH is received in a cell indicated as a cell scheduled in the scheduling configuration information (or a scheduling cell which receives scheduling indication), and a PDCCH is not received in the current serving cell (SCell).

3> if bandwidth part switching to a first bandwidth part is indicated in the received PDCCH, 4> the first method, the second method, the third method, the fourth method, or the fifth method is applied. For example, switching to a bandwidth part indicated in the DCI is performed, and data corresponding to a downlink transmission resource indicated in the DCI is not received and is ignored.

3> if bandwidth part switching to a second bandwidth part is indicated in the received PDCCH, 4> switching to a bandwidth part indicated in the DCI is performed, data corresponding to a downlink transmission resource indicated in the DCI is received, and HARQ ACK or NACK corresponding thereto is transmitted.

2> If an active bandwidth part of a current serving cell (SCell) is a second bandwidth part, 3> a PDCCH is not received in a cell indicated as a cell scheduled in the scheduling configuration information (or a scheduling cell which receives scheduling indication), and a PDCCH is received in an active bandwidth part of the current serving cell (SCell) by applying a self-scheduling method.

3> if bandwidth part switching to a first bandwidth part is indicated in the received PDCCH, 4> the first method, the second method, the third method, the fourth method, or the fifth method is applied. For example, switching to a bandwidth part indicated in the DCI is performed, and data corresponding to a downlink transmission resource indicated in the DCI is not received and is ignored.

3> if bandwidth part switching to a second bandwidth part is indicated in the received PDCCH, 4> switching to a bandwidth part indicated in the DCI is performed, data corresponding to a downlink transmission resource indicated in the DCI is received, and HARQ ACK or NACK corresponding thereto is transmitted.

1> In case that scheduling configuration information of a serving cell includes self-scheduling configuration information (for example, an own identifier) or cross-carrier scheduling configuration information (for example, another identifier) and a dormant bandwidth part identifier or indicator is not included in the cross-carrier scheduling configuration information (or in case that a dormant bandwidth part identifier or indicator is not included in the scheduling configuration information, 1M-25), and in case that self-scheduling is configured in a current serving cell (in case that cross-carrier scheduling is not configured, 1M-05), a second operation below is performed (1M-35).

2> A PDCCH is received and read in an active bandwidth part of a current cell by a self-scheduling method according to the scheduling configuration information. Cross-carrier scheduling is not applied.

2> If bandwidth part switching to a second bandwidth part is indicated in the received PDCCH, 3> switching to a bandwidth part indicated in the DCI is performed, data corresponding to a downlink transmission resource indicated in the DCI is received, and HARQ ACK or NACK corresponding thereto is transmitted.

1> In case that scheduling configuration information of a serving cell includes self-scheduling configuration information (for example, an own identifier) or cross-carrier scheduling configuration information (for example, another identifier) and a dormant bandwidth part identifier or indicator is included in the cross-carrier scheduling configuration information (or in case that a dormant bandwidth part identifier or indicator is included in the scheduling configuration information, 1M-10), and in case that cross-carrier scheduling is configured in a current serving cell (in case that self-scheduling is not configured, 1M-05), a third operation below is performed (1M-15).

2> By applying a cross-carrier scheduling method, a PDCCH is received in a cell indicated as a cell scheduled in the scheduling configuration information (or a scheduling cell which receives scheduling indication), and a PDCCH is not received in the current serving cell (SCell).

2> If bandwidth part switching to a first bandwidth part is indicated in the received PDCCH, 3> the first method, the second method, the third method, the fourth method, or the fifth method is applied. For example, switching to a bandwidth part indicated in the DCI is performed, and data corresponding to a downlink transmission resource indicated in the DCI is not received and is ignored.

2> if bandwidth part switching to a second bandwidth part is indicated in the received PDCCH, 3> switching to a bandwidth part indicated in the DCI is performed, data corresponding to a downlink transmission resource indicated in the DCI is received, and HARQ ACK or NACK corresponding thereto is transmitted.

1> In case that scheduling configuration information of a serving cell includes self-scheduling configuration information (for example, an own identifier) or cross-carrier scheduling configuration information (for example, another identifier) and a dormant bandwidth part identifier or indicator is not included in the cross-carrier scheduling configuration information (or in case that a dormant bandwidth part identifier or indicator is not included in the scheduling configuration information, 1M-10), and in case that cross-carrier scheduling is configured in a current serving cell (in case that self-scheduling is not configured, 1M-05), a fourth operation below is performed (1M-20).

2> A PDCCH is received and read in an active bandwidth part of a scheduled cell indicated in the scheduling information by a cross-carrier scheduling method according to the scheduling configuration information. Self-scheduling is not applied.

2> If bandwidth part switching to a second bandwidth part is indicated in the received PDCCH, 3> switching to a bandwidth part indicated in the DCI is performed, data corresponding to a downlink transmission resource indicated in the DCI is received, and HARQ ACK or NACK corresponding thereto is transmitted.

Figure 1N:
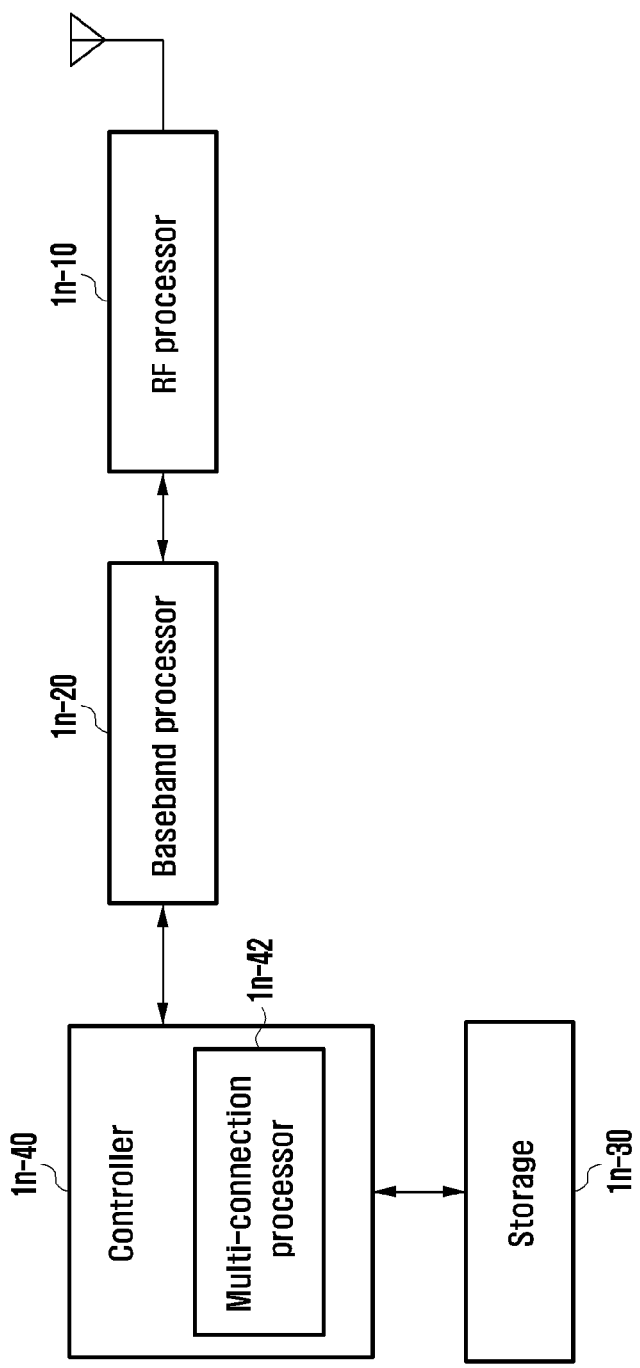
FIG. 1N illustrates the structure of a terminal to which an embodiment is applicable.
Figure 10:
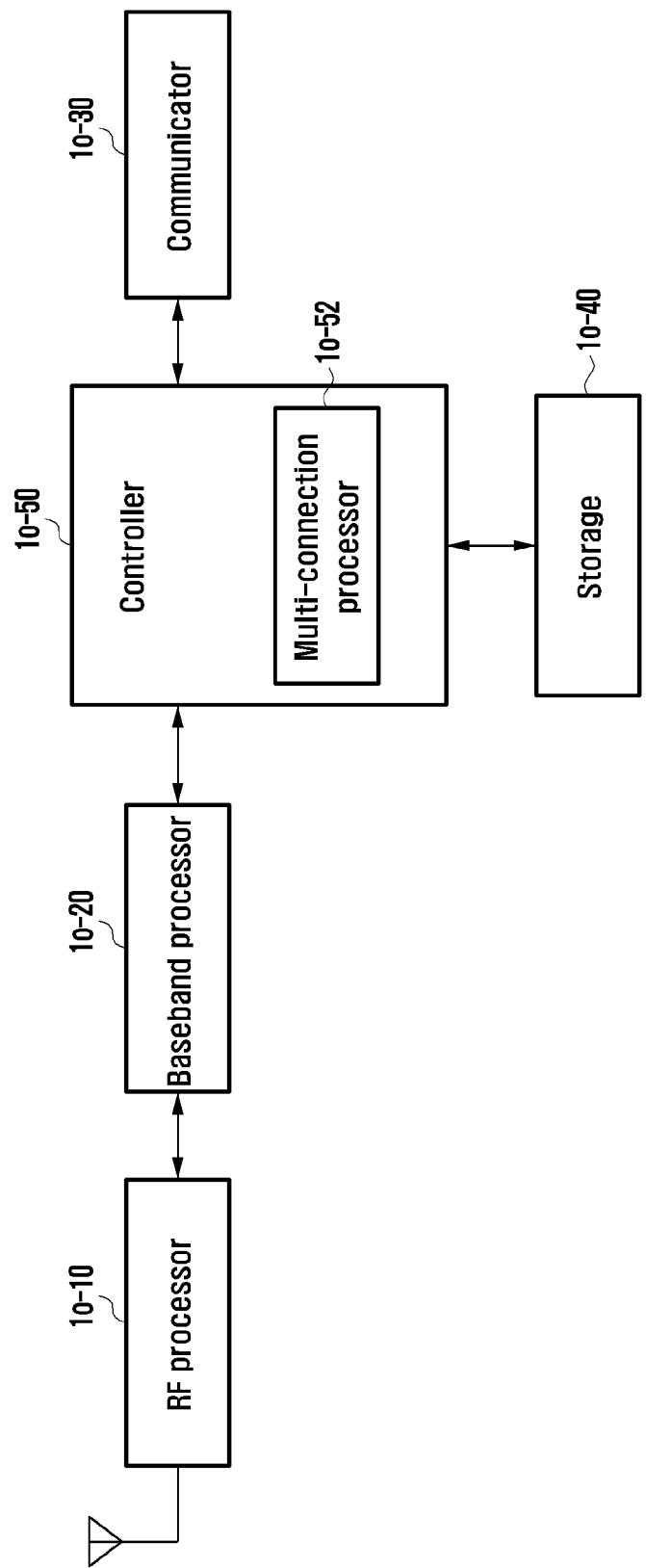

FIG. 1N illustrates the structure of a terminal to which an embodiment is applicable.

Referring to FIG. 1N, a terminal includes a radio frequency (RF) processor 1N-10, a baseband processor 1N-20, a storage 1N-30, and a controller 1N-40.

The radio frequency (RF) processor 1N-10 performs a function of transmitting or receiving a signal through a radio channel, such as band conversion and amplification of a signal. That is, the RF processor 1N-10 up-converts a baseband signal provided from the baseband processor 1N-20 into an RF band signal and then transmits the baseband signal through an antenna, and down-converts the RF band signal received through the antenna into the baseband signal. For example, the RF processor 1N-10 may include a transmission filter, a reception filter, an amplifier, a mixer, an oscillator, a digital to analog convertor (DAC), an analog to digital convertor (ADC), or the like. FIG. 1J illustrates only one antenna but the terminal may include multiple antennas. In addition, the RF processor 1N-10 may include multiple RF chains. Moreover, the RF processor 1N-10 may perform beamforming. For the beamforming, the RF processor 1N-10 may adjust a phase and a size of each of signals transmitted or received through multiple antennas or antenna elements. Furthermore, the RF processor may perform a MIMO operation and receive multiple layers when the MIMO operation is performed. The RF processor 1N-10 may appropriately configure multiple antennas or antenna elements according to a control of the controller so as to perform reception beam sweeping, or may adjust the direction of a reception beam and a beam width such that a reception beam accords with a transmission beam.

The baseband processor 1N-20 performs a function for conversion between a baseband signal and a bitstream according to the physical layer standard of a system. For example, at the time of data transmission, the baseband processor 1N-20 produces complex symbols by encoding and modulating a transmission bitstream. In addition, at the time of data reception, the baseband processor 1N-20 restores a reception bitstream by demodulating and decoding a baseband signal provided from the RF processor 1N-10. For example, according to an orthogonal frequency division multiplexing (OFDM) scheme, at the time of data transmission, the baseband processor 1N-20 produces complex symbols by encoding and modulating a transmission bitstream, maps the complex symbols to subcarriers, and then configures OFDM symbols via an inverse fast Fourier transform (IFFT) operation and a cyclic prefix (CP) insertion. Moreover, at the time of data reception, the baseband processor 1N-20 divides a baseband signal provided from the RF processor 1N-10 into OFDM symbol units, restores signals mapped to subcarriers via a fast Fourier transform (FFT) operation, and then restores a reception bitstream via demodulation and decoding.

The baseband processor 1N-20 and the RF processor 1N-10 transmit and receive a signal, as described above. Accordingly, each of the baseband processor 1N-20 and the RF processor 1N-10 may be referred to as a transmitter, a receiver, a transceiver, or a communicator. In addition, at least one of the baseband processor 1N-20 or the RF processor 1N-10 may include multiple communication modules so as to support multiple different radio access technologies from each other. Moreover, at least one of the baseband processor 1N-20 and the RF processor 1N-10 may include different communication modules from each other to process signals of different frequency bands from each other. For example, the different radio access technologies from each other may include an LTE network, an NR network, and the like. Furthermore, the different frequency bands from each other may include a super-high frequency (SHF) (for example: 2.5 GHz and 5 GHz) band and a millimeter (mm) wave (for example: 60 GHz) band.

The storage 1N-30 stores data such as a basic program, an application program, and configuration information for operations of the terminal. The storage 1N-30 provides stored data according to a request from the controller 1N-40.

The controller 1N-40 controls overall operations of the terminal. For example, the controller 1N-40 transmits or receives a signal through the baseband processor 1N-20 and the RF processor 1N-10. In addition, the controller 1N-40 records and reads data to and from the storage 1N-30. To this end, the controller 1N-40 may include at least one processor. For example, the controller 1N-40 may include a communication processor (CP) for performs a control for communication and an application processor (AP), for controlling an upper layer such as an application program.

FIG. 1O illustrates the block composition of a TRP in a radio communication system to which an embodiment is applicable.

As illustrated in FIG. 1O, a base station is configured to include an RF processor 1O-10, a baseband processor 1O-20, a backhaul communicator 1O-30, a storage 1O-40, and a controller 1O-50.

The radio frequency (RF) processor 1O-10 performs a function of transmitting or receiving a signal through a radio channel, such as band conversion and amplification of a signal. That is, the RF processor 1O-10 up-converts a baseband signal provided from the baseband processor 1O-20 into an RF band signal and then transmits the baseband signal through an antenna, and down-converts the RF band signal received through the antenna into the baseband signal. For example, the RF processor 1O-10 may include a transmission filter, a reception filter, an amplifier, a mixer, an oscillator, a DAC, an ADC, or the like. FIG. 1O illustrates only one antenna but the first access node may include multiple antennas. In addition, the RF processor 1O-10 may include multiple RF chains. Moreover, the RF processor 1O-10 may perform beamforming. For the beamforming, the RF processor 1O-10 may adjust a phase and a size of each of signals transmitted or received through multiple antennas or antenna elements. The RF processor may perform a downward MIMO operation by transmitting one or more layers.

The baseband processor 1O-20 performs a function for conversion between a baseband signal and a bitstream according to the physical layer standard of a first radio access technology. For example, at the time of data transmission, the baseband processor 1O-20 produces complex symbols by encoding and modulating a transmission bitstream. In addition, at the time of data reception, the baseband processor 1O-20 restores a reception bitstream by demodulating and decoding a baseband signal provided from the RF processor 1O-10. For example, according to an OFDM scheme, at the time of data transmission, the baseband processor 1O-20 produces complex symbols by encoding and modulating a transmission bitstream, maps the complex symbols to subcarriers, and then configures OFDM symbols via an IFFT operation and a CP insertion. Moreover, at the time of data reception, the baseband processor 1O-20 divides a baseband signal provided from the RF processor 1O-10 into OFDM symbol units, restores signals mapped to subcarriers via an FFT operation, and then restores a reception bitstream via demodulation and decoding. The baseband processor 1O-20 and the RF processor 1O-10 transmit and receive a signal, as described above. Accordingly, each of the baseband processor 1O-20 and the RF processor 1O-10 may be referred to as a transmitter, a receiver, a transceiver, a communicator, or a radio communicator.

The communicator 1O-30 provides an interface for performing communication with other nodes in a network.

The storage 1O-40 stores data such as a basic program, an application program, and configuration information for operations of the main base station. In particular, the storage 1O-40 may store information on a bearer assigned to a connected terminal, a measurement result reported by a connected terminal, or the like. In addition, the storage 1O-40 may store information which is a criterion for determining whether to provide or interrupt multi-connection for a terminal. Moreover, the storage 1O-40 provides stored data according to a request from the controller 1O-50.

The controller 1O-50 controls overall operations of the main base station. For example, the controller 1O-50 transmits or receives a signal through the baseband processor 1O-20 and the RF processor 1O-10 or through the backhaul communicator 1O-30. In addition, the controller 1O-50 records and reads data to and from the storage 1O-40. To this end, the controller 1O-50 may include at least one processor.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
   receiving, from a base station, a radio resource control (RRC) message for configuring a secondary cell (SCell), the RRC message including first information on an initial downlink bandwidth part (BWP) of the SCell, second information on a dormant BWP among one or more downlink BWPs of the SCell, and third information on a first active BWP among the one or more downlink BWPs, wherein the first active BWP is to be activated by a BWP switching from the dormant BWP;
   receiving, from the base station via a primary cell (PCell), downlink control information (DCI) indicating a BWP switching for the SCell, wherein the DCI includes a bitmap indicating a downlink BWP to be activated for the SCell;
   performing the BWP switching for the SCell from a current active downlink BWP to the downlink BWP indicated by the bitmap of the DCI based on the first information, the second information, and the third information;
   in case that a default downlink BWP is configured for the SCell and the switched downlink BWP is not the default downlink BWP and the dormant BWP, starting or restarting a BWP inactivity timer associated with the switched downlink BWP; and
   in case that the default downlink BWP is not configured for the SCell and the switched downlink BWP is not the initial downlink BWP and the dormant BWP, starting or restarting the BWP inactivity timer associated with the switched downlink BWP.

2. The method of claim 1, further comprising:
   transmitting, to the base station, hybrid automatic repeat request (HARQ) information for the DCI indicating the BWP switching for the SCell,
   wherein the DCI is DCI format 1_1 and does not schedule downlink data reception.

3. The method of claim 1, wherein the DCI indicating the BWP switching for the SCell is one of:
   DCI format 0_1 including an uplink grant,
   DCI format 1_1 including a downlink assignment, or
   DCI format that is different from the DCI format 0_1 and the DCI format 1_1 and does not include an uplink grant and a downlink assignment.

4. The method of claim 1, wherein the performing the BWP switching for the SCell comprises:
   in case that the dormant BWP is indicated for the SCell by the bitmap, setting an active downlink BWP for the SCell to the dormant BWP, and
   in case that the first active BWP is indicated for the SCell by the bitmap and the current active BWP for the SCell is the dormant BWP, setting the active downlink BWP for the SCell to the first active BWP.

5. A method performed by a base station in a communication system, the method comprising:
   transmitting, to a terminal, a radio resource control (RRC) message for configuring a secondary cell (SCell), the RRC message including first information on an initial downlink bandwidth part (BWP) of the SCell, second information on a dormant BWP among one or more downlink BWPs of the SCell, and third information on a first active BWP among the one or more downlink BWPs, wherein the first active BWP is to be activated by a BWP switching from the dormant BWP; and transmitting, to the terminal via a primary cell (PCell), downlink control information (DCI) indicating a BWP switching for the SCell, wherein the DCI includes a bitmap indicating a downlink BWP to be activated for the SCell, wherein the BWP switching for the SCell from a current active downlink BWP to the downlink BWP indicated by the bitmap of the DCI is performed based on the first information, the second information, and the third information, wherein, in case that a default downlink BWP is configured for the SCell and the switched downlink BWP is not the default downlink BWP and the dormant BWP, a BWP inactivity timer associated with the switched downlink BWP starts or restarts, and wherein, in case that the default downlink BWP is not configured for the SCell and the switched downlink BWP is not the initial downlink BWP and the dormant BWP, the BWP inactivity timer associated with the switched downlink BWP starts or restarts.

6. The method of claim 5, further comprising:

receiving, from the terminal, hybrid automatic repeat request (HARQ) information for the DCI indicating the BWP switching for the SCell, wherein the DCI is DCI format 1_1 and does not schedule downlink data reception.

7. The method of claim 5, wherein the DCI indicating the BWP switching for the SCell is one of:

DCI format 0_1 including an uplink grant,

DCI format 1_1 including a downlink assignment, or

DCI format that is different from the DCI format 0_1 and the DCI format 1_1 and does not include an uplink grant and a downlink assignment.

8. The method of claim 5, wherein, in case that the dormant BWP is indicated for the SCell by the bitmap, an active downlink BWP for the SCell is set to the dormant BWP, and wherein, in case that the first active BWP is indicated for the SCell by the bitmap and the current active BWP for the SCell is the dormant BWP, the active downlink BWP for the SCell is set to the first active BWP.

9. A terminal in a communication system, comprising:

a transceiver; and a controller coupled with the transceiver and configured to:

receive, from a base station, a radio resource control (RRC) message for configuring a secondary cell (SCell), the RRC message including first information on an initial downlink bandwidth part (BWP) of the SCell, second information on a dormant BWP among one or more downlink BWPs of the SCell, and third information on a first active BWP among the one or more downlink BWPs, wherein the first active BWP is to be activated by a BWP switching from the dormant BWP, receive, from the base station via a primary cell (PCell), downlink control information (DCI) indicating a BWP switching for the SCell, wherein the DCI includes a bitmap indicating a downlink BWP to be activated for the SCell, perform the BWP switching for the SCell from a current active downlink BWP to the downlink BWP indicated by the bitmap of the DCI based on the first information, the second information, and the third information, in case that a default downlink BWP is configured for the SCell and the switched downlink BWP is not the default downlink BWP and the dormant BWP, start or restart a BWP inactivity timer associated with the switched downlink BWP, and in case that the default downlink BWP is not configured for the SCell and the switched downlink BWP is not the initial downlink BWP and the dormant BWP, start or restart the BWP inactivity timer associated with the switched downlink BWP.

10. The terminal of claim 9, wherein the controller is further configured to:

transmit, to the base station, hybrid automatic repeat request (HARQ) information for the DCI indicating the BWP switching for the SCell, and wherein the DCI is DCI format 1_1 and does not schedule downlink data reception.

11. The terminal of claim 9, wherein the DCI indicating the BWP switching for the SCell is one of:

DCI format 0_1 including an uplink grant,

DCI format 1_1 including a downlink assignment, or

DCI format that is different from the DCI format 0_1 and the DCI format 1_1 and does not include an uplink grant and a downlink assignment.

12. The terminal of claim 9, wherein the controller is configured to:

in case that the dormant BWP is indicated for the SCell by the bitmap, set an active downlink BWP for the SCell to the dormant BWP, and in case that the first active BWP is indicated for the SCell by the bitmap and the current active BWP for the SCell is the dormant BWP, set the active downlink BWP for the SCell to the first active BWP.

13. A base station in a communication system, comprising:

a transceiver; and a controller coupled with the transceiver and configured to:

transmit, to a terminal, a radio resource control (RRC) message for configuring a secondary cell (SCell), the RRC message including first information on an initial downlink bandwidth part (BWP) of the SCell, second information on a dormant BWP among one or more downlink BWPs of the SCell, and third information on a first active BWP among the one or more downlink BWPs, wherein the first active BWP is to be activated by a BWP switching from the dormant BWP, and transmit, to the terminal via a primary cell (PCell), downlink control information (DCI) indicating a BWP switching for the SCell, wherein the DCI includes a bitmap indicating a downlink BWP to be activated for the SCell, wherein the BWP switching for the SCell from a current active downlink BWP to the downlink BWP indicated by the bitmap of the DCI is performed based on the first information, the second information, and the third information, wherein, in case that a default downlink BWP is configured for the SCell and the switched downlink BWP is not the default downlink BWP and the dormant BWP, a BWP inactivity timer associated with the switched downlink BWP starts or restarts, and wherein, in case that the default downlink BWP is not configured for the SCell and the switched downlink BWP is not the initial downlink BWP and the dormant BWP, the BWP inactivity timer associated with the switched downlink BWP starts or restarts.

14. The base station of claim 13, wherein the controller is further configured to:
receive, from the terminal, hybrid automatic repeat request (HARQ) information for the DCI indicating the BWP switching for the SCell, and
wherein the DCI is DCI format 1_1 and does not schedule downlink data reception.

15. The base station of claim 13, wherein the DCI indicating the BWP switching for the SCell is one of:
DCI format 0_1 including an uplink grant,
DCI format 1_1 including a downlink assignment, or
DCI format that is different from the DCI format 0_1 and the DCI format 1_1 and does not include an uplink grant and a downlink assignment.

16. The base station of claim 13,
wherein, in case that the dormant BWP is indicated for the SCell by the bitmap, an active downlink BWP for the SCell is set to the dormant BWP, and
wherein, in case that the first active BWP is indicated for the SCell by the bitmap and the current active BWP for the SCell is the dormant BWP, the active downlink BWP for the SCell is set to the first active BWP.

* * * * *